United States Patent
Kawamura et al.

(10) Patent No.: US 6,924,844 B2
(45) Date of Patent: Aug. 2, 2005

(54) IMAGE ANGLE DETECTOR AND SCANNING LINE INTERPOLATING APPARATUS

(75) Inventors: Hideaki Kawamura, Moriyama (JP); Mitsuhiro Kasahara, Hirakata (JP); Tomoaki Daigi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 484 days.

(21) Appl. No.: 10/181,954

(22) PCT Filed: Dec. 10, 2001

(86) PCT No.: PCT/JP01/10805

§ 371 (c)(1),
(2), (4) Date: Aug. 2, 2002

(87) PCT Pub. No.: WO02/48965

PCT Pub. Date: Jun. 20, 2002

(65) Prior Publication Data

US 2003/0011708 A1 Jan. 16, 2003

(51) Int. Cl.⁷ .................................................. H04N 7/01
(52) U.S. Cl. ....................................... 348/448; 348/458
(58) Field of Search ................................. 348/448, 458, 348/441; 382/286, 291; H04N 7/01

(56) References Cited

U.S. PATENT DOCUMENTS

| | | | | |
|---|---|---|---|---|
| 4,985,764 A | * | 1/1991 | Sato ........................... | 348/448 |
| 5,347,599 A | * | 9/1994 | Yamashita et al. ........... | 382/278 |
| 5,550,936 A | | 8/1996 | Someya et al. | |
| 5,579,053 A | * | 11/1996 | Pandel ........................ | 348/448 |
| 5,742,348 A | * | 4/1998 | Kuwahara et al. ........... | 348/441 |
| 5,796,437 A | * | 8/1998 | Muraji et al. ................ | 348/452 |
| 5,886,745 A | | 3/1999 | Muraji et al. | |
| 5,920,654 A | | 7/1999 | Someya et al. | |
| 5,929,918 A | | 7/1999 | Marques Pereira et al. | |
| 6,133,957 A | * | 10/2000 | Campbell .................... | 348/458 |
| 6,731,342 B2 | * | 5/2004 | Shin et al. .................. | 348/452 |
| 6,801,221 B2 | * | 10/2004 | Kawamura et al. ......... | 345/698 |

FOREIGN PATENT DOCUMENTS

| | | |
|---|---|---|
| EP | 0790736 | 8/1997 |
| JP | 63-26782 | 2/1988 |
| JP | 9-37214 | 2/1997 |
| JP | 5-68240 | 5/1997 |
| JP | 2-213289 | 12/1997 |
| JP | 10-32729 | 2/1998 |
| JP | 11146346 | 5/1999 |
| JP | 2000253238 | 9/2000 |

OTHER PUBLICATIONS

English Language Abstract of JP 11–146346.
English Language Abstract of JP 2000–2532387.
English Language Abstract of JP 63–26782.
English Language Abstract of JP 02213289 (corresponding to 2732644).

* cited by examiner

Primary Examiner—Michael H. Lee
(74) Attorney, Agent, or Firm—Greenblum & Bernstein, P.L.C.

(57) ABSTRACT

A binarizer binarizes a video signal VD1 inputted from an A/D converter and a video signal VD2 outputted from a line memory using an average luminance value LU fed from a detection window video signal processor as a threshold value, to output a binary pattern BI. A reference pattern generator generates a plurality of reference patterns RA. A first pattern matching angle detector compares the binary pattern BI with each of the plurality of reference patterns RA, to output the angle of the reference pattern RA which matches with the binary pattern BI as angle information PA. A detected isolation point remover 4 outputs angle signal AN when the angle information PA has continuity.

30 Claims, 31 Drawing Sheets

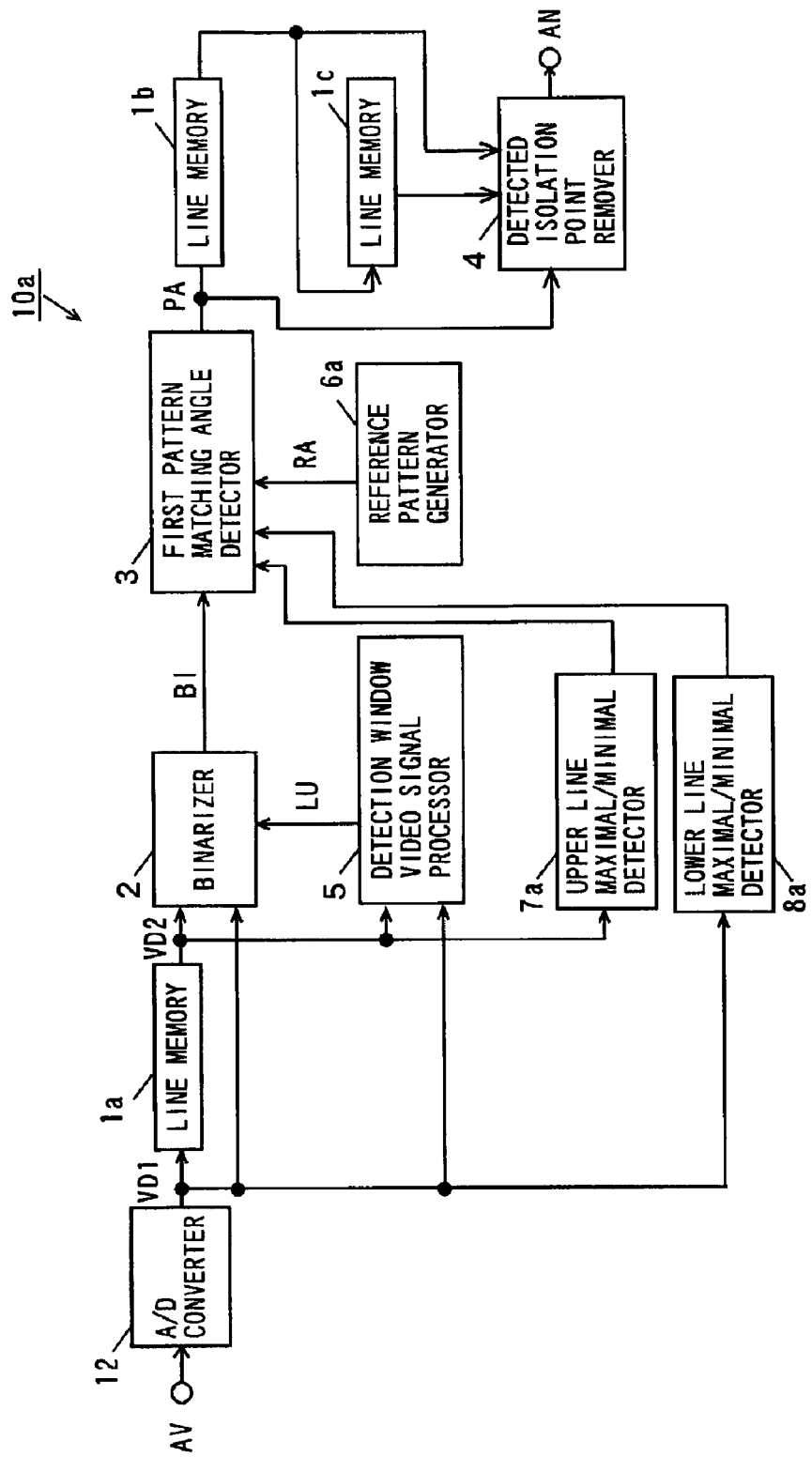

F I G. 2
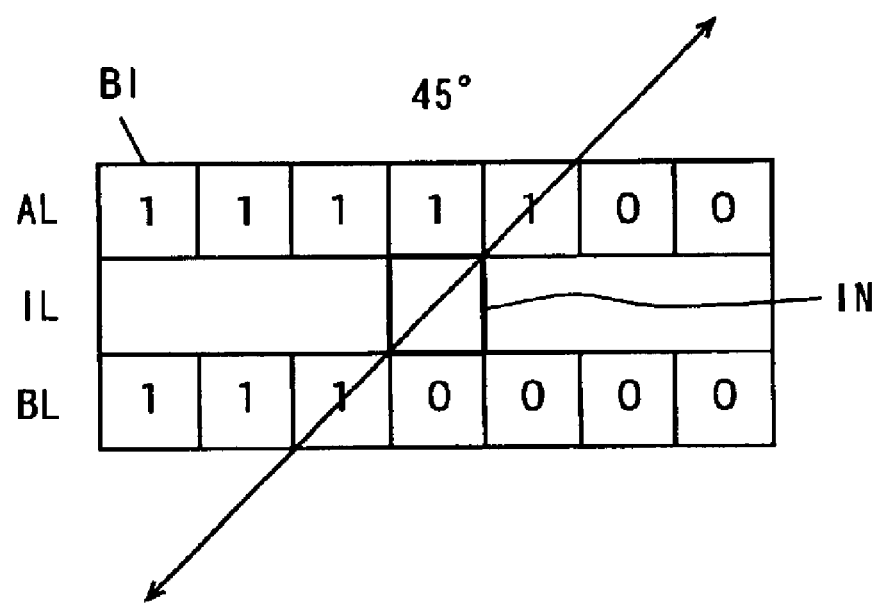

F I G. 1 0
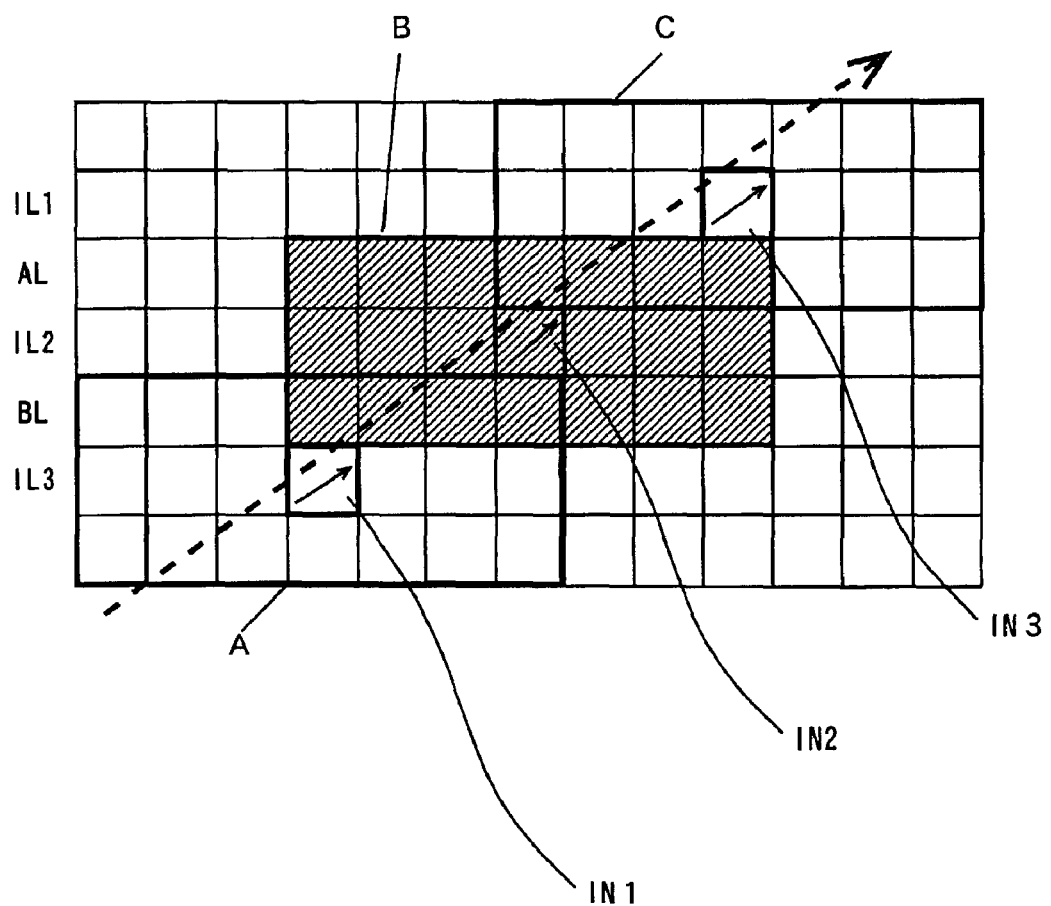

F I G. 2 1
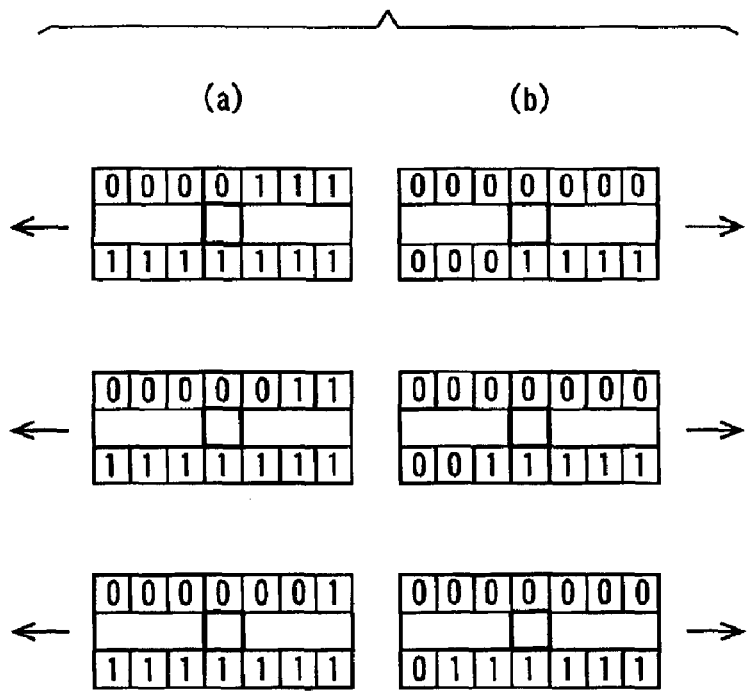
F I G. 2 2
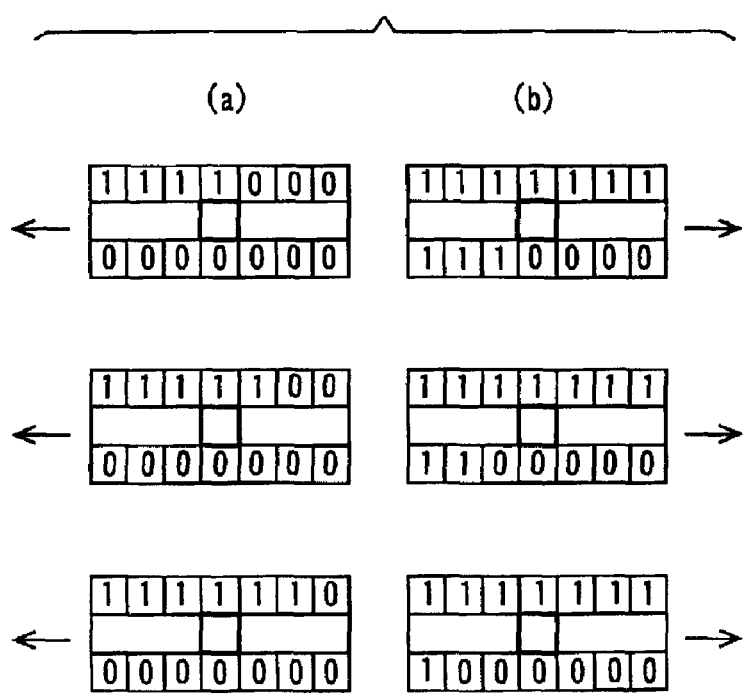

FIG. 31
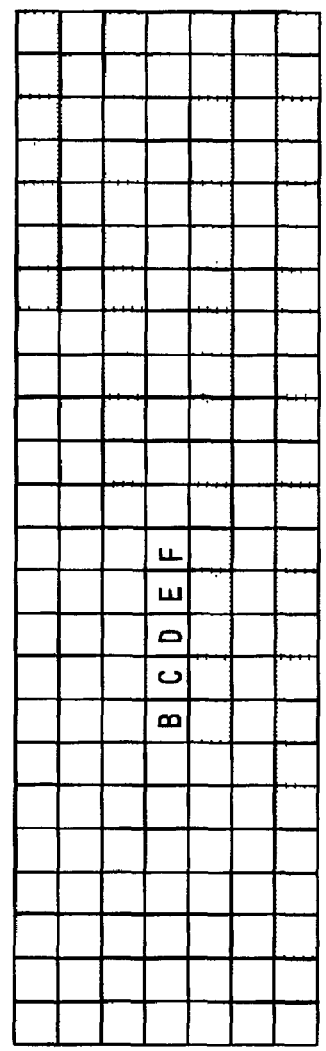
(a)
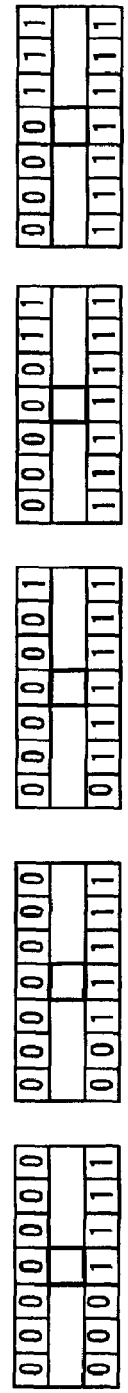
(b) (c) (d) (e) (f)

IMAGE ANGLE DETECTOR AND SCANNING LINE INTERPOLATING APPARATUS

TECHNICAL FIELD

The present invention relates to picture angle detection equipment for detecting the angle of a picture displayed by a video signal and scanning lines interpolation equipment using the same.

BACKGROUND ART

In order to convert video signals of interlaced scanning into video signals of progressive scanning or convert video signals of progressive scanning into enlarged or reduced video signals, interpolation circuits for performing scanning lines interpolation processing are used. In such interpolation circuits, the value of a pixel to be produced by the interpolation processing, that is, a pixel to be interpolated (hereinafter referred to as an interpolation pixel) is calculated on the basis of the values of pixels around the interpolation pixel. In this case, the value of the interpolation pixel is calculated using the pixels in the direction in which there is a high correlation out of the pixels around the interpolation pixel.

In a picture having a diagonal edge or a picture having a thin diagonal line, for example, the value of an interpolation pixel is calculated using pixels in diagonal directions, centered at the interpolation pixel. Therefore, correlation judgment circuits for judging the direction in which there is a high correlation in a picture represented by a video signal are used.

In conventional correlation judgment circuits, a difference value between two pixels in each of a vertical direction and a diagonal direction, centered at an interpolation pixel is detected, and the direction in which there is a high correlation is judged on the basis of the difference value. In such a method using a difference value between two pixels, however, erroneous judgment may, in some cases, be made. When interpolation processing is performed in a picture having a diagonal edge or a picture having a thin diagonal line, a smooth picture is not obtained.

In the case of a picture having a thin diagonal line, as shown in FIG. 36, for example, a difference value between two pixels 81 and 82 in a vertical direction, a difference value between two pixels 83 and 84 in one diagonal direction, and a difference value between two pixels 85 and 86 in the other diagonal direction, centered at an interpolation pixel IN, are equal to one another. Therefore, the direction in which there is a high correlation may, in some cases, be erroneously judged.

In a pixel interpolation circuit disclosed in Japanese Patent Application Laid-Open No. 2642261 (JP-A-5-68240), a method of extracting a total of six peripheral pixels, i.e., respective three pixels on scanning lines above and below an interpolation pixel, judging which of a vertical direction, a diagonally rightward direction and a diagonally leftward direction is the direction in which there is a high correlation using an interpolation table previously produced, and calculating the value of the interpolation pixel in the direction in which there is the highest correlation is employed.

When the value of the interpolation pixel is calculated using the pixel interpolation circuit disclosed in Japanese Patent Application Laid-open No. 2642261, however, noise may, in some cases, be produced.

In the case of a picture having an edge, as shown in FIG. 37(a), for example, the pixel interpolation circuit disclosed in Japanese Patent Application Laid-open No. 2642261 judges the direction in which there is a high correlation using an interpolation table previously produced with respect to six pixels A to F on scanning lines above an interpolation pixel IN. In this case, the pixel interpolation circuit judges that there is the highest correlation in the diagonally leftward direction, and calculates the value of the interpolation pixel IN using the pixel A in a direction diagonally upward toward the left and the pixel F in a direction diagonally downward toward the right, as shown in FIG. 37(b). Since the pixel A in a direction diagonally upward toward the left is "white", and the pixel F in a direction diagonally downward toward the right is "white", the interpolation pixel IN is also calculated as "white". In the case of the picture shown in FIG. 37(a), however, the interpolation pixel IN should be "black". As a result, the interpolation pixel IN becomes noise.

DISCLOSURE OF INVENTION

An object of the present invention is to provide picture angle detection equipment capable of accurately detecting the angle of a diagonal edge of a picture represented by a video signal and scanning lines interpolation equipment using the same.

Picture angle detection equipment for detecting the angle of a picture related to a pixel to be interpolated on the basis of an inputted video signal according to an aspect of the present invention, comprising a binary pattern generation device that binarizes the inputted video signal in a predetermined detection region including a plurality of scanning lines and the pixel to be interpolated, to generate a binary pattern; a reference pattern generation device that generates a binary picture having a plurality of directions as a plurality of reference patterns; a comparison device that compares the binary pattern generated by the binary pattern generation device with each of the plurality of reference patterns generated by the reference pattern generation device, and detecting the angle of a picture related to the pixel to be interpolated on the basis of the results of the comparison; and a continuity detection device that detects whether or not the angle of the picture detected by the comparison device with respect to the pixel to be interpolated has continuity from the angle of a picture detected on an upper or lower interpolation scanning line, to output the angle of the picture detected by the comparison device as an angle signal when there is continuity, while not outputting the angle of the picture detected by the comparison device when there is no continuity.

In the picture angle detection equipment according to the present invention, the binary pattern generation device binarizes the inputted video signal in the predetermined detection region, to generate the binary pattern. The reference pattern generation device generates the binary picture having the plurality of directions as the plurality of reference patterns. The comparison device compares the binary pattern with each of the plurality of reference patterns, and detects the angle of the picture related to the pixel to be interpolated on the basis of the results of the comparison. Further, the continuity detection device detects whether or not the angle of the picture detected by the comparison device with respect to the pixel to be interpolated has continuity from the angle of the picture detected on the upper or lower interpolation scanning line, so that the angle of the picture detected by the comparison device is outputted as the angle signal when there is continuity, while not being outputted when there is no continuity.

In this case, the two-dimensional patterns are compared with each other. Accordingly, erroneous detection is restrained, as compared with that in a case where a difference value between two pixels is used, thereby making it possible to accurately detect the angle of a picture having a diagonal edge. Further, by using the two-dimensional reference patterns, angles to be detected are not limited to the angles of straight lines each connecting the pixels at positions of point symmetry, centered at the pixel to be interpolated. For example, angles among the angles can be also detected.

Consequently, it is possible to detect the angle with finer spacing without enlarging the circuit scale. Further, when the detected angle of the picture has no continuity, no angle signal is outputted, thereby preventing erroneous detection by noise.

The binary pattern generation device may comprise a threshold calculation device for calculating a threshold value for binarization on the basis of the luminance of the video signal in the detection region, and a binarization device that binarizes the inputted video signal using the threshold value calculated by the threshold calculation device, to generate the binary pattern.

In this case, the threshold value for binarization is calculated on the basis of the luminance of the video signal in the detection region. Accordingly, the binary pattern can be generated without setting the threshold value from the exterior and irrespective of the luminance level of the video signal.

The threshold calculation device may calculate the average value of the luminance of the video signal in the detection region, to calculate the threshold value.

In this case, the average value of the luminance of the video signal in the detection region is used as the threshold value for binarization. Accordingly, the binary pattern can be generated without setting the threshold value for binarization from the exterior and irrespective of the luminance level of the video signal.

The picture angle detection equipment may further comprise a first judgment device that judges whether a luminance distribution in a horizontal direction on each of the scanning lines is monotonously increased or monotonously decreased in the video signal in the detection region. The comparison device may not compare the binary pattern with each of the plurality of reference patterns when the first judgment device judges that the luminance distribution is neither monotonously increased nor monotonously decreased.

When the luminance distribution in the horizontal direction on each of the scanning lines is neither monotonously increased nor monotonously decreased in the video signal in the detection region, the binary pattern is not compared with each of the plurality of reference patterns, so that the angle of the picture is not detected. Consequently, erroneous detection by noise is restrained.

The picture angle detection equipment may further comprise a second judgment device that judges whether a maximal point or a minimal point exists in a luminance distribution in a horizontal direction on each of the scanning lines in the video signal in the detection region. The comparison device may not compare the binary pattern with each of the plurality of reference patterns when the second judgment device judges that the maximal point or the minimal point exists in the luminance distribution.

When the maximal point or the minimal point exists in the luminance distribution in the horizontal direction on each of the scanning lines in the video signal in the detection region, the binary pattern is not compared with each of the plurality of reference patterns, so that the angle of the picture is not detected. Consequently, erroneous detection by noise is restrained.

The picture angle detection equipment may further comprise a contrast detection device that detects a contrast in the video signal in the detection region. The comparison device may not compare the binary pattern with each of the plurality of reference patterns when the contrast detected by the contrast detection device is lower than a predetermined value.

When the contrast in the video signal in the detection region is low, the effect of interpolation processing using pixels in diagonal directions is small. When the contrast in the video signal is lower than the predetermined value, the binary pattern is not compared with each of the plurality of reference patterns, so that the angle of the picture is not detected. Consequently, the interpolation processing, using the pixels in diagonal directions, which involves noise, can be performed only when the effect is large.

The picture angle detection equipment may further comprise a thinning device that thins out pixels composing the inputted video signal, to feed the thinned pixels to the binary pattern generation device.

In this case, the pixels composing the inputted video signal are thinned, and are fed to the binary pattern generation device, so that the binary pattern is generated. Consequently, it is possible to detect a picture having the angle of a diagonal edge closer to the horizontal (hereinafter referred to as a shallower angle),using the same reference patterns as the above-mentioned plurality of reference patterns.

The continuity detection device may judge, when the difference between the angle of the picture detected by the comparison device with respect to the pixel to be interpolated and the angle of the picture detected with respect to pixels in a predetermined range of the upper or lower interpolation scanning line is not more than a predetermined value, that there is continuity.

In this case, it is judged whether or not the difference between the angle of the picture detected with respect to the pixel to be interpolated and the angle of the picture detected with respect to the pixels in the predetermined range of the upper or lower interpolation scanning line is not more than the predetermined value, thereby making it possible to judge the presence or absence of continuity. Consequently, it is possible to suitably determine the angle of the picture while allowing predetermined variations.

The continuity detection device may judge, when the difference between the angle of the picture detected by the comparison device with respect to the pixel to be interpolated and the angle of the picture detected with respect to a pixel in a predetermined range of the upper or lower interpolation scanning line is not more than a predetermined value, and when the difference between the threshold value calculated by the threshold calculation device with respect to the pixel to be interpolated and the threshold value calculated by the threshold calculation device with respect to a pixel in a predetermined range of the upper or lower interpolation scanning line is not more than a predetermined value, the difference between the maximum value of the luminance of the video signal in the detection region related to the pixel to be interpolated and the maximum value of the luminance of the video signal in the detection region related to a pixel in a predetermined range of the upper or lower interpolation scanning line is not more than a predetermined value, or the difference between the minimum value of the luminance of the video signal in the detection region related to the pixel to be interpolated and the minimum value of the luminance of the video signal in the detection region related to a pixel in a predetermined range of the upper or lower interpolation scanning line is not more than a predetermined value, that there is continuity.

In this case, it is judged whether or not the difference between the angle calculated with respect to the pixel to be interpolated and the angle calculated with respect to the pixel in the predetermined range of the upper or lower interpolation scanning line is not more than the predetermined value, and whether or not the difference between the threshold value calculated with respect to the pixel to be interpolated and the threshold value calculated with respect to a pixel in the predetermined range of the upper or lower interpolation scanning line is not more than the predetermined value, whether or not the difference between the maximum value of the luminance in the detection region related to the pixel to be interpolated and the maximum value of the luminance in the detection region related to a pixel in the predetermined range of the interpolation scanning line is not more than the predetermined value, or whether or not the difference between the minimum value of the luminance in the detection region related to the pixel to be interpolated and the minimum value of the luminance in the detection region related to a pixel in the predetermined range of the interpolation scanning line is not more than the predetermined value, thereby making it possible to judge the presence or absence of continuity. Consequently, it is possible to suitably determine the angle of the picture while allowing predetermined variations.

In the picture angle detection equipment, each of the plurality of reference patterns generated by the reference pattern generation device may include a first pixel train arranged on the scanning line above the pixel to be interpolated and a second pixel train arranged on the scanning line below the pixel to be interpolated. The first pixel train may have one change point from a first pixel value to a second pixel value, the second pixel train may have one change point from a first pixel value to a second pixel value, and the direction of the change from the first pixel value to the second pixel value in the first pixel train and the direction of the change from the first pixel value to the second pixel value in the second pixel train may be the same.

In the reference pattern, both the pixel train arranged on the upper scanning line and the pixel train arranged on the lower scanning line change in luminance and respectively have luminance gradients in the same direction. The reference pattern corresponds to a picture having a diagonal edge. When the binary pattern matches with the reference pattern, therefore, the angle of the diagonal edge can be reliably specified.

The comparison device may output, the angle of the picture and an identification signal for identifying the reference pattern matched with the binary pattern.

In this case, the angle of the picture and the identification signal for identifying the reference pattern that is judged by the comparison device to match with the binary pattern, are outputted. Consequently, since a reference pattern can be certainly determined even when a plurality of reference patterns with the same value of an angle are used, erroneous detection of angle is prevented.

Picture angle detection equipment for detecting the angle of a picture related to a pixel to be interpolated on the basis of an inputted video signal according to another aspect of the present invention, comprising a maximal/minimal pattern generation device-that generates, in a predetermined detection region including a plurality of scanning lines and the pixel to be interpolated in the inputted video signal, a maximal/minimal pattern representing the position of a maximal point or a minimal point in a luminance distribution in a horizontal direction for each of the scanning lines; a reference pattern generation device that generates a plurality of reference patterns each representing the position of the maximal point or the minimal point in the luminance distribution in the horizontal direction for each of the scanning lines in the detection region; and a comparison device that compares the maximal/minimal pattern generated by the maximal/minimal pattern generation device with each of the plurality of reference patterns generated by the reference pattern generation device, and detects the angle of the picture related to the pixel to be interpolated on the basis of the results of the comparison.

In the picture angle detection equipment according to the present invention, the maximal/minimal pattern generation device generates the maximal/minimal pattern representing the position of the maximal point or the minimal point in the luminance distribution in the horizontal direction for each of the scanning lines in the predetermined detection region in the inputted video signal. Further, the reference pattern generation device generates the plurality of reference patterns each representing the position of the maximal point or the minimal point in the luminance distribution in the horizontal direction for each of the scanning lines in the detection region. The comparison device compares the maximal/minimal pattern with each of the plurality of reference patterns, and detects the angle of the picture related to the pixel to be interpolated on the basis of the results of the comparison.

In this case, the two-dimensional patterns are compared with each other. Accordingly, erroneous detection is restrained, as compared with that in a case where a difference value between two pixels is used, thereby making it possible to accurately detect the angle of a picture having a thin diagonal line.

Furthermore, by using the two-dimensional reference patterns, angles to be detected are not limited to the angles of straight lines each connecting the pixels at positions of point symmetry, centered at the pixel to be interpolated. For example, angles among the angles can be also detected. Consequently, it is possible to detect the angle with finer spacing without enlarging the circuit scale.

The picture angle detection equipment may further comprise a contrast detection device that detects a contrast in the video signal in the detection region. The comparison device may not compare the maximal/minimal pattern with each of the plurality of reference patterns when the contrast detected by the contrast detection device is lower than a predetermined value.

When the contrast in the video signal in the detection region is low, the effect of interpolation processing using pixels in diagonal directions is small. When the contrast in the video signal is lower than the predetermined value, therefore, the maximal/minimal pattern is not compared with each of the plurality of reference patterns, so that the angle of the picture is not detected. Consequently, the interpolation processing, using the pixels in diagonal directions, which invoices noise can be performed only when the effect is large.

The picture angle detection equipment may further comprise a continuity detection device that detects whether or not the angle of the picture detected by the comparison device with respect to the pixel to be interpolated has continuity from the angle of a picture detected on an upper or lower interpolation scanning line, to output the angle of the picture detected by the comparison device as an angle signal when there is continuity, while not outputting the angle of the picture detected by the comparison device when there is no continuity.

The angle of the picture detected by the comparison device is outputted as the angle signal when the angle of the picture detected with respect to the pixel to be interpolated has continuity from the angle of the picture detected on the upper or lower interpolation scanning line, while not being outputted when it has no continuity.

No angle signal is outputted when the angle of the detected angle of the picture has no continuity, thereby preventing erroneous detection by noise.

The comparison device may output, the angle of the picture and an identification signal for identifying the reference pattern matched with the binary pattern.

In this case, the angle of the picture and the identification signal for identifying the reference pattern that is judged by the comparison device to match with the binary pattern, are outputted. Consequently, since a reference pattern can be certainly determined even when a plurality of reference patterns with the same value of an angle are used, erroneous detection of angle is prevented.

The picture angle detection equipment may further comprise a thinning device that thins out pixels composing the inputted video signal, to feed the thinned pixels to the maximal/minimal pattern generation device.

In this case, the pixels composing the inputted video signal are thinned, and are fed to the maximal/minimal pattern generation device, so that the maximal/minimal pattern is generated. Consequently, it is possible to detect a picture having a shallower angle using the same patterns as the above-mentioned plurality of reference patterns.

Picture angle detection equipment for detecting the angle of a picture related to a pixel to be interpolated on the basis of an inputted video signal according to still another aspect of the present invention, comprising a binary pattern generation device that binarizes, in a predetermined detection region including a plurality of scanning lines and the pixel to be interpolated, the inputted video signal, to generate a binary pattern; a first reference pattern generation device that generates a binary picture having a plurality of directions as a plurality of first reference patterns; a first comparison device that compares the binary pattern generated by the binary pattern generation device with each of the plurality of first reference patterns generated by the first reference pattern generation device, and detects the angle of the picture related to the pixel to be interpolated on the basis of the results of the comparison; a maximal/minimal pattern generation device that generates, in the predetermined detection region including the plurality of scanning lines and the pixel to be interpolated in the inputted video signal, a maximal/minimal pattern representing the position of a maximal point or a minimal point in a luminance distribution in a horizontal direction for each of the scanning lines; a second reference pattern generation device that generates a plurality of second reference patterns each representing the position of the maximal point or the minimal point in the luminance distribution in the horizontal direction for each of the scanning lines in the detection region; and a second comparison device that compares the maximal/minimal pattern generated by the maximal/minimal pattern generation device with each of the plurality of second reference patterns generated by the second reference pattern generation device, and detects the angle of the picture related to the pixel to be interpolated on the basis of the results of the comparison.

In the picture angle detection equipment according to the present invention, the binary pattern generation device binarizes the inputted video signal in the predetermined detection region, to generate the binary pattern. Further, the first reference pattern generation device generates the binary picture having the plurality of directions as the plurality of first reference patterns. The first comparison device compares the binary pattern with each of the plurality of first reference patterns, and detects the angle of the picture related to the pixel to be interpolated on the basis of the results of the comparison.

Furthermore, the maximal/minimal pattern generation device generates the maximal/minimal pattern representing the position of the maximal point or the minimal point in the luminance distribution in the horizontal direction for each of the scanning lines in the predetermined detection region in the inputted video signal. Further, the second reference pattern generation device generates the plurality of second reference patterns each representing the position of the maximal point or the minimal point in the luminance distribution in the horizontal direction for each of the scanning lines in the detection region. The second comparison device compares the maximal/minimal pattern with each of the plurality of second reference patterns, and detects the angle of the picture related to the pixel to be interpolated on the basis of the results of the comparison.

In this case, the two-dimensional patterns are compared with each other. Accordingly, erroneous detection is restrained, as compared with that in a case where a difference value between two pixels is used, thereby making it possible to accurately detect the angle of a picture having a thin diagonal line.

Furthermore, by using the two-dimensional first and second reference patterns, angles to be detected are not limited to the angles of straight lines each connecting the pixels at positions of point symmetry, centered at the pixel to be interpolated. For example, angles among the angles can be also detected. Consequently, it is possible to detect the angle with finer spacing without enlarging the circuit scale.

The picture angle detection equipment may further comprise a thinning device that thins out pixels composing the inputted video signal, to feed the thinned pixels to the binary pattern generation device and the maximal/minimal pattern generation device.

In this case, the pixels composing the inputted video signal are thinned, and are fed to the binary pattern generation device and the maximal/minimal pattern generation device, so that the binary pattern and the maximal/minimal pattern are generated. Consequently, it is possible to detect a picture having a shallower angle using the same reference patterns as the above-mentioned first and second reference patterns.

Picture angle detection equipment for detecting the angle of a picture related to a pixel to be interpolated on the basis of an inputted video signal according to a further aspect of the present invention, comprising a binary pattern generation device that binarizes the inputted video signal in a predetermined detection region including a plurality of scanning lines and the pixel to be interpolated, to generate a binary pattern; a determination angle pattern generation device that generates a plurality of binary pictures each having a specified direction as a plurality of determination angle patterns; a primary determination angle detection device that compares the binary pattern generated by the binary pattern generation device with each of the plurality of determination angle patterns generated by the determination angle pattern generation device, and detects the angle of the picture related to the pixel to be interpolated as a primary determination angle on the basis of the results of the comparison; a candidate pattern generation device that generates a plurality of binary pictures each having a plurality of arbitrary directions as a plurality of candidate patterns; a candidate detection device that compares the binary pattern generated by the binary pattern generation device with each of the plurality of candidate patterns generated by the candidate pattern generation device, and detects whether or not the pixel to be interpolated is a candidate pixel at which the angle of the picture can be determined on the basis of the results of the comparison; and a secondary determination angle detection device that outputs, when the primary determination angle detection device detects the primary determination angle, the primary determination angle detected by the primary determination angle detection device as the angle of the picture related to the pixel to be interpolated, searching, when the candidate detection device detects that the pixel to be interpolated is a candidate pixel, for the other pixel having the primary determination angle in a predetermined range adjacent to the pixel to be interpolated, to output, when the other pixel having the primary determination angle exists in the predetermined range, the primary determination angle related to the other pixel as the angle of the picture related to the pixel to be interpolated.

In the picture angle detection equipment according to the present invention, the binary pattern generation device binarizes the inputted video signal in the predetermined detection region, to generate the binary pattern. Further, the determination angle pattern generation device generates the binary pictures each having the specified direction as the plurality of determination angle patterns. The primary determination angle detection device compares the binary pattern with each of the plurality of determination angle patterns, and primarily determines the angle of the picture having the pixel to be interpolated on the basis of the results of the comparison. Further, the candidate pattern generation device generates the binary pictures each having the plurality of arbitrary directions as the candidate patterns. The candidate detection device compares the binary pattern with each of the plurality of candidate patterns, and detects whether or not the pixel to be interpolated is the candidate pixel at which the angle of the picture can be determined on the basis of the results of the comparison.

Furthermore, when the primary determination angle detection device detects the primary determination angle, the secondary determination angle detection device outputs the primary determination angle detected by the primary determination angle detection device as the angle of the picture related to the pixel to be interpolated. When the candidate detection device detects that the pixel to be interpolated is the candidate pixel, the secondary determination angle detection device searches for the other pixel having the primary determination angle in the predetermined range adjacent to the pixel to be interpolated, to output, when the other pixel having the primary determination angle exists in the predetermined range, the primary determination angle related to the other pixel as the angle of the picture related to the pixel to be interpolated.

In this case, the two-dimensional patterns are compared with each other. Accordingly, erroneous detection is restrained, as compared with that in a case where a difference value between two pixels is used. When the angle of the picture is not specified by making the comparison once, the pixel at which the angle of the picture can be determined is searched for in the vicinity of the pixel to be interpolated. The angle of the picture is thus detected in two steps, that is, separately in a case where the angle of the picture is specified by making the comparison once and a case where the angle of the picture is not specified by making the comparison once, thereby making it possible to more accurately detect the angle of the picture.

Each of the plurality of determination angle patterns generated by the determination angle pattern generation device may include a first pixel train arranged on the scanning line above the pixel to be interpolated and a second pixel train arranged on the scanning line below the pixel to be interpolated. The first pixel train may have one change point from a first pixel value to a second pixel value, the second pixel train may have one change point from a first pixel value to a second pixel value, and the direction of the change from the first pixel value to the second pixel value in the first pixel train and the direction of the change from the first pixel value to the second pixel value in the second pixel train may be the same.

In the determination angle pattern, both the pixel train arranged on the upper scanning line and the pixel train arranged on the lower scanning line change in luminance and respectively have luminance gradients in the same direction. The determination angle pattern corresponds to a picture having a diagonal edge. When the binary pattern matches with the determination angle pattern, therefore, the angle of the diagonal edge can be reliably specified.

Each of the plurality of candidate patterns generated by the candidate pattern generation device may include a first pixel train arranged on the scanning line above the pixel to be interpolated and a second pixel train arranged on the scanning line below the pixel to be interpolated. One of the first and second pixel trains may have one change point from a first pixel value to a second pixel value, and the other of the first and second pixel trains may have one of the first pixel value and the second pixel value.

In the candidate pattern, the pixel train arranged on either one of the upper scanning line and the lower scanning line changes in luminance, and the pixel train arranged on the other scanning line has no luminance gradient or has a small luminance gradient. In this case, the angle of the picture cannot be determined. When the binary pattern matches with the candidate pattern, however, the possibility that the pixel at which the angle of a shallow diagonal edge can be specified exists is high if the vicinity of the pixel to be interpolated is searched.

Each of the plurality of candidate patterns generated by the candidate pattern generation device may include a first pixel train arranged on the scanning line above the pixel to be interpolated and a second pixel train arranged on the scanning line below the pixel to be interpolated. The first pixel train may have one change point from a first pixel value to a second pixel value, the second pixel train may have one change point from a first pixel value to a second pixel value, and the direction of the change from the first pixel value to the second pixel value in the first pixel train and the direction of the change from the first pixel value to the second pixel value in the second pixel train may be opposite to each other.

In the candidate pattern, both the pixel train arranged on the upper scanning line and the pixel train arranged on the lower scanning line change in luminance and respectively have luminance gradients in the opposite directions. In this case, the angle of the picture cannot be determined. When the binary pattern matches with the candidate pattern, however, the possibility that the pixel at which the angle of an edge of a picture having a thin diagonal line can be specified exists is high if the vicinity of the pixel to be interpolated is searched.

The secondary determination angle detection device may specify, when the candidate detection device detects that the pixel to be interpolated is a candidate pixel, the direction in which the other pixel having the primary determination angle is searched for from the pixel to be interpolated depending on the candidate pattern which is judged to be coincident with the binary pattern by the candidate detection device.

In this case, the direction in which the other pixel having the primary determination angle is specified for from the pixel to be interpolated depending on the candidate pattern which is judged to be coincident with the binary pattern, so that the angle of the picture is detected with higher precision.

The secondary determination angle detection device may search, when the candidate detection device detects that the pixel to be interpolated is a candidate pixel, for the other pixel using the predetermined angle determination pattern out of the plurality of angle determination patterns in a predetermined range adjacent to the pixel to be interpolated depending on the candidate pattern which is judged to be coincident with the binary pattern by the candidate detection device, to output, when the other pixel having a primary determination angle exists in the predetermined range, the primary determination angle related to the other pixel as the angle of the picture related to the pixel to be interpolated.

In this case, the other pixel is searched for using the predetermined angle determination pattern in the predetermined range adjacent to the pixel to be interpolated depending on the candidate pattern which is judged to be coincident with the binary pattern, so that the angle of the picture is detected with higher precision.

The picture angle detection equipment may further comprise a ternary determination angle detection device that detects whether or not the angle of the picture detected by the secondary determination angle detection device with respect to the pixel to be interpolated has continuity from the angle of a picture detected on an upper or lower interpolation scanning line, to output the angle of the picture detected by the secondary determination angle detection device as an angle signal when there is continuity, while not outputting the angle of the picture detected by the secondary determination angle detection device when there is no continuity.

In this case, no angle signal is outputted when the detected angle of the picture has no continuity, thereby preventing erroneous detection by noise.

The comparison device may output, the angle of the picture and an identification signal for identifying the determination angle pattern matched with the binary pattern.

In this case, the angle of the picture and the identification signal for identifying the determination angle pattern that is judged by the comparison device to match with the binary pattern, are outputted.

Consequently, since a reference pattern can be certainly determined even when a plurality of reference patterns with the same value of an angle are used, erroneous detection of angle is prevented.

Scanning lines interpolation equipment according to another aspect of the present invention comprises picture angle detection equipment that detects the angle of a picture related to a pixel to be interpolated on the basis of an inputted video signal; and an interpolation circuit that selects pixels used for interpolation processing on the basis of the angle detected by the picture angle detection equipment, and calculates the value of the pixel to be interpolated using the selected pixels, to generate interpolation scanning lines. The picture angle detection equipment comprises a binary pattern generation device that binarizes the inputted video signal in a predetermined detection region including a plurality of scanning lines and the pixel to be interpolated, to generate a binary pattern, a reference pattern generation device that generates binary pictures each having a plurality of directions as a plurality of reference patterns, a comparison device that compares the binary pattern generated by the binary pattern generation device with each of the plurality of reference patterns generated by the reference pattern generation device, and detects the angle of the picture related to the pixel to be interpolated on the basis of the results of the comparison, and a continuity detection device that detects whether or not the angle of the picture detected by the comparison device with respect to the pixel to be interpolated has continuity from the angle of a picture detected on the upper or lower interpolation scanning line, to output the angle of the picture detected by the comparison device as an angle signal when there is continuity, while not outputting the angle of the picture detected by the comparison device when there is no continuity.

In the scanning lines interpolation equipment according to the present invention, the angle of the picture related to the pixel to be interpolated is accurately detected on the basis of the video signal inputted by the picture angle detection equipment, the pixels used for the interpolation processing are selected on the basis of the angle detected by the picture angle detection device, and the value of the pixel to be interpolated is calculated using the pixels selected by the interpolation circuit, to generate the interpolation scanning lines.

Scanning lines interpolation equipment according to still another aspect of the present invention comprises picture angle detection equipment that detects the angle of a picture related to a pixel to be interpolated on the basis of an inputted video signal according to still another aspect of the present invention; and an interpolation circuit that selects pixels used for interpolation processing on the basis of the angle detected by the picture angle detection equipment, and calculates the value of the pixel to be interpolated using the selected pixels, to generate interpolation scanning lines. The picture angle detection equipment comprises a maximal/minimal pattern generation device that generates, in a predetermined detection region including a plurality of scanning lines and the pixel to be interpolated in the inputted video signal, a maximal/minimal pattern representing the position of a maximal point or a minimal point in a luminance distribution in a horizontal direction for each of the scanning lines, a reference pattern generation device that generates a plurality of reference patterns each representing the position of the maximal point or the minimal point in the luminance distribution in the horizontal direction for each of the scanning lines in the detection region, and a comparison device that compares the maximal/minimal pattern generated by the maximal/minimal pattern generation device with each of the plurality of reference patterns generated by the reference pattern generation device, and detects the angle of the picture related to the pixel to be interpolated on the basis of the results of the comparison.

In the scanning lines interpolation equipment according to the present invention, the angle of the picture related to the pixel to be interpolated is accurately detected on the basis of the video signal inputted by the picture angle detection equipment, the pixels used for the interpolation processing are selected on the basis of the angle detected by the picture angle detection device, and the value of the pixel to be interpolated is calculated using the pixels selected by the interpolation circuit, to generate the interpolation scanning line.

Scanning lines interpolation equipment according to a further aspect of the present invention comprises picture angle detection equipment that detects the angle of a picture related to a pixel to be interpolated on the basis of an inputted video signal according to a further aspect of the present invention; and an interpolation circuit that selects pixels used for interpolation processing on the basis of the angle detected by the picture angle detection equipment, and calculates the value of the pixel to be interpolated using the selected pixels, to generate interpolation scanning lines. The picture angle detection equipment comprises a binary pattern generation device that binarizes the inputted video signal in a predetermined detection region including a plurality of scanning lines and the pixel to be interpolated, to generate a binary pattern, a first reference pattern generation device that generates a binary picture having a plurality of directions as a plurality of first reference patterns, a first comparison device that compares the binary pattern generated by the binary pattern generation device with each of the plurality of first reference patterns generated by the first reference pattern generation device, and detects the angle of the picture related to the pixel to be interpolated on the basis of the results of the comparison, a maximal/minimal pattern generation device that generates, in a predetermined detection region including a plurality of scanning lines and the pixel to be interpolated in the inputted video signal, a maximal/minimal pattern representing the position of a maximal point or a minimal point in a luminance distribution in a horizontal direction for each of the scanning lines, a second reference pattern generation device that generates a plurality of second reference patterns each representing the position of the maximal point or the minimal point in the luminance distribution in the horizontal direction for each of the scanning lines in the detection region, and a second comparison device that compares the maximal/minimal pattern generated by the maximal/minimal pattern generation device with each of the plurality of second reference patterns generated by the second reference pattern generation device, and detects the angle of the picture related to the pixel to be interpolated on the basis of the results of the comparison.

In the scanning lines interpolation equipment according to the present invention, the angle of the picture related to the pixel to be interpolated is accurately detected on the basis of the video signal inputted by the picture angle detection equipment, the pixels used for the interpolation processing are selected on the basis of the angle detected by the picture angle detection device, and the value of the pixel to be interpolated is calculated using the pixels selected by the interpolation circuit, to generate the interpolation scanning lines.

Scanning lines interpolation equipment according to a still further aspect of the present invention comprises picture angle detection equipment that detects the angle of a picture related to a pixel to be interpolated on the basis of an inputted video signal according to a still further aspect of the present invention; and an interpolation circuit that selects pixels used for interpolation processing on the basis of the angle detected by the picture angle detection equipment, and calculates the value of the pixel to be interpolated using the selected pixels, to generate interpolation scanning lines. The picture angle detection equipment comprises a binary pattern generation device that binarizes the inputted video signal in a predetermined detection region including a plurality of scanning lines and the pixel to be interpolated, to generate a binary pattern, a determination angle pattern generation device that generates a plurality of binary pictures each having a specified direction as a plurality of determination angle patterns, a primary determination angle detection device that compares the binary pattern generated by the binary pattern generation device with each of the plurality of determination angle patterns generated by the determination angle pattern generation device, and detects the angle of the picture related to the pixel to be interpolated as a primary determination angle on the basis of the results of the comparison, a candidate pattern generation device that generates a plurality of binary pictures each having a plurality of arbitrary directions as a plurality of candidate patterns, a candidate detection device that compares the binary pattern generated by the binary pattern generation device with each of the plurality of candidate patterns generated by the candidate pattern generation device, and detects whether or not the pixel to be interpolated is a candidate pixel at which the angle of the picture can be determined on the basis of the results of the comparison, and a secondary determination angle detection device that outputs, when the primary determination angle detection device detects the primary determination angle, the primary determination angle detected by the primary determination angle detection device as the angle of the picture related to the pixel to be interpolated, searching, when the candidate detection device detects that the pixel to be interpolated is a candidate pixel, for the other pixel having the primary determination angle in a predetermined range adjacent to the pixel to be interpolated, to output, when the other pixel having the primary determination angle exists in the predetermined range, the primary determination angle related to the other pixel as the angle of the picture related to the pixel to be interpolated.

In the scanning lines interpolation equipment according to the present invention, the angle of the picture related to the pixel to be interpolated is accurately detected on the basis of the video signal inputted by the picture angle detection equipment, the pixels used for the interpolation processing are selected on the basis of the angle detected by the picture angle detection device, and the value of the pixel to be interpolated is calculated using the selected pixels, to generate the interpolation scanning lines.

BRIEF DESCRIPTION OF DRAWINGS

FIG. 1 is a block diagram showing the configuration of picture angle detection equipment in a first embodiment of the present invention.

FIG. 2 is a diagram showing an example of a binary pattern outputted from a binarizer shown in FIG. 1.

FIG. 4 is a schematic view showing an example of a reference pattern generated by a reference pattern generator shown in FIG. 1.

FIG. 6 is a schematic view showing an example of a reference pattern generated by the reference pattern generator shown in FIG. 1.

FIG. 10 is an explanatory view for explaining the continuity of interpolation pixels.

FIG. 17 is a schematic view showing an example of a determination angle reference pattern generated by a determination angle reference pattern generator shown in FIG. 16.

FIG. 19 is a schematic view showing an example of a determination angle reference pattern generated by the determination angle reference pattern generator shown in FIG. 16.

FIG. 20 is a schematic view showing an example of a determination angle reference pattern generated by the determination angle reference pattern generator shown in FIG. 16.

FIG. 21 is a schematic view showing an example of a candidate reference pattern generated by a candidate reference pattern generator shown in FIG. 16.

FIG. 22 is a schematic view showing an example of a candidate reference pattern generated by the candidate reference pattern generator shown in FIG. 16.

FIG. 31 is a schematic view for explaining a conventional method of detecting a diagonal edge by binarization and comparison with a reference pattern.

FIG. 34 is a schematic view showing another example of a reference pattern generated by a reference pattern generator.

FIG. 35 is a schematic view showing another example of a reference pattern generated by a reference pattern generator.

Figure 3:
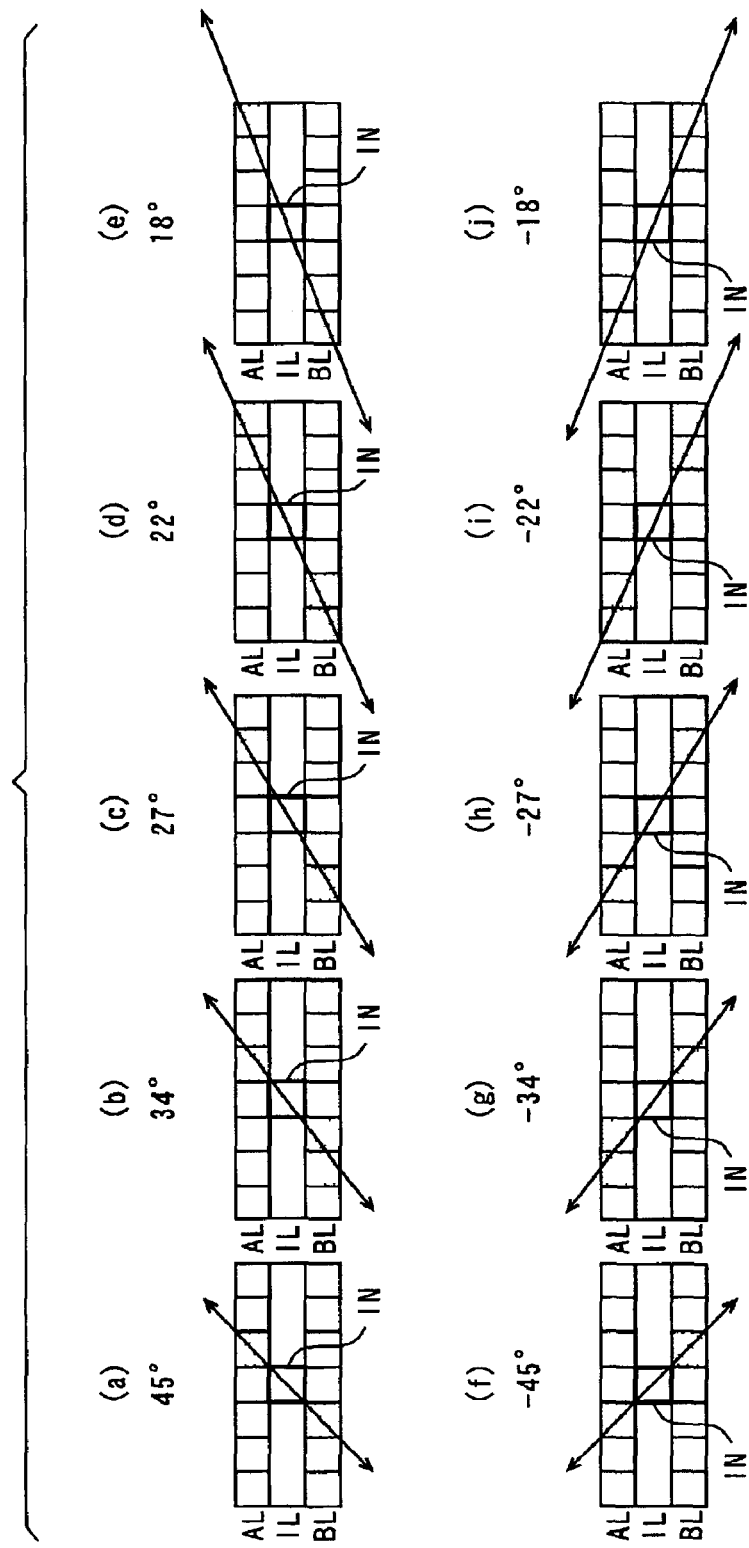
FIG. 3 is a schematic view for explaining the relationship between the angle of a diagonal edge of a picture and pixels used for interpolation processing.

BEST MODE FOR CARRYING OUT THE INVENTION (1) First Embodiment

FIG. 1 is a block diagram showing the configuration of picture angle detection equipment in a first embodiment of the present invention.

Picture angle detection equipment 10a shown in FIG. 1 comprises line memories 1a, 1b, and 1c, a binarizer 2, a first pattern matching angle detector 3, a detected isolation point remover 4, a detection window video signal processor 5, a reference pattern generator 6a, an upper line maximal/minimal detector 7a, a lower line maximal/minimal detector 8a, and an A/D (analog-to-digital) converter 12.

The A/D converter 12 subjects an analog video signal AV to analog-to-digital conversion, to output a digital video signal VD1. The video signal VD1 outputted from the A/D converter 12 is inputted to the line memory 1a, the binarizer 2, the detection window video signal processor 5, and the lower line maximal/minimal detector 8a. The line memory 1a delays the video signal VD1 outputted from the A/D converter 12 by one line (one scanning line), to output a video signal VD2. The video signal VD2 outputted from the line memory 1a is fed to the binarizer 2, the detection window video signal processor 5, and the upper line maximal/minimal detector 7a.

In this example, each of the video signals VD1 and VD2 shall have a luminance on 256 gray scales. That is, the minimum value of the luminance of each of the video signals VD1 and VD2 is "0", and the maximum value thereof is "255".

The binarizer 2 binarizes the video signal VD1 outputted from the A/D converter 12 and the video signal VD2 outputted from the line memory 1a using an average luminance value LU fed from the detection window video signal processor 5, described later, as a threshold value, to output a binary pattern BI composed of "1" and "0". The binary pattern BI has the size of a detection window.

Here, the detection window is a rectangular region composed of 7 by 2 pixels including seven pixels in the video signal VD1 and seven pixels in the video signal VD2 and a rectangular region composed of 15 by 2 pixels including 15 pixels in the video signal VD1 and 15 pixels in the video signal VD2, for example. In the following description, the size of the detection window shall be 7 by 2 pixels. In this case, the size of the binary pattern BI is 7 by 2 pixels.

The detection window video signal processor 5 sets the detection window in the inputted video signal VD1 and the video signal VD2 outputted from the line memory 1a, calculates the average value of the luminance of each of the video signals VD1 and VD2 in the detection window, and feeds an average luminance value LU as a threshold value for binarization to the binarizer 2.

Although in the present embodiment, the average value of the luminances of all the pixels in the detection window is used as a threshold value for binarization, the present invention is not limited to the same. The average value of the maximum and the minimum of the values of the pixels in the detection window may be used as a threshold value for binarization, a center value in a case where the luminances are arranged in the order of magnitude may be used as a threshold value for binarization, or the average value of a plurality of pixels whose values are close to the center value in the case where the luminances are arranged in the order of magnitude, for example, may be used as a threshold value for binarization.

The detection window video signal processor 5 may judge whether a luminance distribution in a horizontal direction in each of the video signals VD1 and VD2 in the detection window is monotonously increased or monotonously decreased, to feed the minimum value "0" or the maximum value "255" as a threshold value to the binarizer 2 when the luminance distribution is neither monotonously increased nor monotonously decreased. Consequently, the binarizer 2 outputs a binary pattern BI all composed of "1" or "0". In this case, the difference between the two adjacent pixels in each of the video signals VD1 and VD2 can be calculated, to judge that the luminance distribution is monotonously increased or monotonously decreased if the respective plus or minus signs of the difference values successively calculated are the same.

Furthermore, the detection window video signal processor 5 calculates the difference between the maximum value and the minimum value of the luminance of each of the video signals VD1 and VD2 in the detection window as a contrast, to feed the minimum value "0" or the maximum value "255" as a threshold value to the binarizer 2 when the calculated contrast is lower than a predetermined value. Consequently, the binarizer 2 outputs the binary pattern BI all composed of "1" or "0".

The upper line maximal/minimal detector 7a judges whether or not a maximal point or a minimal point exists in the luminance distribution in the horizontal direction in the video signal VD2 outputted from the line memory 1a, to feed the results of the judgment to the first pattern matching angle detector 3. The lower line maximal/minimal detector 8a judges whether or not a maximal point or a minimal point exists in the luminance distribution in the horizontal direction in the inputted video signal VD1, to feed the results of the judgment to the first pattern matching angle detector 3.

The reference pattern generator 6a generates a plurality of reference patterns RA each composed of "1" and "0", to feed the generated reference patterns RA to the first pattern matching angle detector 3. The size of each of the reference patterns RA is equal to the size of the detection window.

The first pattern matching angle detector 3 compares the binary pattern BI fed from the binarizer 2 with each of the plurality of reference patterns RA fed from the reference pattern generator 6a, to output the identification signal and the angle of the reference pattern RA which matches with the binary pattern BI as angle information PA. The angle and the identification signal will be described later.

A comparison operation between the binary pattern BI and each of the reference patterns RA is hereinafter referred to as first pattern matching.

When both the respective luminance distributions in the video signal VD1 and the video signal VD2 in the detection window are neither monotonously increased nor monotonously decreased, as described above, the binary pattern BI all composed of "1" and "0" may be outputted from the binarizer 2. In this case, the angle information PA is not outputted from the first pattern matching angle detector 3.

In the case of a picture having a thin diagonal line, a maximal value or a minimal value appears out of the values of the pixels in the detection window. Therefore, the monotonous increase or the monotonous decrease is judged when the picture having the thin diagonal line is not considered, while not being judged when the picture having the thin diagonal line is considered.

When the contrast in each of the video signals VD1 and VD2 in the detection window is lower than the predetermined value, the binary pattern BI all composed of "1" or "0" is outputted from the binarizer 2. Accordingly, the angle information PA is not outputted from the first pattern matching angle detector 3.

When the contrast in each of the video signals VD1 and VD2 is low, the effect of interpolation processing using pixels in diagonal directions is low. In the interpolation processing using the pixels in diagonal directions, noise may, in some cases, be produced unless an accurate angle is detected. When the effect is low, therefore, the angle information PA is not outputted such that the interpolation processing using the pixels in diagonal directions is not performed.

Furthermore, when the upper line maximal/minimal detector 7a or the lower line maximal/minimal detector 8a detects that a maximal point or a minimal point exists in the luminance distribution in the video signal VD1 or the video signal VD2 in the detection window, the first pattern matching angle detector 3 does not perform the first pattern matching. Consequently, the angle information PA may not be outputted.

The detected isolation point remover 4 judges, with respect to a scanning line including an object interpolation pixel (hereinafter referred to as an interpolation scanning line), whether or not angle information PA related to an interpolation scanning line one line above the interpolation scanning line and angle information PA related to an interpolation scanning line one line below the interpolation scanning line match with each other, to output, when they match with each other, the angle information PA outputted from the first pattern matching angle detector 3 as an angle signal AN, while not outputting, when they do not match with each other, the angle information PA outputted from the first pattern matching angle detector 3.

In the present embodiment, the binarizer 2 corresponds to a binary pattern generation device, the reference pattern generator 6a corresponds to a reference pattern generation device, and the first pattern matching angle detector 3 corresponds to a comparison device. The detection window video signal processor 5 corresponds to an average luminance calculation device, a first judgment device, and a contrast detection device, the binarizer 2 corresponds to a binarization device, and the upper line maximal/minimal detector 7*a* and the lower line maximal/minimal detector 8*a* constitute a second judgment device. Further, the detected isolation point remover 4 corresponds to a continuity detection device.

FIG. 2 is a schematic view showing an example of the binary pattern BI outputted from the binarizer 2 shown in FIG. 1.

In FIG. 2, IN indicates an interpolation pixel, and IL indicates an interpolation scanning line. Further, AL indicates a scanning line above the interpolation scanning line IL, and BL indicates a scanning line below the interpolation scanning line IL.

In the example shown in FIG. 2, a portion having a low luminance (a dark portion) is indicated by "0", and a portion having a high luminance (a bright portion) is indicated by "1". In the binary pattern BI, the angle of an edge of a picture is 45°. Here, an angle in a horizontal direction is taken as 0, and an angle in a direction diagonally upward toward the right is taken as the positive.

FIG. 3 is a schematic view for explaining the relationship between the angle of a diagonal edge of a picture and pixels used for interpolation processing.

FIGS. 3(*a*), 3(*b*), 3(*c*), 3(*d*), and 3(*e*) respectively illustrate cases where the angle of the edge of the picture is 45°, 34°, 27°, 22°, and 18°, and FIGS. 3(*f*), 3(*g*), 3(*h*), 3(*i*), and 3(*j*) respectively illustrate cases where the angle of the edge of the picture is −45°, −34°, −27°, −22°, and −18°. Here, an angle in a horizontal direction is taken as zero, an angle in a direction diagonally upward toward the right is taken as the positive, and an angle in a direction diagonally upward toward the left is taken as the negative.

In FIG. 3, crosshatched pixels are pixels on upper and lower scanning lines AL and BL used for calculating the value of an interpolation pixel IN. When the angle of the edge of the picture is 45°, as shown in FIG. 3(*a*), for example, the value of the interpolation pixel IN is calculated using one pixel in a diagonally upward direction at an angle of 45° and one pixel in a diagonally downward direction at an angle of 45°. When the angle of the edge of the picture is 34°, as shown in FIG. 3(*b*), the value of the interpolation pixel IN is calculated using two pixels in a diagonally upward direction at an angle of 34° and two pixels in a diagonally downward direction at an angle of 34°.

FIGS. 4, 5, 6, and 7 are schematic views each showing an example of the reference pattern generated by the reference pattern generator 6*a* shown in FIG. 1. Crosshatched pixels are pixels on upper and lower scanning lines which are used for calculating the value of an interpolation pixel indicated by a thick line.

Figure 4:
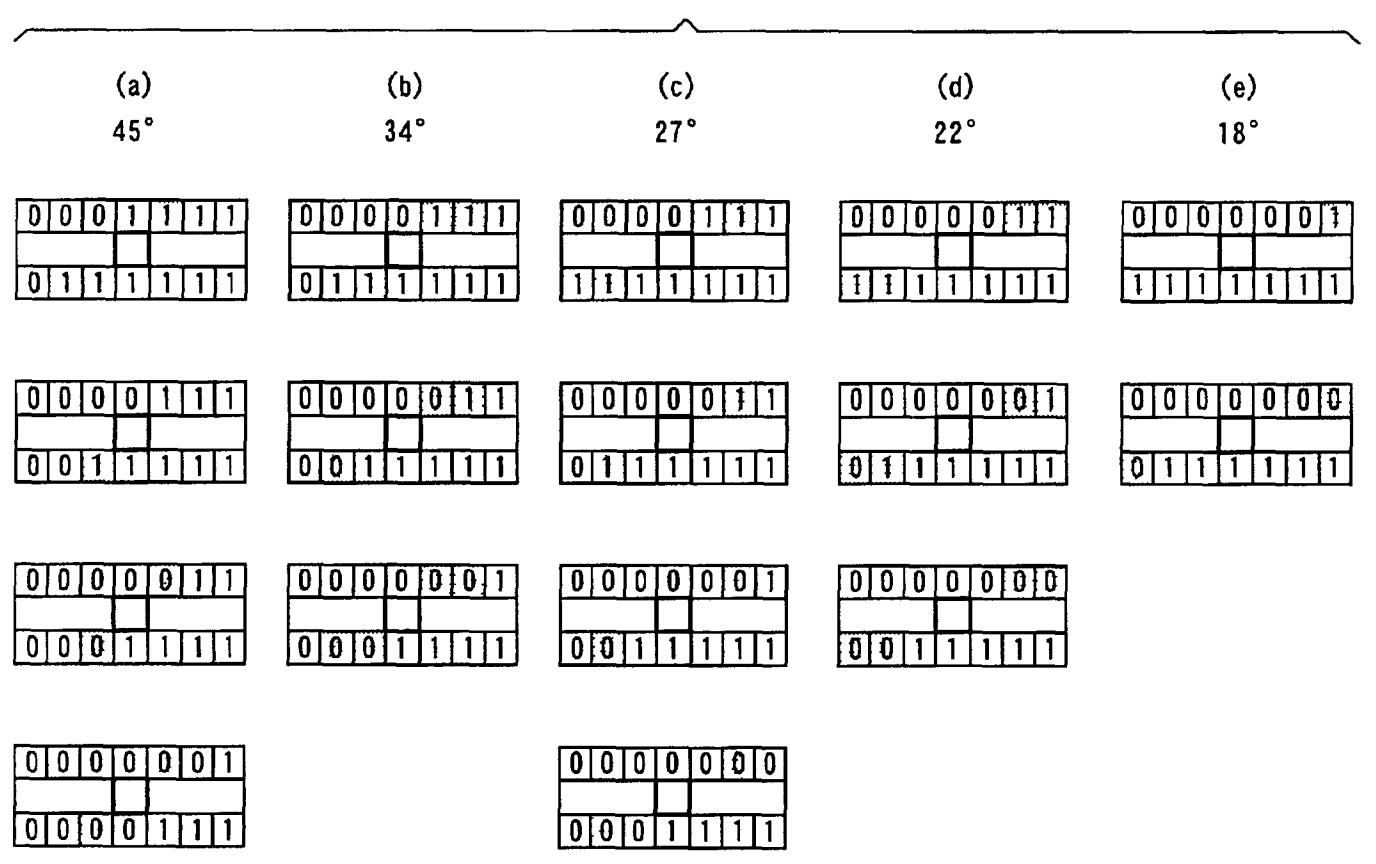
Figure 5:
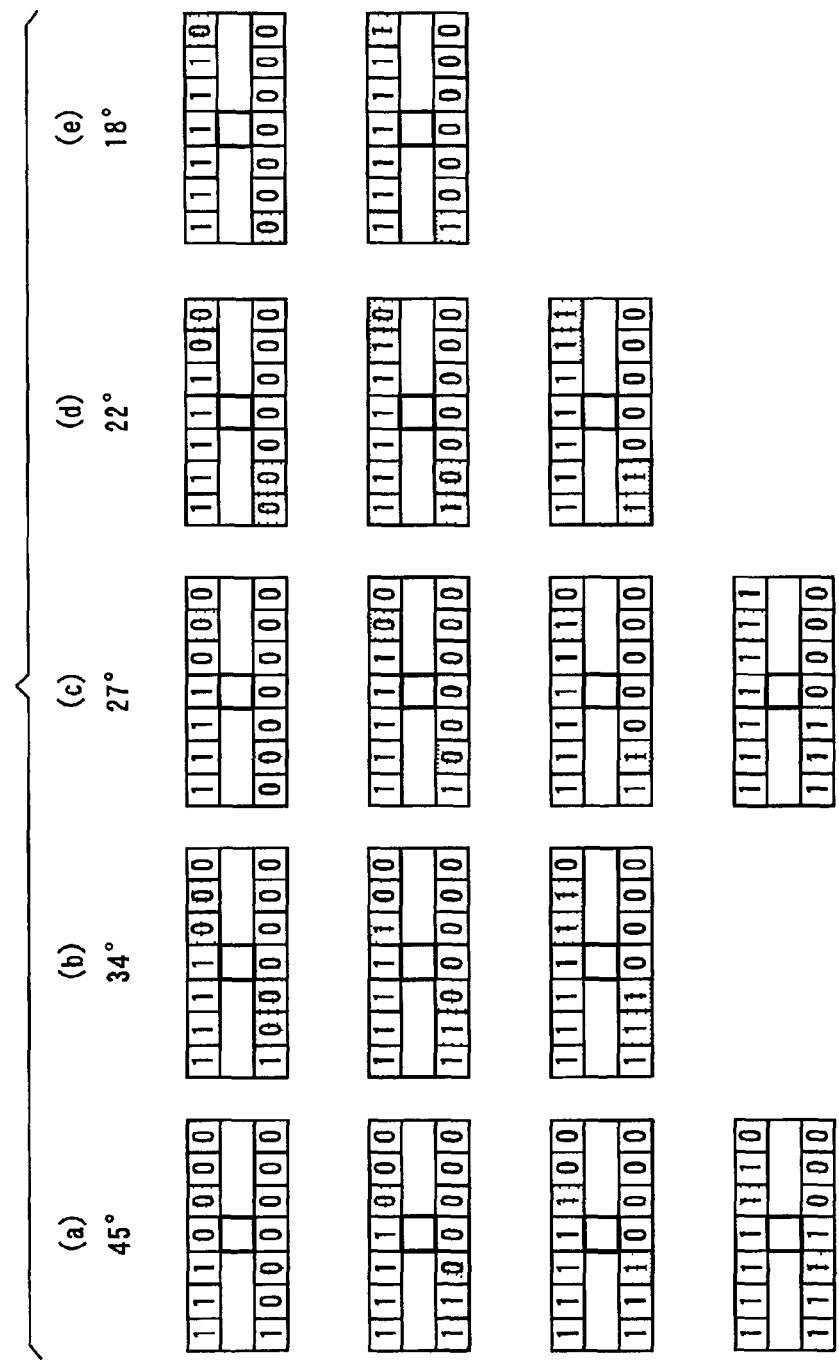
FIG. 5 is a schematic view showing an example of a reference pattern generated by the reference pattern generator shown in FIG. 1.

FIGS. 4(*a*), 4(*b*), 4(*c*), 4(*d*), and 4(*e*) respectively illustrate reference patterns having angles of 45°, 34°, 27°, 22°, and 18°. In the example shown in FIG. 4, an upper left portion is a dark portion, and a lower right portion is a bright portion. FIGS. 5(*a*), 5(*b*), 5(*c*), 5(*d*), and 5(*e*) respectively illustrate reference patterns having angles of 45°, 34°, 27°, 22°, and 18°. In the example shown in FIG. 5, an upper left portion is a bright portion, and a lower right portion is a dark portion.

Figure 6:
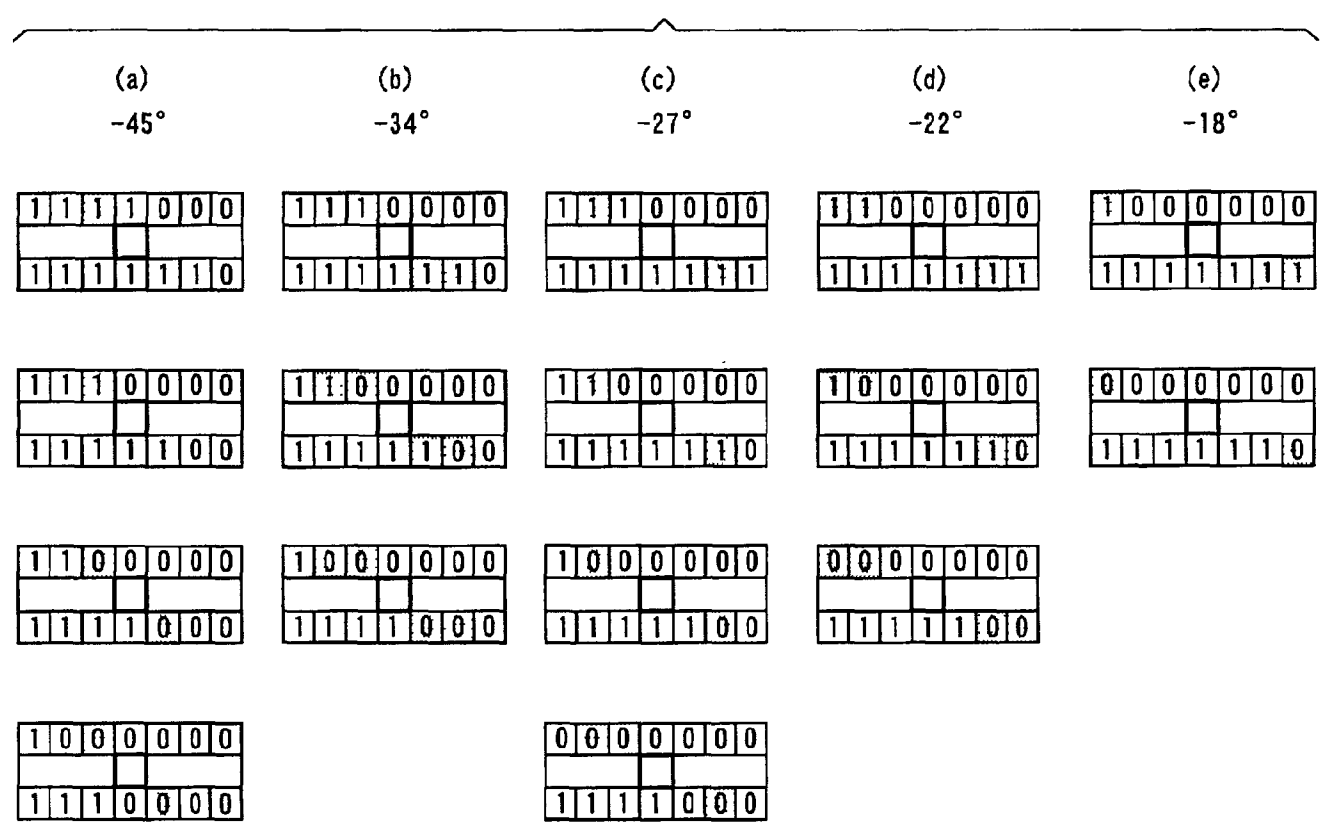
Figure 7:
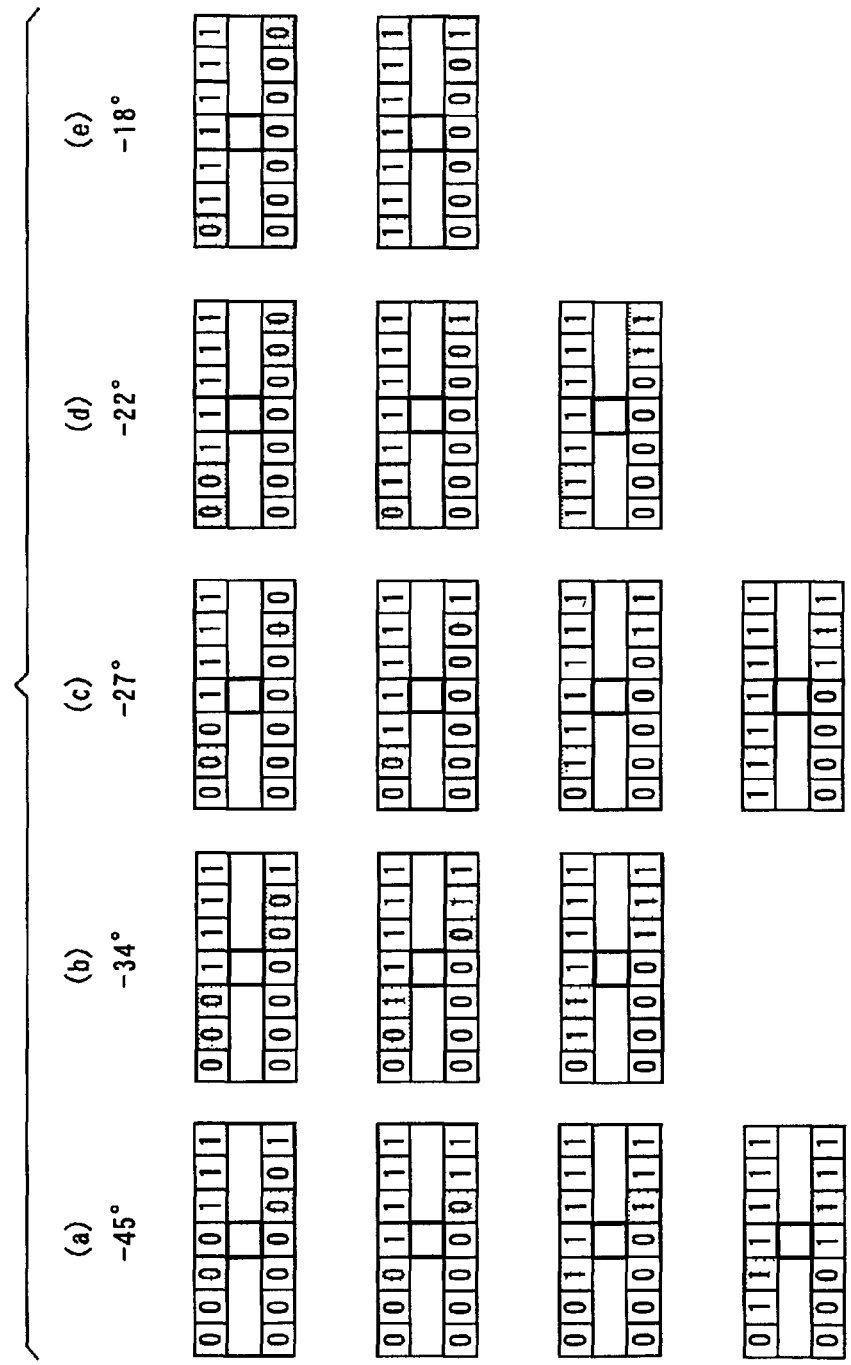
FIG. 7 is a schematic view showing an example of a reference pattern generated by the reference pattern generator shown in FIG. 1.

FIGS. 6(*a*), 6(*b*), 6(*c*), 6(*d*), and 6(*e*) respectively illustrate reference patterns having angles of −45°, −34°, −27°, −22°, and −18°. In the example shown in FIG. 6, an upper right portion is a dark portion, and a lower left portion is a bright portion. FIGS. 7(*a*), 7(*b*), 7(*c*), 7(*d*), and 7(*e*) respectively illustrate reference patterns having angles of −45°, −34°, −27°, −22°, and −18°. In the example shown in FIG. 7, an upper right portion is a bright portion, and a lower left portion is a dark portion.

In the first pattern matching angle detector 3, the reference patterns shown in FIGS. 4 to 7 is compared with a binary pattern BI output from the binarizer 2. In this case, the first pattern matching angle detector 3 determines the identification signal identifying any one reference pattern shown in FIGS. 4 to 7, according to the binary pattern BI, and the angle. This identification signal shows whether the angle is positive or negative, whether an upper left portion is a bright portion or not, whether a lower left portion is a bright potion or not, whether an upper right portion is a bright portion or not and whether a lower right portion is a bright portion or not.

As shown in FIGS. 4 to 7, in the reference patterns based on the two-dimensional luminance distribution, not only the angles of straight lines each connecting the pixels at positions of point symmetry, centered at the interpolation pixel but also angles among the angles can be set. For example, 34° and 22° which are angles among 45°, 27°, and 18° can be set.

For example, the binary pattern BI shown in FIG. 2 matches with one of the four reference patterns shown in FIG. 5(*a*). In this case, the first pattern matching angle detector 3 shown in FIG. 1 outputs an identification signal identifying the reference pattern of FIG. 5(*a*) and an angle representing 45° as angle information PA.

Figure 8:
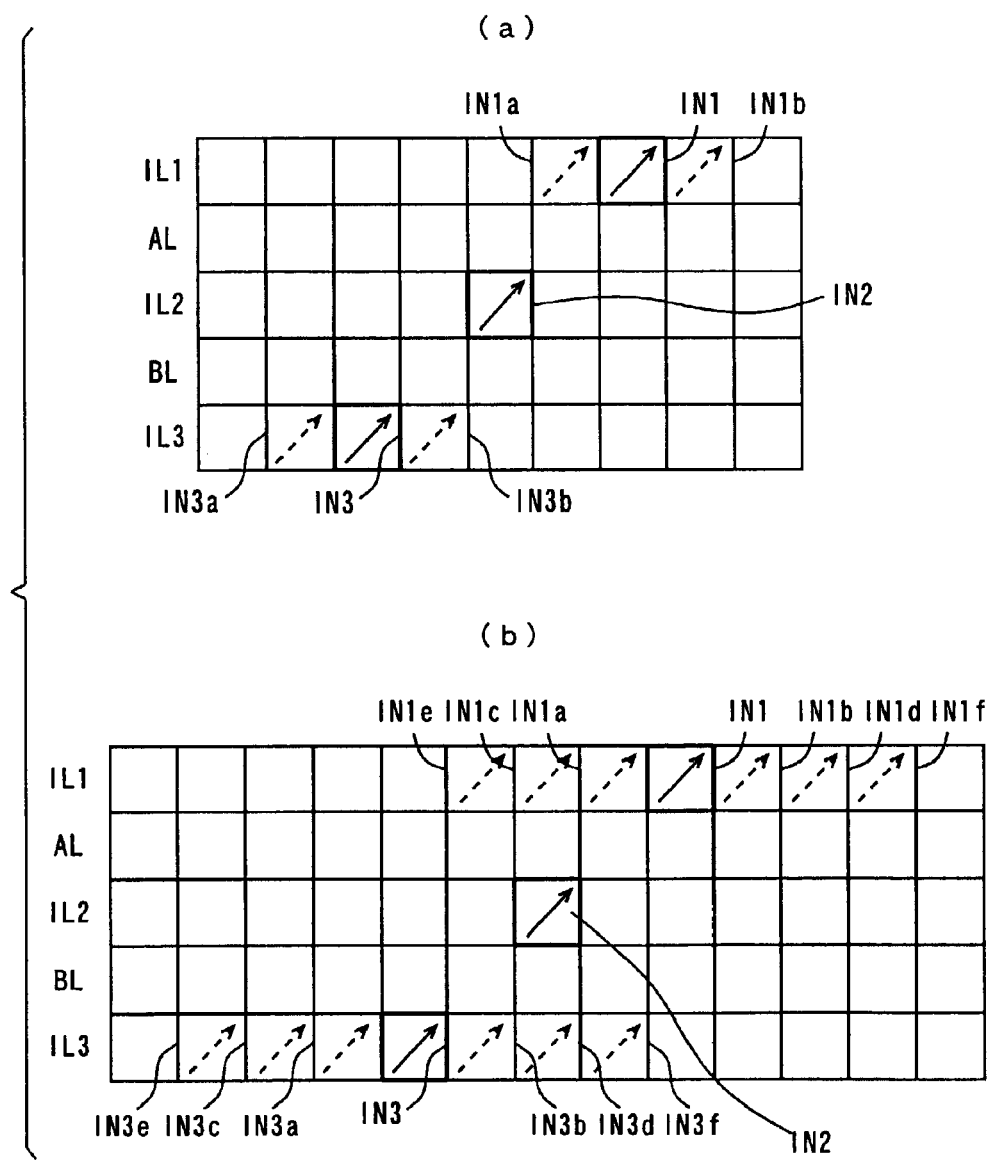
FIG. 8 is a schematic view for explaining processing of a detected isolation point remover shown in FIG. 1.

FIG. 8 is a schematic view for explaining processing of the detected isolation point remover 4 shown in FIG. 1. In FIGS. 8(*a*) and 8(*b*), IN1, IN2, and IN3 indicate interpolation pixels, IL1, IL2, and IL3 indicate interpolation scanning lines, and AL and BL indicate scanning lines.

The interpolation pixel IN2 on the interpolation scanning line IL2 is taken as an object of processing. When the angle information including the angle 45° with respect to the interpolation pixel IN2 and the identification signal identifying the reference pattern of FIG. 5(*a*)is detected by the first pattern matching angle detector 3, as shown in FIG. 8(*a*), the detected isolation point remover 4 judges whether or not both angle information with respect to the interpolation pixels IN1 and IN3, which are in the direction determined with respect to the interpolation pixel IN2 by the angle information PA, on the upper and lower interpolation. scanning lines IL1 and IL3 match with the angle information PA. When both the angle information with respect to the interpolation pixels IN1 and IN3 match with the angle information PA, the detected isolation point remover 4 considers that the angle of the diagonal edge of the picture is continuous, to output the angle information PA outputted from the first pattern matching angle detector 3 as an angle signal AN. When at least one of the angle information with respect to the interpolation pixels IN1 and IN3 does not match with the angle information PA, the detected isolation point remover 4 considers that the angle of the diagonal edge of the picture is not continuous, not to output the angle information PA outputted from the first pattern matching angle detector 3.

The detected isolation point remover 4 may be so constructed that the angle information PA outputted from the first pattern matching angle detector 3 is outputted as the angle signal AN in a case where at least one of the angle information with respect to the interpolation pixels IN1 and IN3 matches with the angle information PA, while not being outputted as the angle signal AN in a case where neither of the angle information with respect to the interpolation pixels IN1 and IN3 match with the angle information PA.

As shown in arrows indicated by a dotted line in FIG. 8(a), the detected isolation point remover 4 may be so constructed that the angle information PA outputted from the first pattern matching angle detector 3 is outputted as the angle signal AN in a case where angle information with respect to the interpolation pixel IN1 or at least one of interpolation pixels IN1a and IN1b on both sides thereof matches with the angle information PA and a case where angle information with respect to the interpolation pixel IN3 or at least one of interpolation pixels IN3a and IN3b on both sides thereof matches with the angle information PA. Further, the detected isolation point remover 4 may be so constructed that the angle information PA outputted from the first pattern matching angle detector 3 is outputted as the angle signal AN in the case where the angle information with respect to the interpolation pixel IN1 or at least one of the interpolation pixels IN1a and IN1b on both sides thereof matches with the angle information PA, or the detected isolation point remover 4 may be so constructed that the angle information PA outputted from the first pattern matching angle detector 3 is outputted as the angle signal AN in the case where the angle information with respect to the interpolation pixel IN3 or at least one of the interpolation pixels IN3a and IN3b on both sides thereof matches with the angle information PA.

Furthermore, as shown in FIG. 8(b), the detected isolation point remover 4 may be so constructed that the angle information PA outputted from the first pattern matching angle detector 3 is outputted as the angle signal AN in a case where angle information with respect to at least one of a plurality of interpolation pixels IN1a to IN1f on both sides of an interpolation pixel IN1 matches with the angle information PA and a case where angle information with respect to at least one of a plurality of interpolation pixels IN3a to IN3f on both sides of an interpolation pixel IN3 matches with the angle information PA. Further, the detected isolation point remover 4 may be so constructed that the angle information PA outputted from the first pattern matching angle detector 3 is outputted as the angle signal AN in the case where the angle information with respect to at least one of the plurality of interpolation pixels IN1a to IN1f on both sides of the interpolation pixel IN1 matches with the angle information PA, or the detected isolation point remover 4 may be so constructed that the angle information PA outputted from the first pattern matching angle detector 3 is outputted as the angle signal AN in the case where the angle information with respect to at least one of the plurality of interpolation pixels IN3a to IN3f on both sides of the interpolation pixel IN3 matches with the angle information PA Furthermore, although description was made, assuming that the detected isolation point remover 4 is so constructed as to output the angle information PA outputted from the first pattern matching angle detector 3 as the angle signal AN only when the angle with respect to the interpolation pixel coincides with the angles with respect to the interpolation pixels on the upper and lower scanning lines, the present invention is not limited to the same. The detected isolation point remover 4 may be so constructed as to output the angle information PA outputted from the first pattern matching angle detector 3 as the angle signal AN when the difference between an angle with respect to an object interpolation pixel and the angle with respect to the interpolation pixels on the upper and lower scanning line is within a predetermined range. When the angle information with respect to the object interpolation pixel represents the angle 27°, for example, the detected isolation point remover 4 may be so constructed as to output the angle information PA outputted from the first pattern matching angle detector 3 as the angle signal AN in a case where the angle information with respect to the interpolation pixels on the upper and lower scanning line is within a range of 18° to 45°, and represents the same identification signal. Further, when the angle information with respect to the object interpolation pixel represents the angle 34°, the detected isolation point remover 4 may be so constructed as to output the angle information PA outputted from the first pattern matching angle detector 3 as the angle signal AN in a case where the angle information with respect to the interpolation pixels on the upper and lower scanning line is within a range of 22° to 45° and represents the same identification signal. Further, the above-mentioned predetermined range may differ depending on the angle to the object interpolation pixel.

In the picture angle detection equipment 10a according to the present embodiment, the luminance distribution in each of the video signals VD1 and VD2 in the detection window is converted into the binary pattern BI, and pattern matching between the binary pattern BI and the plurality of reference patterns RA previously set is performed, thereby making it possible to detect the angle of the diagonal edge of the picture on a small circuit scale.

In this case, the average luminance value in the detection window is used as a threshold value for binarization. Accordingly, the binary pattern BI including both "0" and "1" can be always generated without setting the threshold value for binarization from the exterior and irrespective of the luminance level of the picture.

The pattern matching based on the two-dimensional luminance distribution is performed. Accordingly, erroneous detection is restrained, as compared with that in a case where a difference value between two pixels is used, thereby making it possible to accurately detect the angle of the diagonal edge of the picture.

Furthermore, by using the reference pattern RA based on the two-dimensional luminance distribution, angles to be detected are not limited to the angles of straight lines each connecting the pixels at positions of point symmetry, centered at the interpolation pixel. For example, angles among the angles can be also detected. Consequently, it is possible to detect the angle with finer spacing using the line memory 1a having a small capacity.

When the detected angle of the diagonal edge of the picture has no continuity, the angle information PA is removed by the detected isolation point remover 4, thereby making it possible to prevent erroneous detection by noise.

(2) Second Embodiment

Figure 9:
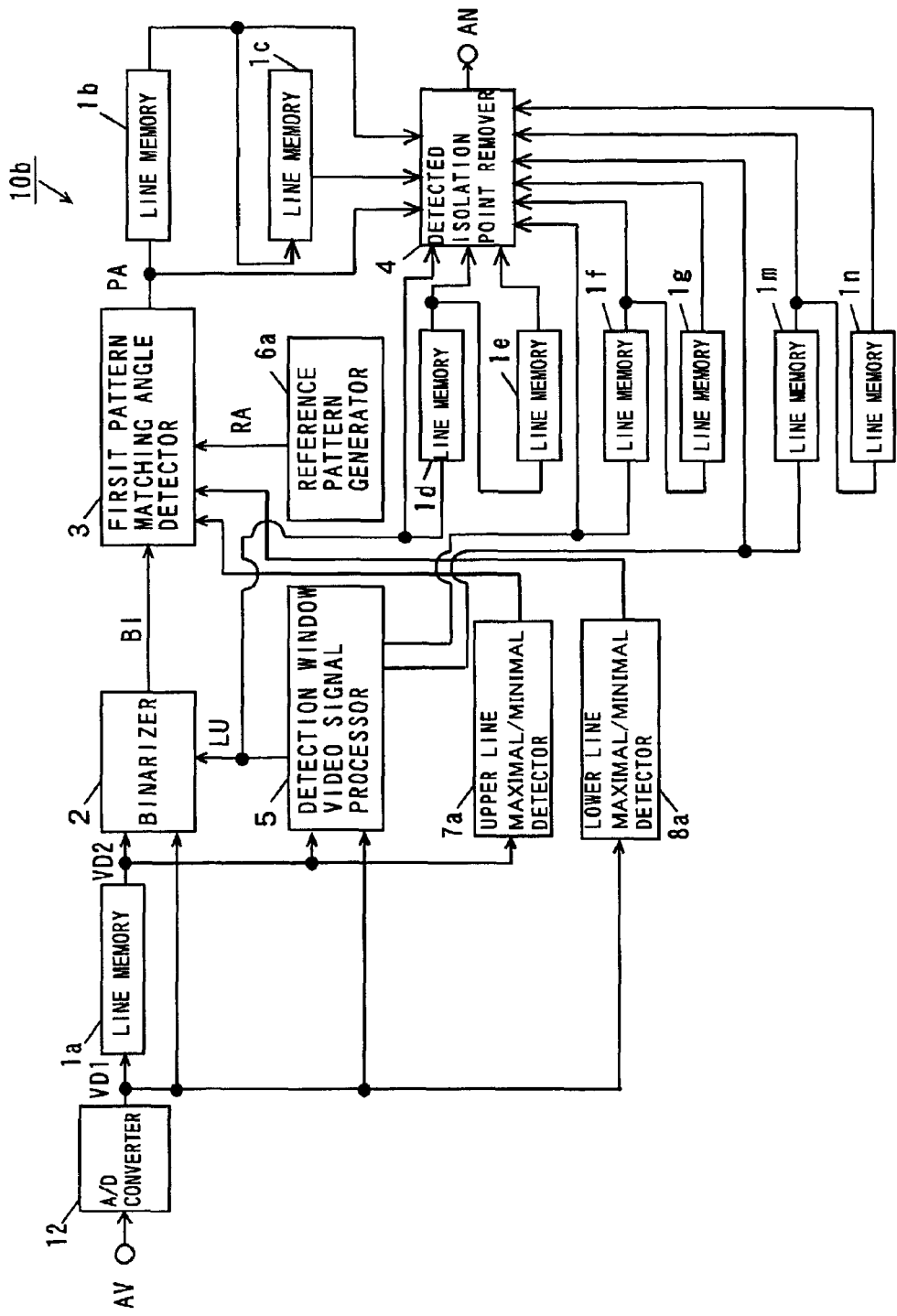
FIG. 9 is a block diagram showing the configuration of picture angle detection equipment in a second embodiment of the present invention.

FIG. 9 is a block diagram showing the configuration of picture angle detection equipment in a second embodiment of the present invention.

The configuration of the picture angle detection equipment in the second embodiment of the present invention is the same as the configuration of the picture angle detection equipment in the first embodiment except for the following.

Picture angle detection equipment 10b shown in FIG. 9 comprises line memories 1a to 1g, 1m, and 1n, a binarizer 2, a first pattern matching angle detector 3, a detected isolation point remover 4, a detection window video signal processor 5, a reference pattern generator 6a, an upper line maximal/minimal detector 7a, a lower line maximal/minimal detector 8a, and an A/D (analog-to-digital) converter 12.

The A/D converter 12 subjects an analog video signal AV to analog-to-digital conversion, to output a digital video signal VD1. The video signal VD1 outputted from the A/D converter 12 is inputted to the line memory 1a, the binarizer 2, the detection window video signal processor 5, and the lower line maximal/minimal detector 8a. The line memory 1a delays the video signal VD1 outputted from the A/D converter 12 by one line (one scanning line), to output a video signal VD2. The video signal VD2 outputted from the line memory 1a is fed to the binarizer 2, the detection window video signal processor 5, and the upper line maximal/minimal detector 7a.

In this example, each of the video signals VD1 and VD2 shall have a luminance on 256 gray scales. That is, the minimum value of the luminance of each of the video signals VD1 and VD2 is "0", and the maximum value thereof is "255".

The binarizer 2 binarizes the video signal VD1 outputted from the A/D converter 12 and the video signal VD2 outputted from the line memory 1a using an average luminance value LU fed from the detection window video signal processor 5, described later, as a threshold value, to output a binary pattern BI composed of "1" and "0". The binary pattern BI has the size of a detection window.

Here, the detection window is a rectangular region composed of 7 by 2 pixels including seven pixels in the video signal VD1 and seven pixels in the video signal VD2 and a rectangular region composed of 15 by 2 pixels including 15 pixels in the video signal VD1 and 15 pixels in the video signal VD2, for example. In the following description, the size of the detection window shall be 7 by 2 pixels. In this case, the size of the binary pattern BI is 7 by 2 pixels.

The detection window video signal processor 5 sets the detection window in the inputted video signal VD1 and the video signal VD2 outputted from the line memory 1a, calculates the average value of the luminance of each of the video signals VD1 and VD2 in the detection window, and feeds an average luminance value LU as a threshold value for binarization to the binarizer 2, the detected isolation point remover 4, and the line memory 1d.

The detection window video signal processor 5 calculates the maximum value and the minimum value of each of the video signals VD1 and VD2 in the detection window, to give the maximum value to the detected isolation point remover 4 and the line memory 1f and to give the minimum value to the detected isolation point remover 4 and the line memory 1m.

Although in the present embodiment, the average value of the luminances of all the pixels in the detection window is also used as a threshold value for binarization, the present invention is not limited to the same. The average value of the maximum and the minimum of the values of the pixels in the detection window may be used as a threshold value for binarization, a center value in a case where the luminances are arranged in the order of magnitude may be used as a threshold value for binarization, or the average or the like of a plurality of pixels whose values are close to the center value in the case where the luminances are arranged in the order of magnitude, for example, may be used as a threshold value for binarization.

The line memory 1d delays the threshold value outputted from the detection window video signal processor 5 by one line (one scanning line), to output the delayed threshold value to the line memory 1e and the detected isolation point remover 4. The line memory 1e further delays the threshold value outputted from the line memory 1d by one line (one scanning line), to output the delayed threshold value to the detected isolation point remover 4.

The line memory 1f delays the maximum value outputted from the detection window video signal processor 5 by one line (one scanning line), to output the delayed maximum value to the line memory 1g and the detected isolation point remover 4. The line memory 1g further delays the maximum value outputted from the line memory 1f by one line (one scanning line), to output the delayed maximum value to the detected isolation point remover 4.

The line memory 1m delays the minimum value outputted from the detection window video signal processor 5 by one line (one scanning line), to output the delayed minimum value to the line memory in and the detected isolation point remover 4. The line memory in further delays the minimum value outputted from the line memory 1m by one line (one scanning line), to output the delayed minimum value to the detected isolation point remover 4.

The detected isolation point remover 4 judges, with respect to a scanning line including an object interpolation pixel (hereinafter referred to as an interpolation scanning line) fed from the line memory 1b, whether or not angle information PA, related to an interpolation scanning line one line above the interpolation scanning line, which is fed from the first pattern matching angle detector 3, and angle information PA, related to an interpolation scanning line one line below the interpolation scanning line, which is fed from the line memory 1c coincide with each other.

The detected isolation point remover 4 judges, with respect to a scanning line including an object interpolation pixel (hereinafter referred to as an interpolation scanning line) fed from the line memory 1d, whether or not a threshold value LU, related to an interpolation scanning line one line above the interpolation scanning line, which is fed from the detection window video signal processor 5, and a threshold value, related to an interpolation scanning line one line below the interpolation scanning line, which is fed from the line memory 1e coincide with each other.

The detected isolation point remover 4 judges, with respect to a scanning line including an object interpolation pixel (hereinafter referred to as an interpolation scanning line) fed from the line memory 1f, whether or not a maximum value, on an interpolation scanning line one line above the interpolation scanning line, which is fed from the detection window video signal processor 5, and a maximum value, related to an interpolation scanning line one line below the interpolation scanning line, which is fed from the line memory 1g match with each other.

Furthermore, the detected isolation point remover 4 judges, with respect to a scanning line including an object interpolation pixel (hereinafter referred to as an interpolation scanning line) fed from the line memory 1m, whether or not a minimum value, on an interpolation scanning line one line above the interpolation scanning line, which is fed from the detection window video signal processor 5, and a minimum value, related to an interpolation scanning line one line below the interpolation scanning line, which is fed from the line memory in match with each other.

The continuity of the object interpolation pixels is judged on the basis of the results of the judgment of the angle information, the results of the judgment of the threshold value, and the results of the judgment of the maximum value, and the results of the judgment of the minimum value.

FIG. 10 is an explanatory view for explaining the continuity of interpolation pixels.

In FIG. 10, a detection window for an interpolation pixel IN1 is indicated by A, a detection window for an interpolation pixel IN2 is indicated by B, and a detection window for an interpolation pixel IN3 is indicated by C. Angle information related to the interpolation pixel IN1 is calculated using the detection window A, angle information related to the interpolation pixel IN2 is calculated using the detection window B, and angle information related to the interpolation pixel IN3 is calculated using the detection window C.

A threshold value for binarization is calculated using the values of pixels in the detection window A, a threshold value for binarization is calculated using the values of pixels in the detection window B, and a threshold value for binarization is calculated using the values of pixels in the detection window C.

The maximum of the values of the pixels in the detection window A is calculated, the maximum of the values of the pixels in the detection window B is calculated, and the maximum of the values of the pixels in the detection window C is calculated.

Furthermore, the minimum of the values of the pixels in the detection window A is calculated, the minimum of the values of the pixels in the detection window B is calculated, and the minimum of the values of the pixels in the detection window C is calculated.

In the case of a picture having a diagonal edge which is continuous in a direction of an arrow indicated by a broken line, as shown in FIG. 10, for example, respective angle information related to the interpolation pixels IN1 to IN3 are approximate values, respective maximum values in the detection windows A to C are approximate values, and respective minimum values in the detection windows A to C are approximate values. When the picture is represented on 256 gray scales, for example, ranges of ±10 gray scales, ±20 gray scales, or ±30 gray scales may be set as approximate ranges.

Consequently, the detected isolation point remover 4 outputs the angle information PA outputted from the first pattern matching angle detector 3 as an angle signal AN when the difference between the angle information related to the interpolation pixels IN1 to IN3 is within the approximate range, the difference between the threshold values for binarization related to the detection windows A to C is within the approximate range, the difference between the maximums of the values of the pixels in the detection windows A to C is within the approximate range, and the difference between the minimums of the values of the pixels in the detection windows A to C is within the approximate range.

On the other hand, the detected isolation point remover 4 does not output the angle information PA outputted from the first pattern matching angle detector 3 when at least one of the difference between the angle information related to the interpolation pixels IN1 to IN3, the difference between the threshold values for binarization related to the detection windows A to C, the difference between the maximums of the values of the pixels in the detection windows A to C, and the difference between the minimums of the values of the pixels in the detection windows A to C is not within the approximate range.

Although in the present embodiment, the angle information PA outputted from the first pattern matching angle detector 3 is outputted as the angle signal AN when the difference between the angle information related to the interpolation pixels IN1 to IN3 is within the approximate range, the difference between the threshold values for binarization related to the detection windows A to C is within the approximate range, the difference between the maximums of the values of the pixels in the detection windows A to C is within the approximate range, and the difference between the minimums of the values of the pixels in the detection windows A to C is within the approximate range, the present invention is not limited to the same. For example, the angle information PA outputted from the first pattern matching angle detector 3 may be outputted as the angle signal AN when any one of the difference between the angle information related to the interpolation pixels IN1 to IN3, the difference between the threshold values for binarization related to the detection windows A to C, the difference between the maximums of the values of the pixels in the detection windows A to C, and the difference between the minimums of the values of the pixels in the detection windows A to C is within the approximate range.

In the present embodiment, the binarizer 2 corresponds to a binary pattern generation device, the reference pattern generator 6a corresponds to a reference pattern generation device, and the first pattern matching angle detector 3 corresponds to a comparison device. The detection window video signal processor 5 corresponds to an average luminance calculation device, a first judgment device, and a contrast detection device, the binarizer 2 corresponds to a binarization device, and the upper line maximal/minimal detector 7a and the lower line maximal/minimal detector 8a constitute a second judgment device. Further, the detected isolation point remover 4 corresponds to a continuity detection device.

In the picture angle detection equipment 10b according to the present embodiment, a luminance distribution in each of the video signals VD1 and VD2 in the detection window is converted into the binary pattern BI, and pattern matching between the binary pattern BI and the plurality of reference patterns RA previously set is performed, thereby making it possible to detect the angle of the diagonal edge of the picture on a small circuit scale.

In this case, it is judged whether or not the interpolation pixels have continuity by the angle information PA outputted from the first pattern matching angle detector 3, the threshold value for binarization related to the detection window, the maximum of the values of the pixels in the detection window, and the minimum of the values of the pixels in the detection window. When it is judged that the interpolation pixels have no continuity, the angle information PA is removed by the detected isolation point remover 4. Accordingly, it is possible to reliably prevent erroneous detection by noise. Further, the average luminance value in the detection window is used as a threshold value for binarization. Accordingly, the binary pattern BI including both "0" and "1" can be always generated without setting the threshold value for binarization from the exterior and irrespective of the luminance level of the picture.

The pattern matching based on the two-dimensional luminance distribution is performed. Accordingly, erroneous detection is restrained, as compared with that in a case where a difference value between two pixels is used, thereby making it possible to accurately detect the angle of the diagonal edge of the picture.

Furthermore, by using the reference patterns RA based on the two-dimensional luminance distribution, angles to be detected are not limited to the angles of straight lines each connecting the pixels at positions of point symmetry, centered at the interpolation pixel. For example, angles among the angles can be also detected. Consequently, it is possible to detect the angle with finer spacing using the line memory 1a having a small capacity.

When the detected angle of the diagonal edge of the picture has no continuity, the angle information PA is removed by the detected isolation point remover 4, thereby making it possible to prevent erroneous detection by noise.

(3) Third Embodiment

Figure 11:
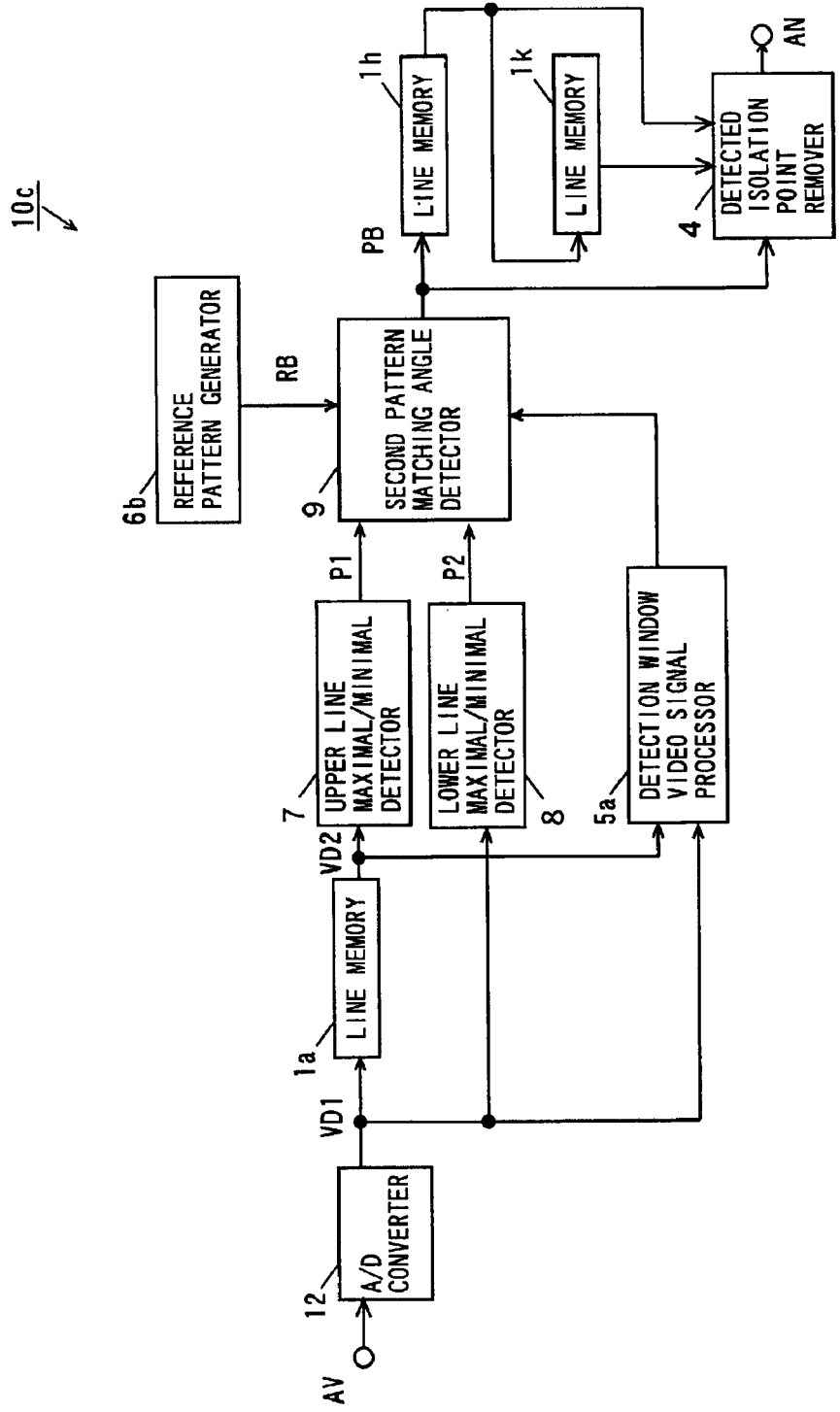
FIG. 11 is a block diagram showing the configuration of picture angle detection equipment in a third embodiment of the present invention.

FIG. 11 is a block diagram showing the configuration of picture angle detection equipment in a third embodiment of the present invention.

Picture angle detection equipment 10c shown in FIG. 11 comprises line memories 1a, 1h, and 1k, an upper line maximal/minimal detector 7, a lower line maximal/minimal detector 8, a reference pattern generator 6b, a second pattern matching angle detector 9, a detected isolation point remover 4, a detection window video signal processor 5a, and an A/D (analog-to-digital) converter 12.

The A/D converter 12 subjects an analog video signal AV to analog-to-digital conversion, to output a digital video signal VD1. The video signal VD1 outputted from the A/D converter 12 is inputted to the line memory 1a and the lower line maximal/minimal detector 8. The line memory 1a delays the video signal VD1 outputted from the A/D converter 12 by one line (one scanning line), to output a video signal VD2. The video signal VD2 outputted from the line memory 1a is fed to the upper line maximal/minimal detector 7 and the detection window video signal processor 5a.

The upper line maximal/minimal detector 7 detects a maximal point and a minimal point in a luminance distribution in a horizontal direction in the video signal VD2 outputted from the line memory 1a, to feed a maximal/minimal pattern P1 representing the positions of the maximal point and the minimal point to the second pattern matching angle detector 9. The lower line maximal/minimal detector 8 detects a maximal point and a minimal point in a luminance distribution in a horizontal direction in the video signal VD1 outputted from the A/D converter 12, to feed a maximal/minimal pattern P2 representing the positions of the maximal point and the minimal point to the second pattern matching angle detector 9. Each of the maximal/minimal pattern P1 and the maximal/minimal pattern P2 has a size corresponding to one scanning line of the detection window.

Here, the detection window is a rectangular region composed of 7 by 2 pixels including seven pixels in the video signal VD1 and seven pixels in the video signal VD2 and a rectangular region composed of 15 by 2 pixels including 15 pixels in the video signal VD1 and 15 pixels in the video signal VD2, for example. In the following description, the size of the detection window shall be 7 by 2 pixels. In this case, the size of each of the maximal/minimal pattern P1 and the maximal/minimal pattern P2 is 7 pixels.

The reference pattern generator 6b generates a plurality of reference patterns RB each representing the positions of a maximal point and a minimal point in the detection window, to feed the reference patterns RB to the second pattern matching angle detector 9. The size of each of the reference patterns RB is equal to the size of the detection window.

The second pattern matching angle detector 9 compares the maximal/minimal pattern P1 outputted from the upper line maximal/minimal detector 7 and the maximal/minimal pattern P2 outputted from the lower line maximal/minimal detector 8 with each of the plurality of reference patterns RB fed from the reference pattern generator 6b, to output angle information PB related to the angle of the reference pattern which matches with the patterns P1 and P2.

A comparison operation between the maximal/minimal patterns P1 and P2 and each of the reference patterns RB is hereinafter referred to as second pattern matching.

The detection window video signal processor 5a calculates the difference between the maximum value and the minimum value in the luminance distribution in each of the video signals VD1 and VD2 in the detection window as a contrast. When the contrast in each of the video signals VD1 and VD2 in the detection window is lower than a predetermined value, the detection window video signal processor 5a carries out control such that the second pattern matching angle detector 9 does not perform the second pattern matching. Accordingly, the angle information PB is not outputted.

When the contrast in each of the video signals VD1 and VD2 is low, the effect of interpolation processing using pixels in diagonal directions is low. The interpolation processing using pixels in diagonal directions involves noise. When the effect is low, therefore, the angle information PB is not outputted such that the interpolation processing using the pixels in diagonal directions is not performed.

The line memory 1h delays the angle information PB outputted from the second pattern matching angle detector 9 by one line (one scanning line), to output the delayed angle information PB to the line memory 1k and the detected isolation point remover 4. The line memory 1k further delays the angle information PB outputted from the line memory 1h by one line (one scanning line), to output the delayed angle information PB to the detected isolation point remover 4. The detected isolation point remover 4 judges, with respect to a scanning line including an object interpolation pixel (hereinafter referred to as an interpolation scanning line) fed from the line memory 1h, whether or not angle information PB, related to an interpolation scanning line one line above the interpolation scanning line, which is fed from the second pattern matching angle detector 9, and angle information PB, related to an interpolation scanning line one line below the interpolation scanning line, which is fed from the line memory 1k coincide with each other, to output, when they coincide with each other, the angle information PB outputted from the second pattern matching angle detector 9 as an angle signal AN, while not outputting, when they do not coincide with each other, the angle information PB outputted from the second pattern matching angle detector 9.

In the present embodiment, the upper line maximal/minimal detector 7 and the lower line maximal/minimal detector 8 constitute a maximal/minimal pattern generation device, the reference pattern generator 6b corresponds to a reference pattern generation device, and the second pattern matching angle detector 9 corresponds to a comparison device. The detection window video signal processor 5a corresponds to a contrast detection device, and the detected isolation point remover 4 corresponds to a continuity detection device.

Figure 12:
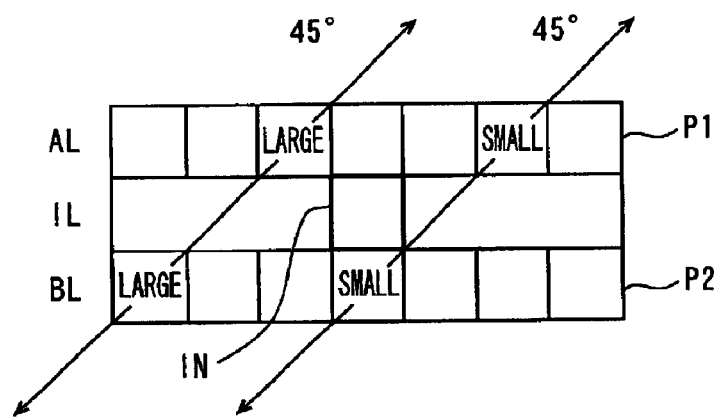
FIG. 12 is a schematic view showing an example of a maximal/minimal pattern outputted from an upper line maximal/minimal detector and a lower line maximal/minimal detector shown in FIG. 11.

FIG. 12 is a schematic view showing an example of the maximal/minimal patterns P1 and P2 outputted from the upper line maximal/minimal detector 7 and the lower line maximal/minimal detector 8 shown in FIG. 11.

In FIG. 12, IN indicates an interpolation pixel, and IL indicates an interpolation scanning line. Further, AL indicates a scanning line above the interpolation scanning line IL, and BL indicates a scanning line below the interpolation scanning line IL.

In the example shown in FIG. 12, the position of a pixel having a maximal point in the luminance distribution in the horizontal direction is indicated by "large", and the position of a pixel having a minimal point in the luminance distribution in the horizontal direction is indicated by "small". Actually, the position of the pixel having the maximal point and the position of the pixel having the minimal point are respectively represented by predetermined numeric values. In the maximal/minimal patterns P1 and P2, the angle of each of a straight line connecting the respective maximal points and a straight line connecting the respective minimal points in the luminance distributions on the scanning line AL and the scanning line BL is 45°. Here, an angle in a horizontal direction is taken as 0, and an angle in a direction diagonally upward toward the right is taken as the positive.

Figure 13:
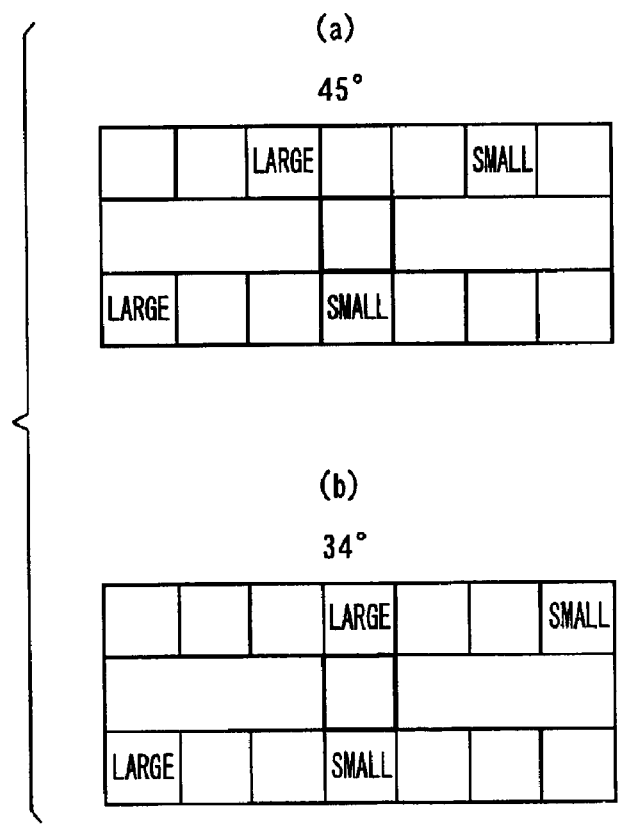
FIG. 13 is a schematic view showing an example of a reference pattern generated by a reference pattern generator shown in FIG. 11.

FIG. 13 is a schematic view showing examples of reference patterns generated by the reference pattern generator 6b shown in FIG. 11.

FIGS. 13(a) and 13(b) respectively illustrate reference patterns having angles of 45° and 34°. In FIG. 13, the position of a pixel having a maximal point is indicated by "large", and the position of a pixel having a minimal point is indicated by "small". Actually, the position of the pixel having the maximal point and the position of the pixel having the minimal point are respectively represented by predetermined numeric values.

As shown in FIGS. 13(a) and 13(b), the angles of a straight line connecting the maximal points and a straight line connecting the minimal points in the luminance distributions on the two scanning lines with the maximal point and the minimal point paired are respectively set to 45° and 34°.

For example, the maximal/minimal patterns P1 and P2 shown in FIG. 12 match with the reference pattern shown in FIG. 13(a). In this case, the second pattern matching angle detector 9 shown in FIG. 11 outputs angle information PB representing 45°.

In the picture angle detection equipment 10c according to the present embodiment, the maximal/minimal patterns P1 and P2, each representing the positions of the maximal point and the minimal point, in the respective luminance distributions in the video signals VD1 and VD2 in the detection window are generated, and pattern matching between the maximal/minimal patterns P1 and P2 and the plurality of reference patterns RB previously set is performed, thereby making it possible to detect the angle of a diagonal edge of a picture on a small circuit scale.

In this case, pairs of the maximal points and the minimal points are detected, or either pairs of the maximal points or pairs of the minimal points are detected, thereby making it possible to detect the angle of a picture having a thin diagonal line.

The pattern matching based on the two-dimensional luminance distribution is performed. Accordingly, erroneous detection is restrained, as compared with that in a case where a difference value between two pixels is used, thereby making it possible to accurately detect the angle of the picture having the thin diagonal line.

Furthermore, by using the reference patterns RB based on the two-dimensional luminance distribution, angles to be detected are not limited to the angles of straight lines each connecting the pixels at positions of point symmetry, centered at the interpolation pixel. For example, angles among the angles can be also detected. Consequently, it is possible to detect the angle with finer spacing using the line memory 1a having a small capacity.

When the detected angle of the diagonal edge of the picture has no continuity, the angle information PB is removed by the detected isolation point remover 4, thereby making it possible to prevent erroneous detection by noise.

In addition, the reference patterns RB generated by reference pattern generating part 6b of FIG. 11 are not limited to the examples shown in FIG. 13, arbitrary reference patterns can be used. The reference patterns RB may not contain both the maximal points and the minimal points, and the reference patterns RB may include either maximal points or minimal points.

(4) Fourth Embodiment

Figure 14:
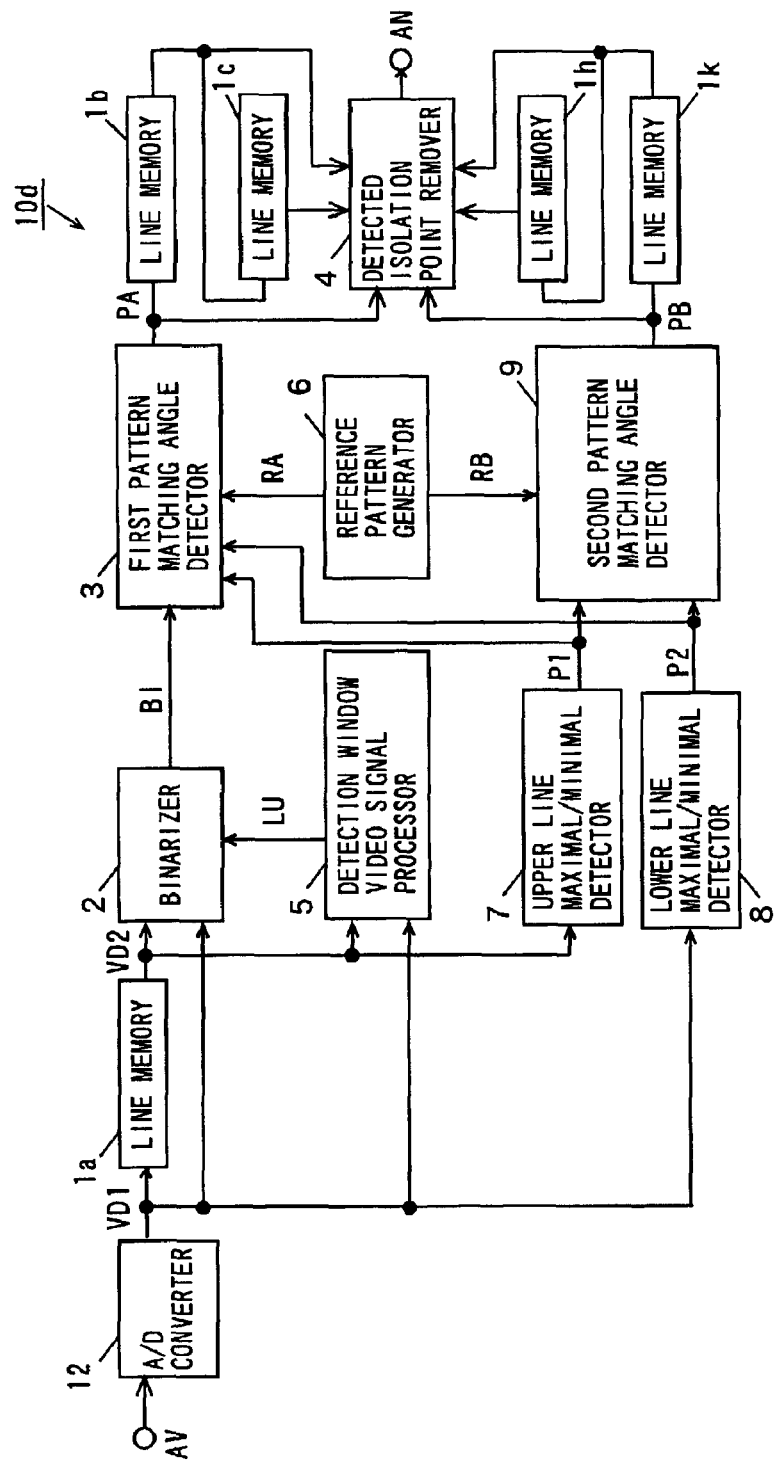
FIG. 14 is a block diagram showing the configuration of picture angle detection equipment in a fourth embodiment of the present invention.

FIG. 14 is a block diagram showing the configuration of picture angle detection equipment in a fourth embodiment of the present invention.

Picture angle detection equipment 10d shown in FIG. 14 comprises line memories 1a to 1c, 1h, and 1k, a binarizer 2, a first pattern matching angle detector 3, a detected isolation point remover 4, a detection window video signal processor 5, a reference pattern generator 6, an upper line maximal/minimal detector 7, a lower line maximal/minimal detector 8, a second pattern matching angle detector 9, and an A/D (analog-to-digital) converter 12.

The A/D converter 12 subjects an analog video signal AV to analog-to-digital conversion, to output a digital video signal VD1. The video signal VD1 outputted from the A/D converter 12 is inputted to the line memory 1a, the binarizer 2, the detection window video signal processor 5, and the lower line maximal/minimal detector 8. The line memory 1a delays the video signal VD1 outputted from the A/D converter 12 by one line (one scanning line), to output a video signal VD2. The video signal VD2 outputted from the line memory 1a is fed to the binarizer 2, the detection window video signal processor 5, and the upper line maximal/minimal detector 7.

The operations of the line memory 1a, the binarizer 2, the first pattern matching angle detector 3, and the detection window video signal processor 5 are the same as the operations of the line memory 1a, the binarizer 2, the first pattern matching angle detector 3, and the detection window video signal processor 5 shown in FIG. 1. The operations of the upper line maximal/minimal detector 7, the lower line maximal/minimal detector 8, and the second pattern matching angle detector 9 are the same as the operations of the upper line maximal/minimal detector 7, the lower line maximal/minimal detector 8, and the second pattern matching angle detector 9 shown in FIG. 11. Further, the operation of the detected isolation point remover 4 is the same as the operation of the detected isolation point remover 4 shown in FIGS. 1, 9, and 11.

The reference pattern generator 6 generates reference patterns RA, similarly to the reference pattern generator 6a shown in FIG. 1, and generates reference patterns RB, similarly to the reference pattern generator 6b shown in FIG. 11.

In the present embodiment, the binarizer 2 corresponds to a binary pattern generation device, the reference pattern generator 6 corresponds to a first and second reference pattern generation device, the first pattern matching angle detector 3 corresponds to a first comparison device, and the second pattern matching angle detector 9 corresponds to a second comparison device.

In the picture angle detection equipment 10d according to the present embodiment, a luminance distribution in each of the video signals VD1 and VD2 in a detection window is converted into a binary pattern BI, and pattern matching between the binary pattern BI and the plurality of reference patterns RA previously set is performed, thereby making it possible to detect the angle of a diagonal edge of a picture on a small circuit scale.

In this case, the average luminance value in the detection window is used as a threshold value for binarization.

Accordingly, the binary pattern BI can be generated without setting the threshold value for binarization from the exterior and irrespective of the luminance level of the picture.

Maximal/minimal patterns P1 and P2, each representing the positions of a maximal point and a minimal point, in the respective luminance distributions in the video signals VD1 and VD2 in the detection window are generated, and pattern matching between the maximal/minimal patterns P1 and P2 and the plurality of reference patterns RB previously set is performed, thereby making it possible to detect the angle of the diagonal edge of the picture on a small circuit scale.

In this case, pairs of the maximal points and the minimal points are detected, or either pairs of the maximal points or pairs of the minimal points are detected, thereby making it possible to detect the angle of a picture having a thin diagonal line.

The pattern matching based on the two-dimensional luminance distribution is performed. Accordingly, erroneous detection is restrained, as compared with that in a case where a difference value between two pixels is used, thereby making it possible to accurately detect the angles of the picture having the diagonal edge and the picture having the thin diagonal line.

Furthermore, by using the reference patterns RA and RB based on the two-dimensional luminance distribution, angles to be detected are not limited to the angles of straight lines each connecting the pixels at positions of point symmetry, centered at the interpolation pixel. For example, angles among the angles can be also detected. Consequently, it is possible to detect the angle with finer spacing using the line memory 1a having a small capacity.

When the detected angle of the diagonal edge of the picture has no continuity, the angle information PA and PB are removed by the detected isolation point remover 4, thereby making it possible to prevent erroneous detection by noise.

(5) Fifth Embodiment

Figure 15:
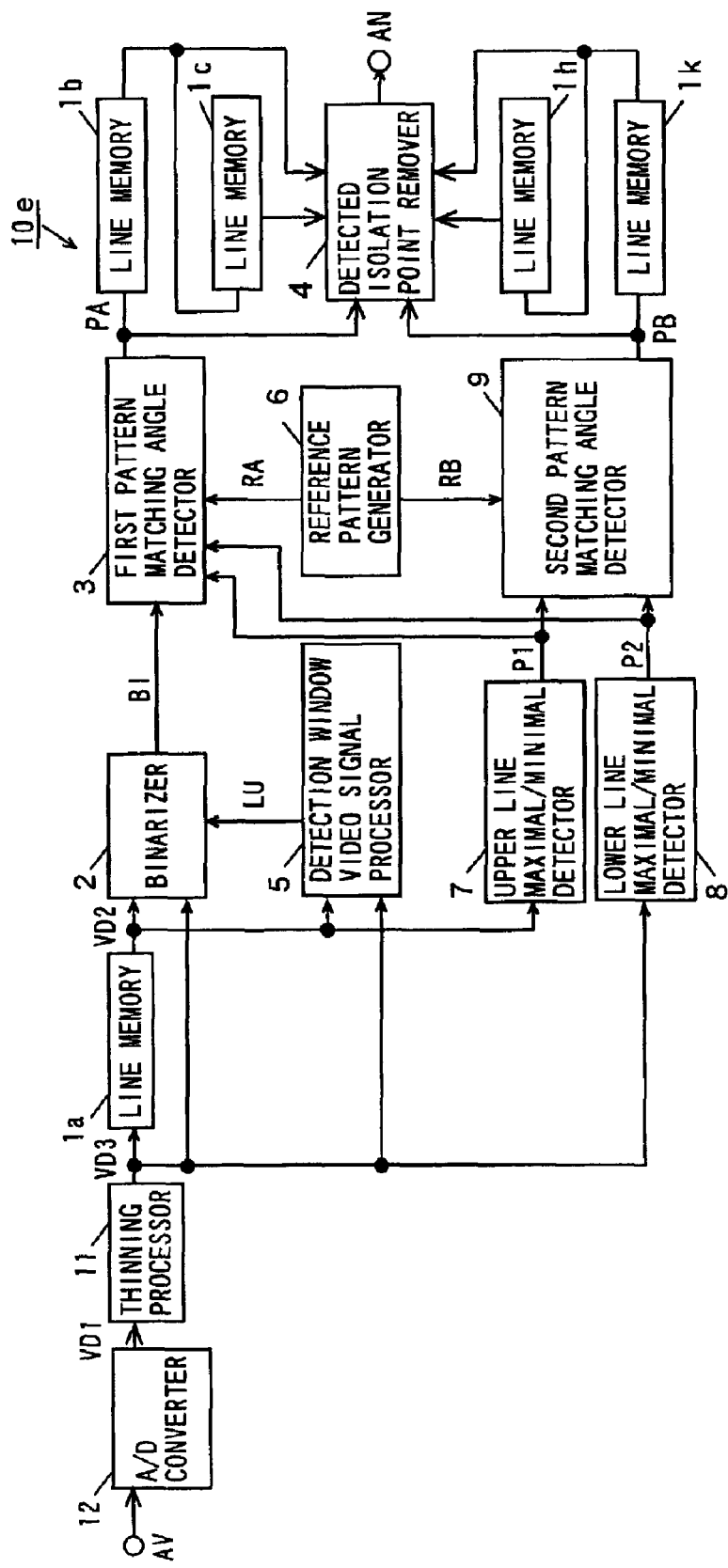
FIG. 15 is a block diagram showing the configuration of picture angle detection equipment in a fifth embodiment of the present invention.

FIG. 15 is a block diagram showing the configuration of picture angle detection equipment in a fifth embodiment of the present invention.

Picture angle detection equipment 10e shown in FIG. 15 differs from the picture angle detection equipment 10d shown in FIG. 14 in that it further comprises a thinning processor 11. In the present embodiment, the thinning processor 11 corresponds to a thinning device.

An A/D converter 12 subjects an analog video signal AV to analog-to-digital conversion, to output a digital video signal VD1. The video signal VD1 outputted from the A/D converter 12 is fed to the thinning processor 11. The thinning processor 11 thins pixels composing the video signal VD1 in a horizontal direction, to output a video signal VD3. The video signal VD3 outputted from the thinning processor 11 is inputted to a line memory 1a, a binarizer 2, a detection window video signal processor 5, and a lower line maximal/minimal detector 8.

Consequently, it is possible to detect a picture having the angle of a diagonal edge closer to the horizontal (hereinafter referred to as a shallower angle), as compared with that in the picture angle detection equipment 10d shown in FIG. 14, using the same reference patterns as the above-mentioned reference patterns RA and RB. For example, the thinning processor 11 thins the pixels composing the video signal VD1 every other one pixel in the horizontal direction, thereby making it possible to detect a shallow angle which is approximately one-half that in a case where the pixels are not thinned using the same reference patterns RA and RB. Consequently, the detection range can be widened.

The picture angle detection equipment 10a shown in FIG. 1, the picture angle detection equipment 10b shown in FIG. 9, and the picture angle detection equipment 10c shown in FIG. 11 may be respectively provided with thinning processors 11.

(6) Sixth Embodiment

Figure 16:
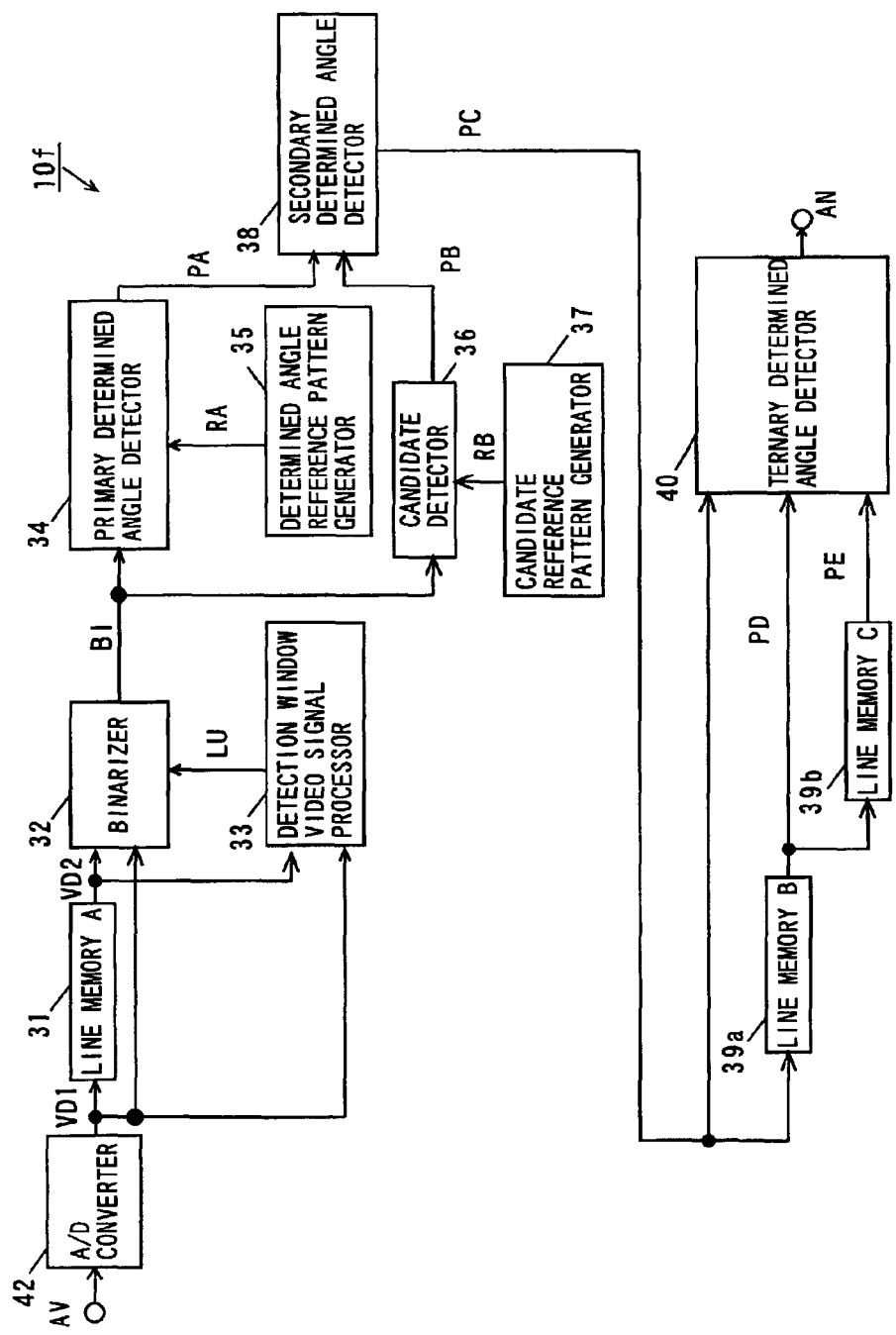
FIG. 16 is a block diagram showing the configuration of picture angle detection equipment in a sixth embodiment of the present invention.

FIG. 16 is a block diagram showing the configuration of picture angle detection equipment in a sixth embodiment of the present invention.

Picture angle detection equipment 10f shown in FIG. 16 comprises a line memory 31, a binarizer 32, a detection window video signal processor 33, a primary determination angle detector 34, a determination angle reference pattern generator 35, a candidate detector 36, a candidate reference pattern generator 37, a secondary determination angle detector 38, a line memory 39a, a line memory 39b, a ternary determination angle detector 40, and an A/D (analog-to-digital) converter 42.

The A/D converter 42 subjects an analog video signal AV to analog-to-digital conversion, to output a digital video signal VD1. The video signal VD1 outputted from the A/D converter 42 is inputted to the line memory 31, the binarizer 32, and the detection window video signal processor 33. The line memory 31 delays the video signal VD1 outputted from the A/D converter 42 by one line (one scanning line), to output a video signal VD2. The video signal VD2 outputted from the line memory 31 is fed to the binarizer 32 and the detection window video signal processor 33.

In this example, each of the video signals VD1 and VD2 shall have a luminance on 256 gray scales. That is, the minimum value of the luminance of each of the video signals VD1 and VD2 is "0", and the maximum value thereof is "255".

The binarizer 32 binarizes the inputted video signal VD1 and the video signal VD2 outputted from the line memory 31 using an average luminance value LU fed from the detection window video signal processor 33, described later, as a threshold value, to output a binary pattern BI composed of "1" and "0". The binary pattern BI has the size of a detection window.

Here, the detection window is a rectangular region composed of 7 by 2 pixels including seven pixels in the video signal VD1 and seven pixels in the video signal VD2 and a rectangular region composed of 15 by 2 pixels including 15 pixels in the video signal VD1 and 15 pixels in the video signal VD2, for example. In the following description, the size of the detection window shall be 7 by 2 pixels. In this case, the size of the binary pattern BI is 7 by 2 pixels.

The detection window video signal processor 33 sets the detection window in the inputted video signal VD1 and the video signal VD2 outputted from the line memory 31, calculates the average value of the luminance of each of the video signals VD1 and VD2 in the detection window, and feeds the average luminance value LU as a threshold value for binarization to the binarizer 32.

Although in the present embodiment, the average value of the luminances of all the pixels in the detection window is also used as a threshold value for binarization, the present invention is not limited to the same. The average value of the maximum and the minimum of the values of the pixels in the detection window may be used as a threshold value for binarization, a center value in a case where the luminances are arranged in the order of magnitude may be used as a threshold value for binarization, or the average value of a plurality of pixels whose values are close to the center value in the case where the luminances are arranged in the order of magnitude, for example, may be used as a threshold value for binarization.

Furthermore, the detection window video signal processor 33 calculates the difference between the maximum value and the minimum value of the luminance of each of the video signals VD1 and VD2 in the detection window as a contrast, to feed the minimum value "0" or the maximum value "255" as a threshold value to the binarizer 32 when the calculated contrast is lower than a predetermined value. Consequently, the binarizer 2 outputs the binary pattern BI all composed of "1" or "0".

The determination angle reference pattern generator 35 generates a plurality of determination angle reference patterns RA each composed of "1" and "0", to feed the generated reference pattern RA to the primary determination angle detector 34. The size of each of the determination angle reference patterns RA is equal to the size of the detection window.

The primary determination angle detector 34 compares the binary pattern BI fed from the binarizer 32 with each of the plurality of determination angle reference patterns RA fed from the determination angle reference pattern generator 35, to output the angle of the determination angle reference pattern RA which matches with the binary pattern BI as angle information PA. A comparison operation between the binary pattern BI and each of the determination angle reference patterns RA is hereinafter referred to as primary determination pattern matching.

Here, to determine the angle of an object pixel by primary determination pattern matching is referred to as primary determination, and the pixel whose angle has been determined by the primary determination pattern matching is referred to as a primarily determined pixel.

When the contrast in each of the video signals VD1 and VD2 in the detection window is lower than the predetermined value, the binary pattern BI all composed of "1" or "0" is outputted from the binarizer 32. Accordingly, the angle information PA is not outputted from the primary determination angle detector 34.

When the contrast in each of the video signals VD1 and VD2 is low, the effect of interpolation processing using pixels in diagonal directions is low. In the interpolation processing using the pixels in diagonal directions, noise may, in some cases, be produced unless an accurate angle is detected. When the effect is low, therefore, the angle information PA is not outputted such that the interpolation processing using the pixels in diagonal directions is not performed.

The candidate reference pattern generator 37 generates a plurality of candidate reference patterns RB each composed of "1" and "0", to feed the generated reference patterns RB to the candidate detector 36. The size of each of the reference patterns RB is equal to the size of the detection window.

The candidate detector 36 compares the binary pattern BI fed from the binarizer 32 with each of the plurality of reference patterns RB fed from the candidate reference pattern generator 37, to output the type of the reference pattern RB which matches with the binary pattern BI as candidate information PB. A comparison operation between the binary pattern BI and each of the candidate reference patterns RB is hereinafter referred to as candidate detection pattern matching.

Here, a pixel at which a candidate reference pattern has been detected by candidate detection pattern matching is referred to as a candidate pixel.

The secondary determination angle detector 38 outputs, when the angle information PA is fed from the primary determination angle detector 34 to the object pixel, that is, the object pixel is a primarily determined pixel, the angle information PA as angle information PC. Further, the secondary determination angle detector 38 searches, when the candidate information PB is fed from the candidate detector 36 to the object pixel, that is, the object pixel is a candidate pixel, a predetermined range in the vicinity of the object pixel depending on the candidate information PB, to output, when a primarily determined pixel exists in the predetermined range in the vicinity of the object pixel, angle information PA related to the primarily determined pixel as angle information PC related to the object pixel. To thus set in a candidate pixel angle information related to a primarily determined pixel in the vicinity of the candidate pixel is referred to as secondary determination.

The angle information PC is inputted to the ternary determination angle detector 40, and is inputted to the line memory 39a, where the angle information PC is delayed by one line. The delayed angle information PC is outputted as angle information PD. Further, the angle information PD is inputted to the ternary determination angle detector 40, and is inputted to the line memory 39b, where the angle information PD is delayed by one line. The delayed angle information PD is outputted as angle information PE. Further, the angle information PE is inputted to the ternary determination angle detector 40.

The ternary determination angle detector 40 judges, with respect to angle information PD related to a scanning line including an object interpolation pixel (hereinafter referred to as an interpolation scanning line), whether or not angle information PE related to an interpolation scanning line one line above the interpolation scanning line and angle information PC related to an interpolation scanning line one line below the interpolation scanning line match with each other, to output, when they match with each other, the angle information PD outputted from the line memory 39a as an angle signal AN, while not outputting, when they do not match with each other, the angle information PD outputted from the line memory 39a.

In the present embodiment, the binarizer 32 corresponds to a binary pattern generation device, the determination angle reference pattern generator 35 corresponds to a determination angle pattern generation device, the primary determination angle detector 34 corresponds to a primary determination angle detection device, the candidate reference pattern generator 37 corresponds to a candidate pattern generation device, the candidate detector 36 corresponds to a candidate detection device, and the secondary determination angle detector 38 constitutes a secondary determination angle detection device. Further, the ternary determination angle detector 40 corresponds to a ternary determination angle detection device.

The binary pattern BI outputted from the binarizer 32 shown in FIG. 16 in the present embodiment is the same as the binary pattern BI shown in FIG. 2, for example. Further, the relationship between the angle of a diagonal edge of a picture in the present embodiment and the pixels used for the interpolation processing is the same as the relationship shown in FIG. 3.

FIGS. 17, 18, 19, and 20 are schematic views each showing an example of the determination angle reference patterns generated by the determination angle reference pattern generator 35 shown in FIG. 16. Crosshatched pixels are pixels on upper and lower scanning lines which are used for calculating the value of an interpolation pixel indicated by a thick line.

Figure 17:
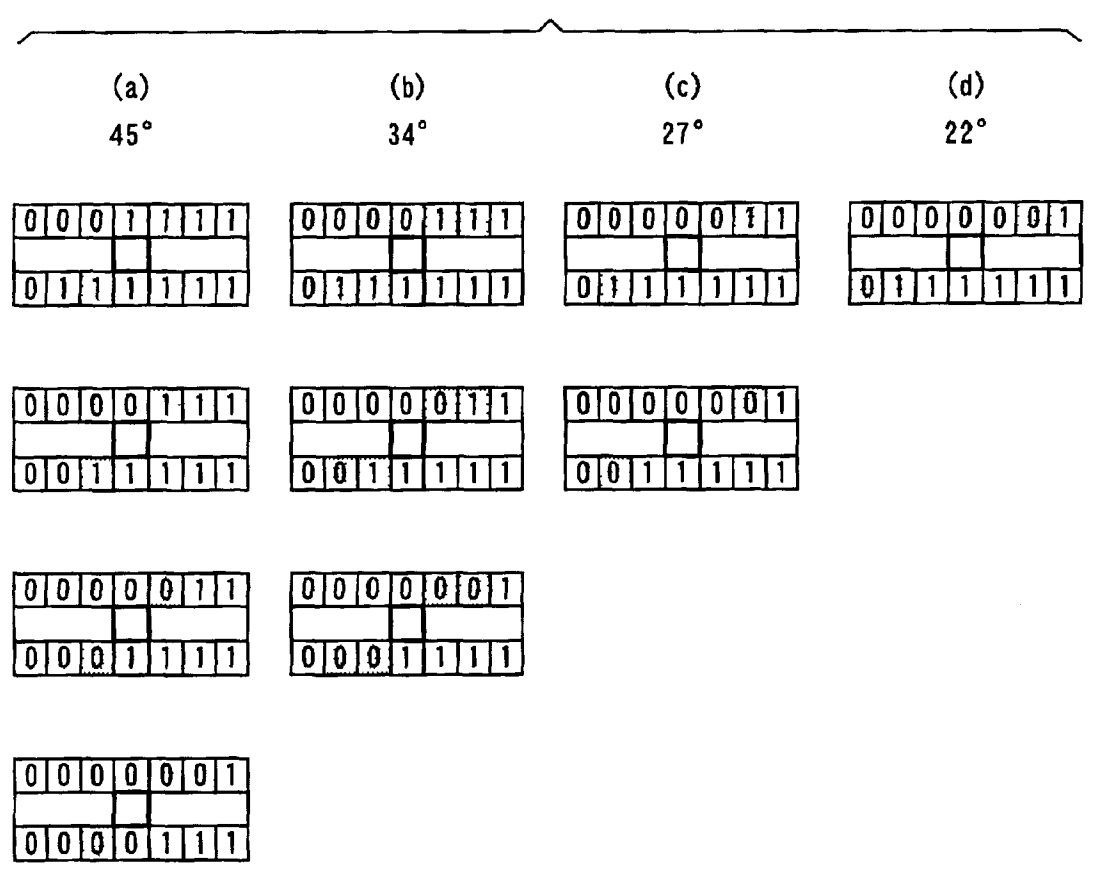
Figure 18:
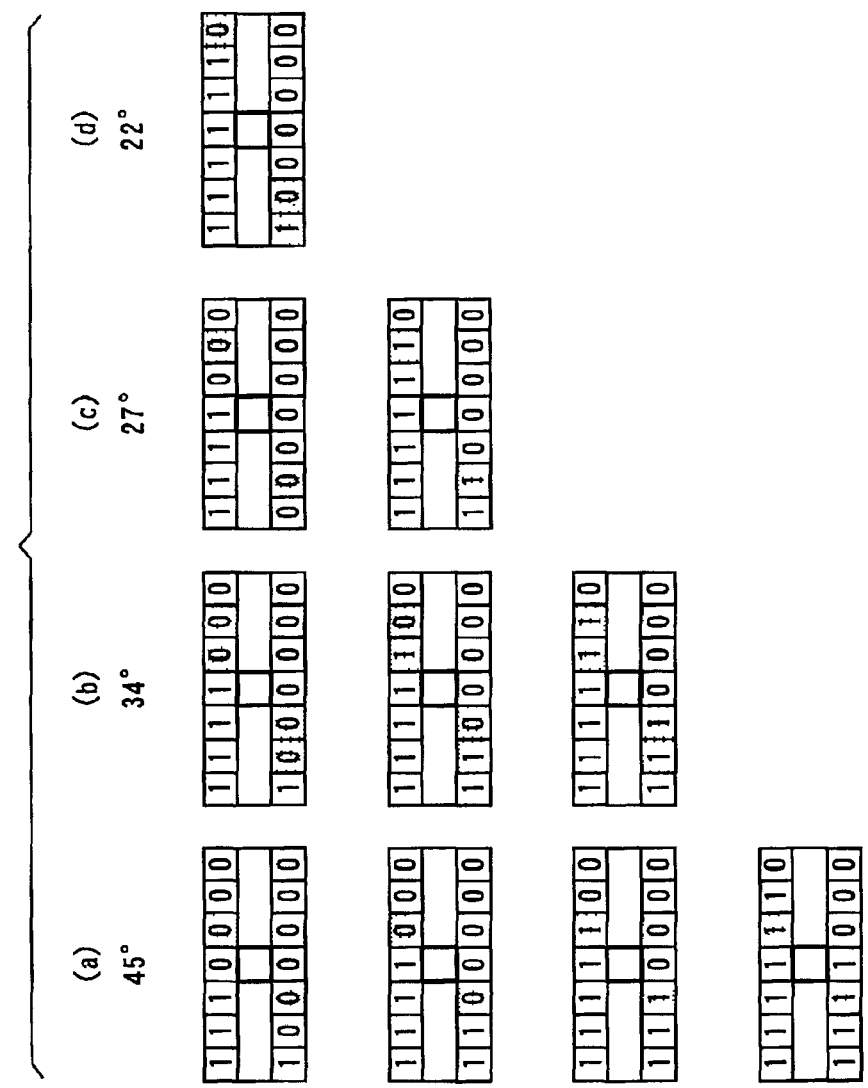
FIG. 18 is a schematic view showing an example of a determination angle reference pattern generated by the determination angle reference pattern generator shown in FIG. 16.

FIGS. 17(*a*), 17(*b*), 17(*c*), and 17(*d*) respectively illustrate determination angle reference patterns having angles of 45°, 34°, 27°, and 22°. In the example shown in FIG. 17, an upper left portion is a dark portion, and a lower right portion is a bright portion. FIGS. 18(*a*), 18(*b*), 18(*c*), and 18(*d*) respectively illustrate determination angle reference patterns having angles of 45°, 34°, 27°, and 22°. In the example shown in FIG. 18, an upper left portion is a bright portion, and a lower right portion is a dark portion.

Figure 19:
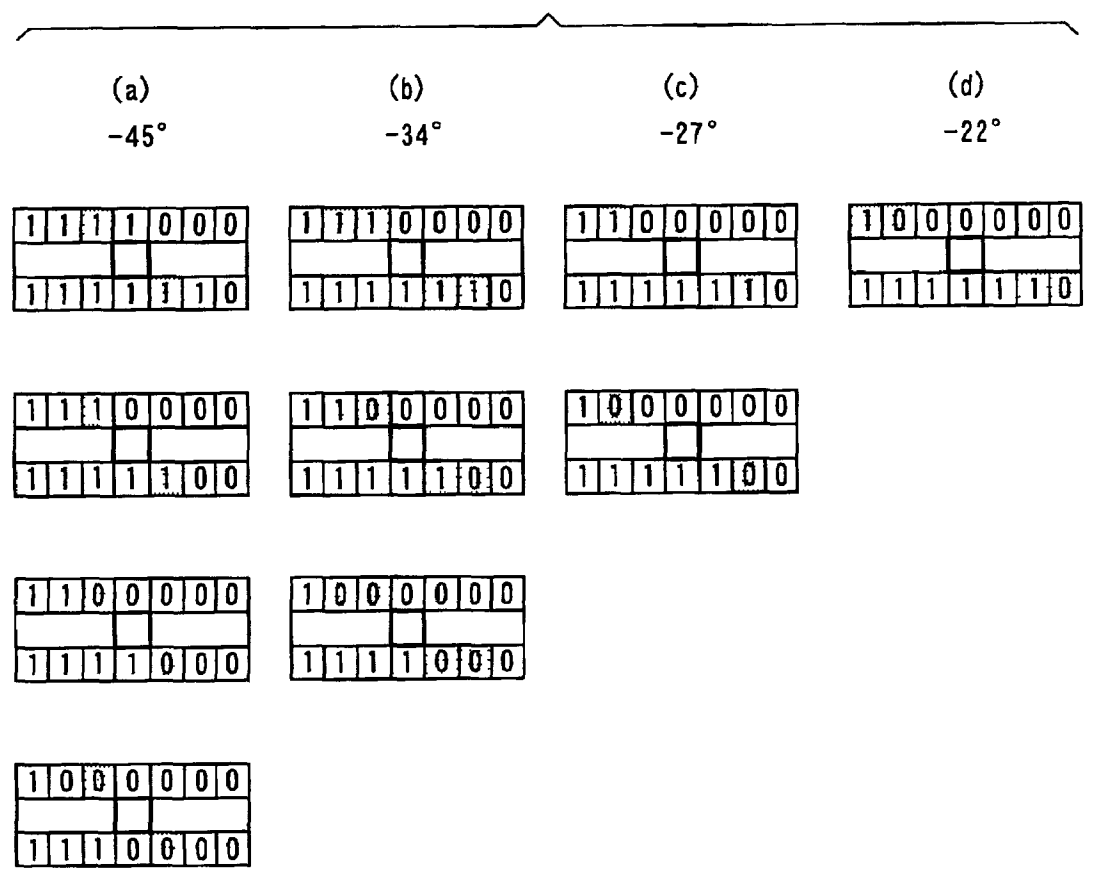
Figure 20:
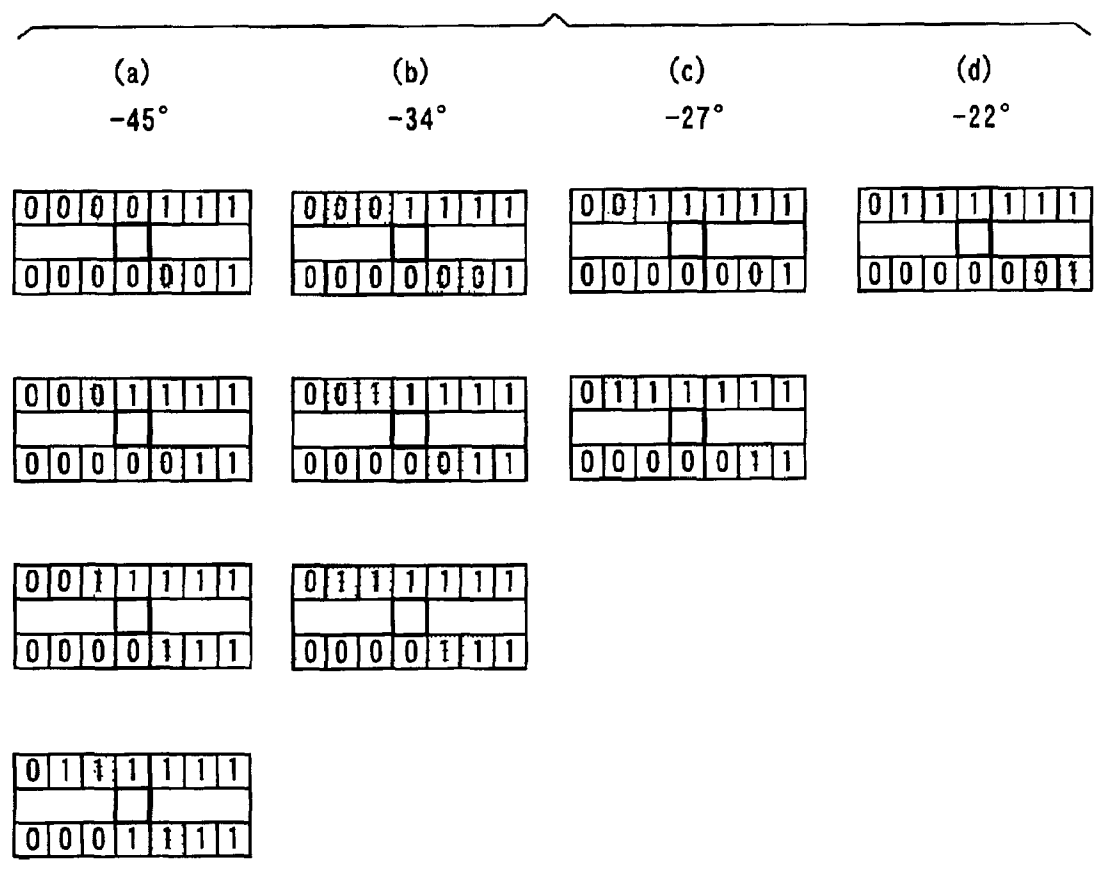

FIGS. 19(*a*), 19(*b*), 19(*c*), and 19(*d*) respectively illustrate determination angle reference patterns having angles of −45°, −34°, −27°, and −22°. In the example shown in FIG. 19, an upper right portion is a dark portion, and a lower left portion is a bright portion. FIGS. 20(*a*), 20(*b*), 20(*c*), and 20(*d*) respectively illustrate determination angle reference patterns having angles of −45°, −34°, −27°, and −22°. In the example shown in FIG. 20, an upper right portion is a bright portion, and a lower left portion is a dark portion.

In the determination angle reference patterns shown in FIGS. 17 to 20, when a pixel train on an upper line positioned above an interpolation pixel and a pixel train on a lower line positioned below the interpolation pixel are viewed in a horizontal direction, respective one boundaries between a pixel having a value "1" and a pixel having a value "0" exist in the pixel train on the upper line and the pixel train on the lower line, and the directions from the pixel having a value "1" to the pixel having a value "0" in the respective pixel trains are the same.

That is, the determination angle reference pattern has the same characteristics as those of a binary pattern in which both an upper line and a lower line change in luminance and respectively have luminance gradients in the same direction, so that the angle of the picture can be reliably specified. When the binary pattern matches with the determination angle reference pattern in the primary determination pattern matching, the angle of the diagonal edge can be primarily determined.

As shown in FIGS. 17 to 20, in the determination angle reference patterns based on a two-dimensional luminance distribution, not only the angles of straight lines each connecting the pixels at positions of point symmetry, centered at the interpolation pixel but also angles among the angles can be set. For example, 34° and 22° which are angles among 45°, 27°, and 18° can be set.

For example, the binary pattern BI shown in FIG. 2 matches with one of the four determination angle reference patterns shown in FIG. 18(*a*). In this case, the first pattern matching angle detector 3 shown in FIG. 16 outputs angle information PA representing 45° shown in FIG. 18(*a*).

FIGS. 21, 22, 23, and 24 are schematic views each showing an example of the candidate reference patterns generated by the candidate reference pattern generator 37 shown in FIG. 16. By using the candidate reference patterns shown in FIGS. 21 to 24, the angle of a picture having a shallow diagonal edge can be detected.

FIGS. 21(*a*) and 21(*b*) illustrate candidate reference patterns respectively used for searches in directions indicated by arrows in FIG. 21, that is, leftward and rightward searches in the secondary determination angle detector 38. In the example shown in FIG. 21, an upper left portion is a dark portion, and a lower right portion is a bright portion.

FIGS. 22(*a*) and 22(*b*) illustrate candidate reference patterns respectively used for searches in directions indicated by arrows in FIG. 22, that is, leftward and rightward searches in the secondary determination angle detector 38. In the example shown in FIG. 22, an upper left portion is a bright portion, and a lower right portion is a dark portion.

Figure 23:
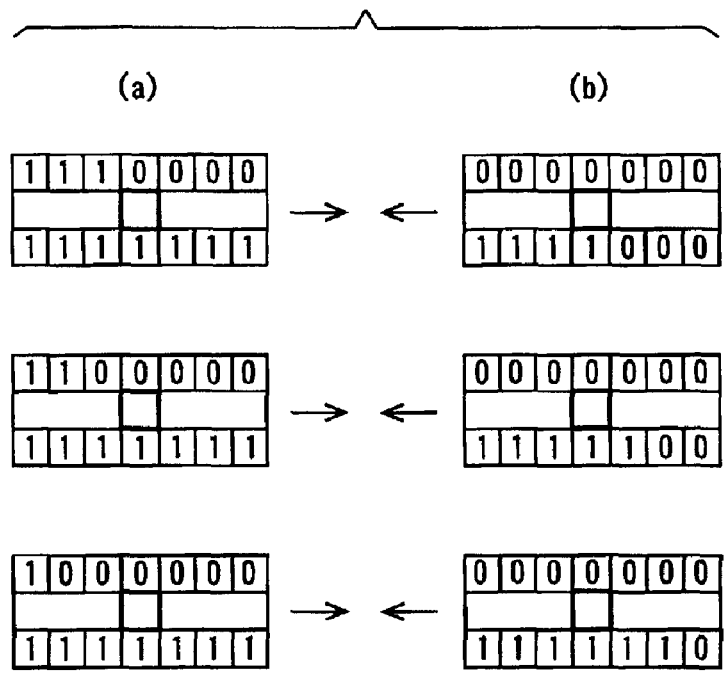
FIG. 23 is a schematic view showing an example of a candidate reference pattern generated by the candidate reference pattern generator shown in FIG. 16.

FIGS. 23(*a*) and 23(*b*) illustrate candidate reference patterns respectively used for searches in directions indicated by arrows in FIG. 23, that is, rightward and leftward searches in the secondary determination angle detector 38. In the example shown in FIG. 23, an upper right portion is a dark portion, and a lower left portion is a bright portion.

Figure 24:
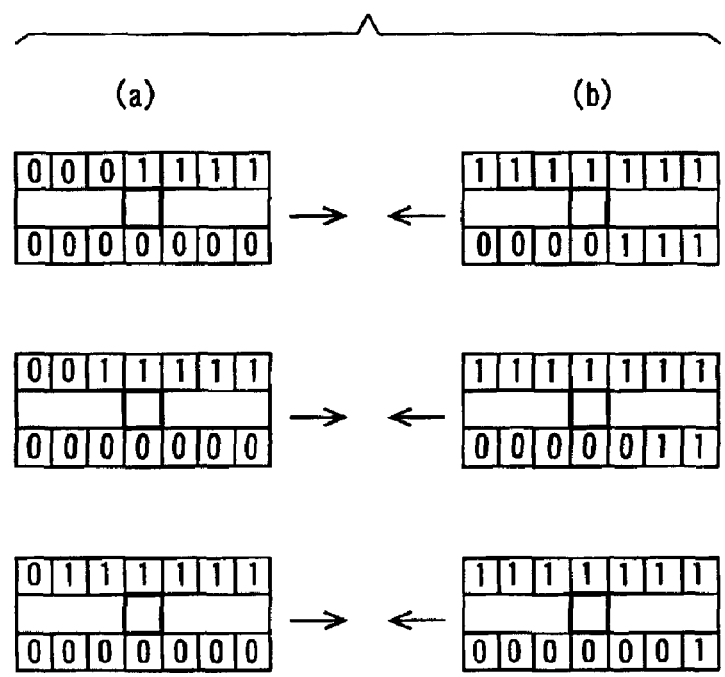
FIG. 24 is a schematic view showing an example of a candidate reference pattern generated by the candidate reference pattern generator shown in FIG. 16.

FIGS. 24(*a*) and 24(*b*) illustrate candidate reference patterns respectively used for searches in directions indicated by arrows in FIG. 24, that is, rightward and leftward searches in the secondary determination angle detector 38. In the example shown in FIG. 24, an upper right portion is a bright portion, and a lower left portion is a dark portion.

In the candidate reference patterns shown in FIGS. 21 to 24, when a pixel train on an upper line positioned above an interpolation pixel and a pixel train on a lower line positioned below the interpolation pixel are viewed in a horizontal direction, only one boundary between a pixel having a value "1" and a pixel having a value "0" exists in the pixel train on either one of the upper and lower lines, and the pixel train on the other line is composed of only pixels having a value "1" or a value "0".

That is, the candidate reference pattern has the same characteristics as those of a binary pattern in which either one of an upper line and a lower line changes in luminance, and the other line does not change or hardly changes in luminance, so that the angle of the picture cannot be determined. When the binary pattern matches with the candidate reference pattern, however, it is considered that there may exist a pixel at which the angle of the diagonal edge is primarily determined if the vicinity of the interpolation pixel is searched.

Description is made by taking an example of a picture shown in FIG. 31, for example. Binary patterns BI respectively corresponding to a pixel B and a pixel C match with one of the three candidate reference patterns shown in FIG. 21(*b*). Further, a binary pattern BI corresponding to a pixel D matches with the determination angle reference pattern shown in FIG. 17(*d*), so that the angle of the picture is primarily determined to be 22°. Further, binary patterns BI respectively corresponding to a pixel E and a pixel F match with one of the three candidate reference patterns shown in FIG. 21(*a*).

In this case, if searches are made rightward, as indicated by the arrows in FIG. 21(*b*), with respect to the pixel B and the pixel C, the pixel D primarily determined is found. Accordingly, angle information related to the pixel D can be set for the pixel B and the pixel C. To set in a candidate pixel angle information related to a primarily determined pixel in the vicinity of the candidate pixel is referred to as secondary determination.

Similarly, if searches are made leftward, as indicated by the arrows in FIG. 21(*a*), with respect to the pixel E and the pixel F, the pixel D primarily determined is found. Accordingly, angle information related to the pixel D can be set for the pixel E or the pixel F, to make secondary determination.

In order to heighten the precision, judgment as to whether or not secondary determination is made depending on angle information primarily determined is effective. That is, in the case of the candidate reference patterns shown in FIGS.

21(a) and 21(b), a primarily determined pixel is searched for with any one of the determination angle patterns shown in FIG. 17 in the vicinity of the candidate pixel, to make secondary determination when the binary pattern matches with the determination angle pattern shown in FIG. 17. In the case of the candidate reference patterns shown in FIGS. 22(a) and 22(b), a primarily determined pixel is searched for with any one of the determination angle patterns shown in FIG. 18 in the vicinity of the candidate pixel, to make secondary determination when the binary pattern matches with the determination angle pattern shown in FIG. 18. In the case of the candidate reference patterns shown in FIGS. 23(a) and 23(b), a primarily determined pixel is searched for with any one of the determination angle patterns shown in FIG. 19 in the vicinity of the candidate pixel, to make secondary determination when the binary pattern matches with the determination angle pattern shown in FIG. 19. In the case of the candidate reference patterns shown in FIGS. 24(a) and 24(b), a primarily determined pixel is searched for with any one of the determination angle patterns shown in FIG. 20 in the vicinity of the candidate pixel, to make secondary determination when the binary pattern matches with the determination angle pattern shown in FIG. 20.

Although in the present embodiment, searches are made in a direction indicated by an arrow, the present invention is not limited to the same. For example, searches may be made in the direction indicated by the arrow and the opposite direction thereof.

FIGS. 25, 26, 27, and 28 are schematic views each showing an example of the candidate reference patterns generated by the candidate reference pattern generator 37 shown in FIG. 16. By using the candidate reference patterns shown in FIGS. 25 to 28, the angle of a picture having a thin diagonal line can be detected.

Figure 25:
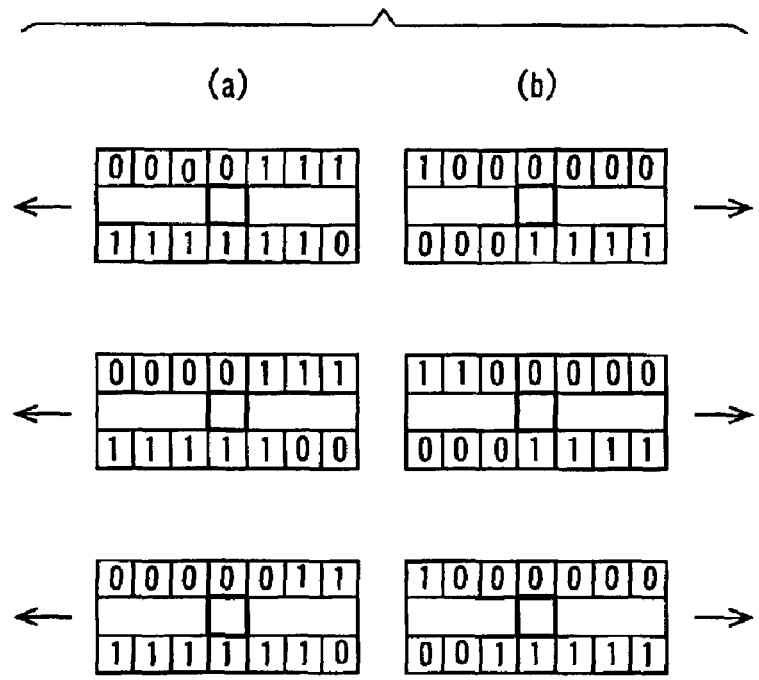
FIG. 25 is a schematic view showing an example of a candidate reference pattern generated by the candidate reference pattern generator shown in FIG. 16.

FIGS. 25(a) and 25(b) illustrate candidate reference patterns respectively used for searches in directions indicated by arrows in FIG. 25, that is, leftward and rightward searches in the secondary determination angle detector 38.

Figure 26:
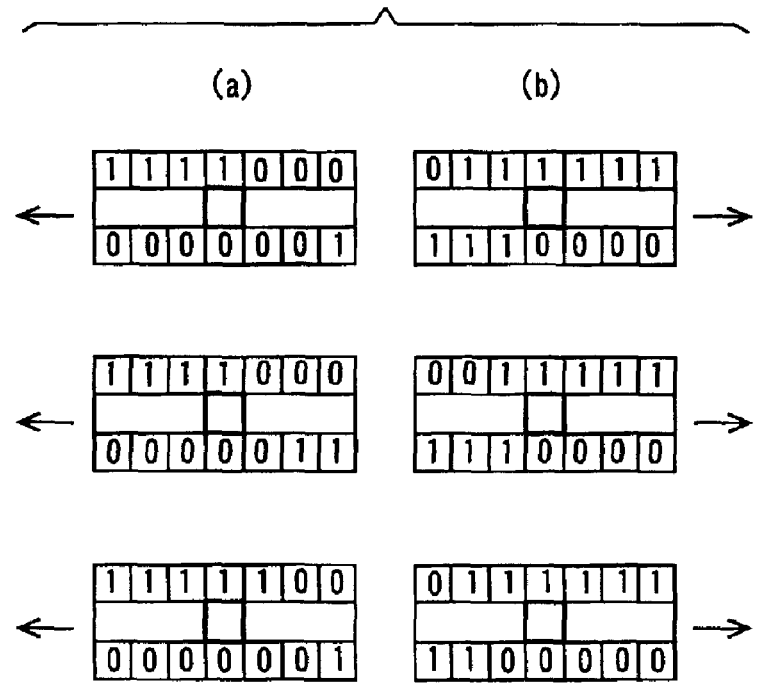
FIG. 26 is a schematic view showing an example of a candidate reference pattern generated by the candidate reference pattern generator shown in FIG. 16.

FIGS. 26(a) and 26(b) illustrate candidate reference patterns respectively used for searches in directions indicated by arrows in FIG. 26, that is, leftward and rightward searches in the secondary determination angle detector 38.

Figure 27:
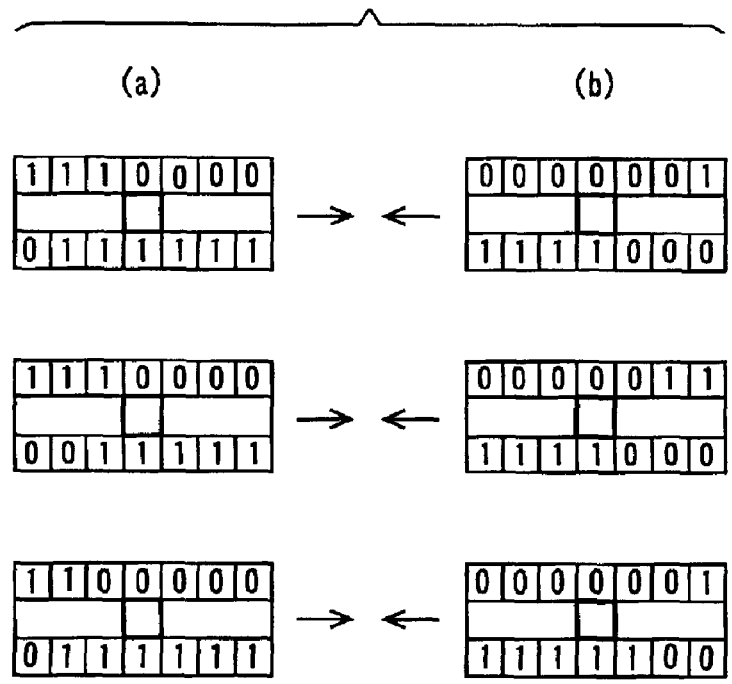
FIG. 27 is a schematic view showing an example of a candidate reference pattern generated by the candidate reference pattern generator shown in FIG. 16.

FIGS. 27(a) and 27(b) illustrate candidate reference patterns respectively used for searches in directions indicated by arrows in FIG. 27, that is, rightward and leftward searches in the secondary determination angle detector 38.

Figure 28:
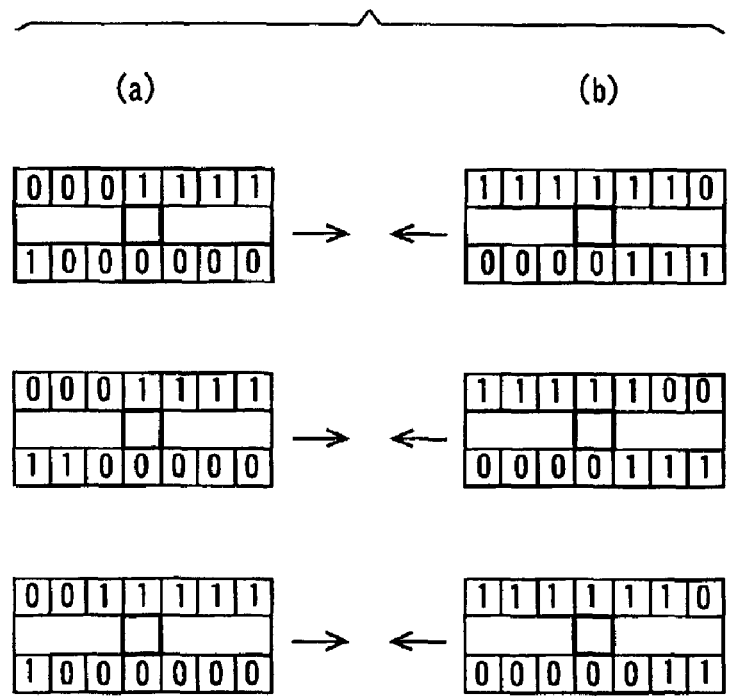
FIG. 28 is a schematic view showing an example of a candidate reference pattern generated by the candidate reference pattern generator shown in FIG. 16.

FIGS. 28(a) and 28(b) illustrate candidate reference patterns respectively used for searches in directions indicated by arrows in FIG. 28, that is, rightward and leftward searches in the secondary determination angle detector 38.

In the candidate reference patterns shown in FIGS. 25 to 28, when a pixel train on an upper line positioned above an interpolation pixel and a pixel train on a lower line positioned below the interpolation pixel are viewed in a horizontal direction, respective one boundaries between a pixel having a value "1" and a pixel having a value "0" exist in the pixel train on the upper line and in the pixel train on the lower line, and the directions from the pixel having a value "1" to the pixel having a value "0" in the respective pixel trains differ from each other.

That is, the candidate reference pattern has the same characteristics as those of a binary pattern in which both an upper line and a lower line change in luminance and respectively have luminance gradients in different directions, so that the angle of the picture cannot be determined. When the binary pattern matches with the candidate reference pattern, however, it is considered that there may exist a pixel at which the angle of the edge of the picture having the thin line is primarily determined if the vicinity of the interpolation pixel is searched.

Figure 32:
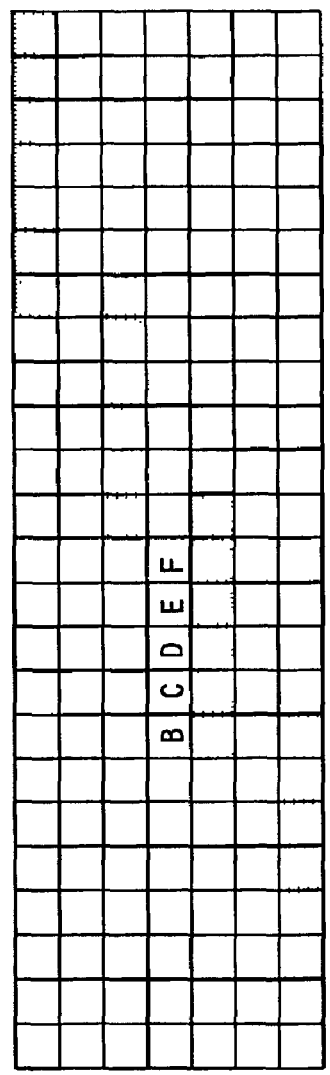
FIG. 32 is a schematic view for explaining a conventional method of detecting a diagonal edge by binarization and comparison with a reference pattern.

Description is made by taking an example of a picture shown in FIG. 32, for example. Binary patterns BI respectively corresponding to a pixel B and a pixel C match with one of the three candidate reference patterns shown in FIG. 21(b). Further, a binary pattern BI corresponding to a pixel D matches with the determination angle reference pattern shown in FIG. 17(d), so that the angle of the picture can be primarily determined to be 22°. Further, binary patterns BI respectively corresponding to a pixel E and a pixel F match with one of the three candidate reference patterns shown in FIG. 25(a).

In this case, if searches are made rightward, as indicated by the arrows in FIG. 21(b), with respect to the pixel B and the pixel C, the pixel D primarily determined is found. Accordingly, angle information related to the pixel D can be set for the pixel B and the pixel C, to make secondary determination. Further, if searches are made leftward, as indicated by the arrows in FIG. 25(a), with respect to the pixel E and the pixel F, the pixel D primarily determined is found. Accordingly, angle information related to the pixel D can be set for the pixel E and the pixel F, to make secondary determination.

In order to heighten the precision, judgment as to whether or not secondary determination is made depending on angle information primarily determined is effective. That is, in the case of the candidate reference patterns shown in FIGS. 25(a) and 25(b), a primarily determined pixel is searched for with any one of the determination angle patterns shown in FIG. 17 in the vicinity of the candidate pixel, to make secondary determination when the binary pattern matches with the determination angle pattern shown in FIG. 17. In the case of the candidate reference patterns shown in FIGS. 26(a) and 26(b), a primarily determined pixel is searched for with any one of the determination angle patterns shown in FIG. 18 in the vicinity of the candidate pixel, to make secondary determination when the binary pattern matches with the determination angle pattern shown in FIG. 18. In the case of the candidate reference patterns shown in FIGS. 27(a) and 27(b), a primarily determined pixel is searched for with any one of the determination angle patterns shown in FIG. 19 in the vicinity of the candidate pixel, to make secondary determination when the binary pattern matches with the determination angle pattern shown in FIG. 19. In the case of the candidate reference patterns shown in FIGS. 28(a) and 28(b), a primarily determined pixel is searched for with any one of the determination angle patterns shown in FIG. 20 in the vicinity of the candidate pixel, to make secondary determination when the binary pattern matches with the determination angle pattern shown in FIG. 20.

Although in the present embodiment, searches are made in a direction indicated by an arrow, the present invention is not limited to the same. For example, the search may be made in the direction indicated by the arrow and the opposite direction thereof.

Figure 29:
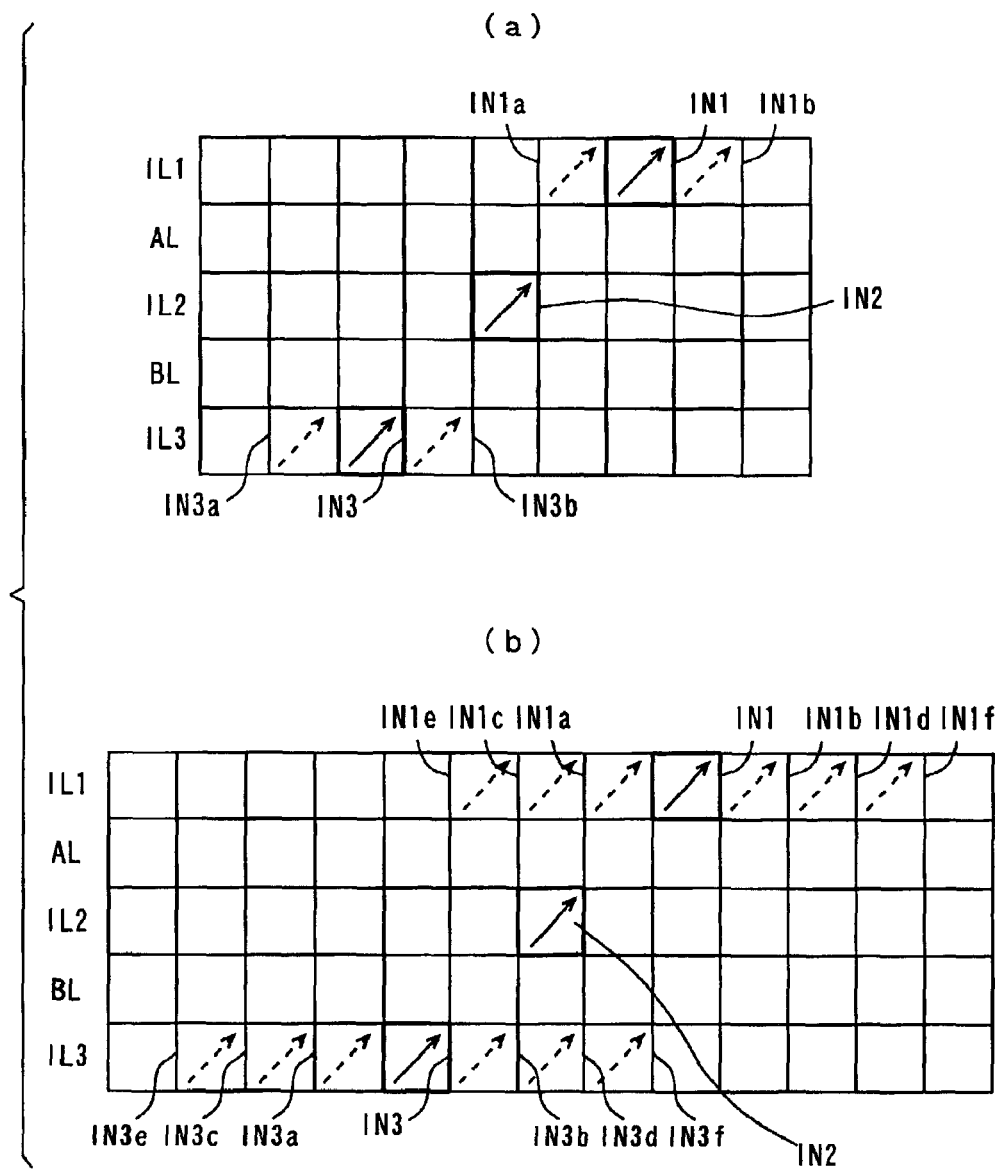
FIG. 29 is a schematic view for explaining processing of a ternary determination angle detector shown in FIG. 16.

FIG. 29 is a schematic view for explaining processing of the ternary determination angle detector 40 shown in FIG. 16. In FIGS. 29(a) and 29(b), IN1, IN2, and IN3 indicate interpolation pixels, IL1, IL2, and IL3 indicate interpolation scanning lines, and AL and BL indicate scanning lines.

The interpolation pixel IN2 on the interpolation scanning line IL2 is taken as an object of processing. When an angle to the interpolation pixel IN2 is detected as 45° by the secondary determination angle detector 38, as shown in FIG. 29(a), the ternary determination angle detector 40 judges whether or not both angles to the interpolation pixels IN1 and IN3, which are at an angle of 45° to the interpolation pixel IN2, on the upper and lower interpolation scanning lines IL1 and IL3 are 45°. When both the angles to the interpolation pixels IN1 and IN3 are 45°, the ternary determination angle detector 40 considers that the angle of the diagonal edge of the picture is continuous, to output the angle information PD outputted from the line memory 39a as the angle signal AN. When at least one of the angles to the interpolation pixels IN1 and IN3 is not 45°, the ternary determination angle detector 40 considers that the angle of the diagonal edge of the picture is not continuous, not to output the angle information PD outputted from the line memory 39a.

The ternary determination angle detector 40 may be so constructed that the angle information PD outputted from the line memory 39a is outputted as the angle signal AN in a case where at least one of the angles to the interpolation pixels IN1 and IN3 is 45°, while not being outputted as the angle signal AN in a case where neither of the angles to the interpolation pixels IN1 and IN3 is 45°.

As shown in arrows indicated by a dotted line in FIG. 29(a), the ternary determination angle detector 40 may be so constructed that the angle information PD outputted from the line memory 39a is outputted as the angle signal AN in a case where an angle to the interpolation pixel IN1 or at least one of interpolation pixels IN1a and IN1b on both sides thereof is 45° and a case where an angle to the interpolation pixel IN3 or at least one of interpolation pixels IN3a and IN3b on both sides thereof is 45°. Further, the ternary determination angle detector 40 may be so constructed that the angle information PD outputted from the line memory 39a is outputted as the angle signal AN in the case where the angle to the interpolation pixel IN1 or at least one of the interpolation pixels IN1a and IN1b on both sides thereof is 45°, or the ternary determination angle detector 40 may be so constructed that the angle information PD outputted from the line memory 39a is outputted as the angle signal AN in the case where the angle to the interpolation pixel IN3 or at least one of the interpolation pixels IN3a and IN3b on both sides thereof is 45°.

Furthermore, as shown in FIG. 29(b), the ternary determination angle detector 40 may be so constructed that the angle information PD outputted from the line memory 39a is outputted as the angle signal AN in a case where an angle to at least one of a plurality of interpolation pixels IN1a to IN1f on both sides of an interpolation pixel IN1 is 45° and a case where an angle to at least one of a plurality of interpolation pixels IN3a to IN3f on both sides of an interpolation pixel IN3 is 45°. Further, the ternary determination angle detector 40 may be so constructed that the angle information PD outputted from the line memory 39a is outputted as the angle signal AN in the case where the angle to at least one of the plurality of interpolation pixels IN1a to IN1f on both sides of the interpolation pixel IN1 is 45°, or the ternary determination angle detector 40 may be so constructed that the angle information PD outputted from the line memory 39a is outputted as the angle signal AN in the case where the angle to at least one of the plurality of interpolation pixels IN3a to IN3f on both sides of the interpolation pixel IN3 is 45°

Furthermore, although description was made, assuming that the ternary determination angle detector 40 is so constructed as to output the angle information PD outputted from the line memory 39a as the angle signal AN only when the angles to the interpolation pixels on the upper and lower scanning lines match with each other, the present invention is not limited to the same. The ternary determination angle detector 40 may be so constructed as to output the angle information PD outputted from the line memory 39a as the angle signal AN when the difference between an angle to an object interpolation pixel and the angle to the interpolation pixel on the upper or lower scanning line is within a predetermined range. When the angle to the object interpolation pixel is 27°, for example, the ternary determination angle detector 40 may be so constructed as to output the angle information PD outputted from the line memory 39a as the angle signal AN in a case where the angle to the interpolation pixel on the upper or lower scanning line is within a range of 18° to 45°. Further, when the angle to the object interpolation pixel is 34°, the ternary determination angle detector 40 may be so constructed as to output the angle information PD outputted from the line memory 39a as the angle signal AN in a case where the angle to the interpolation pixel on the upper or lower scanning line is within a range of 22° to 45°. Further, the above-mentioned predetermined range may differ depending on the angle to the object interpolation pixel.

In the picture angle detection equipment 10f according to the present embodiment, the luminance distribution in each of the video signals VD1 and VD2 in the detection window is converted into the binary pattern BI, and pattern matching between the binary pattern BI and the plurality of determination angle reference patterns RA and the candidate reference patterns RB which are previously set is performed, thereby making it possible to detect the angle of the diagonal edge of the picture on a small circuit scale.

In this case, the average luminance value in the detection window is used as a threshold value for binarization. Accordingly, the binary pattern BI including both "0" and "1" can be always generated without setting the threshold value for binarization from the exterior and irrespective of the luminance level of the picture.

The pattern matching based on the two-dimensional luminance distribution is performed. Accordingly, erroneous detection is restrained, as compared with that in a case where a difference value between two pixels is used, thereby making it possible to accurately detect the angle of the diagonal edge of the picture.

Furthermore, by using the determination angle reference patterns RA and the candidate reference patterns RB based on the two-dimensional luminance distribution, angles to be detected are not limited to the angles of straight lines each connecting the pixels at positions of point symmetry, centered at the interpolation pixel. For example, angles among the angles can be also detected. Consequently, it is possible to detect the angle with finer spacing using the line memory 31, the line memory 39a, and the line memory 39b each having a small capacity.

When the detected angle of the diagonal edge of the picture has no continuity, the angle information PD is removed by the ternary determination angle detector 40, thereby making it possible to prevent erroneous detection by noise.

Furthermore, when there exists a primarily determined pixel by searching the vicinity of the object pixel by the secondary determination angle detector 38, secondary determination can be made using angle information related to the primarily determined pixel. Accordingly, it is possible to reliably detect the angle of the picture having the shallow diagonal edge and the angle of the picture having the thin diagonal line.

Figure 30:
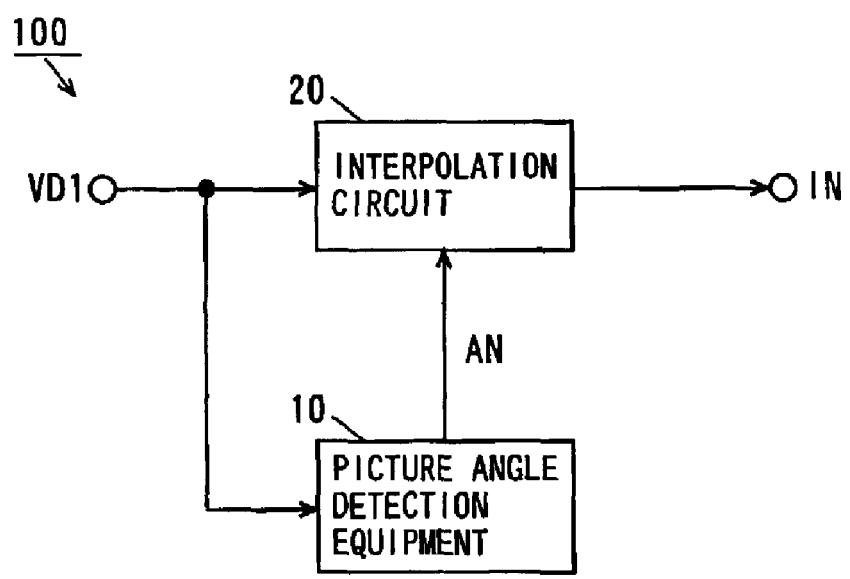
FIG. 30 is a block diagram showing the configuration of scanning lines interpolation equipment comprising picture angle detection equipment.

FIG. 30 is a block diagram showing the configuration of scanning lines interpolation equipment using picture angle detection equipment.

In FIG. 30, scanning lines interpolation equipment 100 comprises picture angle detection equipment 10 and an interpolation circuit 20. A video signal VD1 is inputted to the picture angle detection equipment 10 and the interpolation circuit 20.

The picture angle detection equipment 10 comprises the picture angle detection equipment 10a shown in FIG. 1, the picture angle detection equipment 10b shown in FIG. 9, the picture angle detection equipment 10c shown in FIG. 11, the picture angle detection equipment 10d shown in FIG. 14, the picture angle detection equipment 10e shown in FIG. 15, and the picture angle detection equipment 10f shown in FIG. 16. The picture angle detection equipment 10 detects the angle of a diagonal edge of a picture on the basis of the video signal VD1, to output an angle signal AN. The interpolation circuit 20 selects pixels in diagonal directions, centered at an interpolation pixel on the basis of the angle signal AN, and calculates the value of the interpolation pixel using the values of the selected pixels.

In the scanning lines interpolation equipment 100 shown in FIG. 30, it is possible to accurately detect the angle of the picture having the diagonal edge or a picture having a thin diagonal line by the picture angle detection equipment 10. Consequently, it is possible to perform accurate interpolation processing using the pixels in diagonal directions in the picture having the diagonal edge or the picture having the thin diagonal line.

The reference patterns RA generated by the reference pattern generators 6a and 6 shown in FIGS. 1, 9, 14, and 15 are not limited to the examples shown in FIGS. 4 to 7. For example, arbitrary reference patterns can be used.

Figure 33:
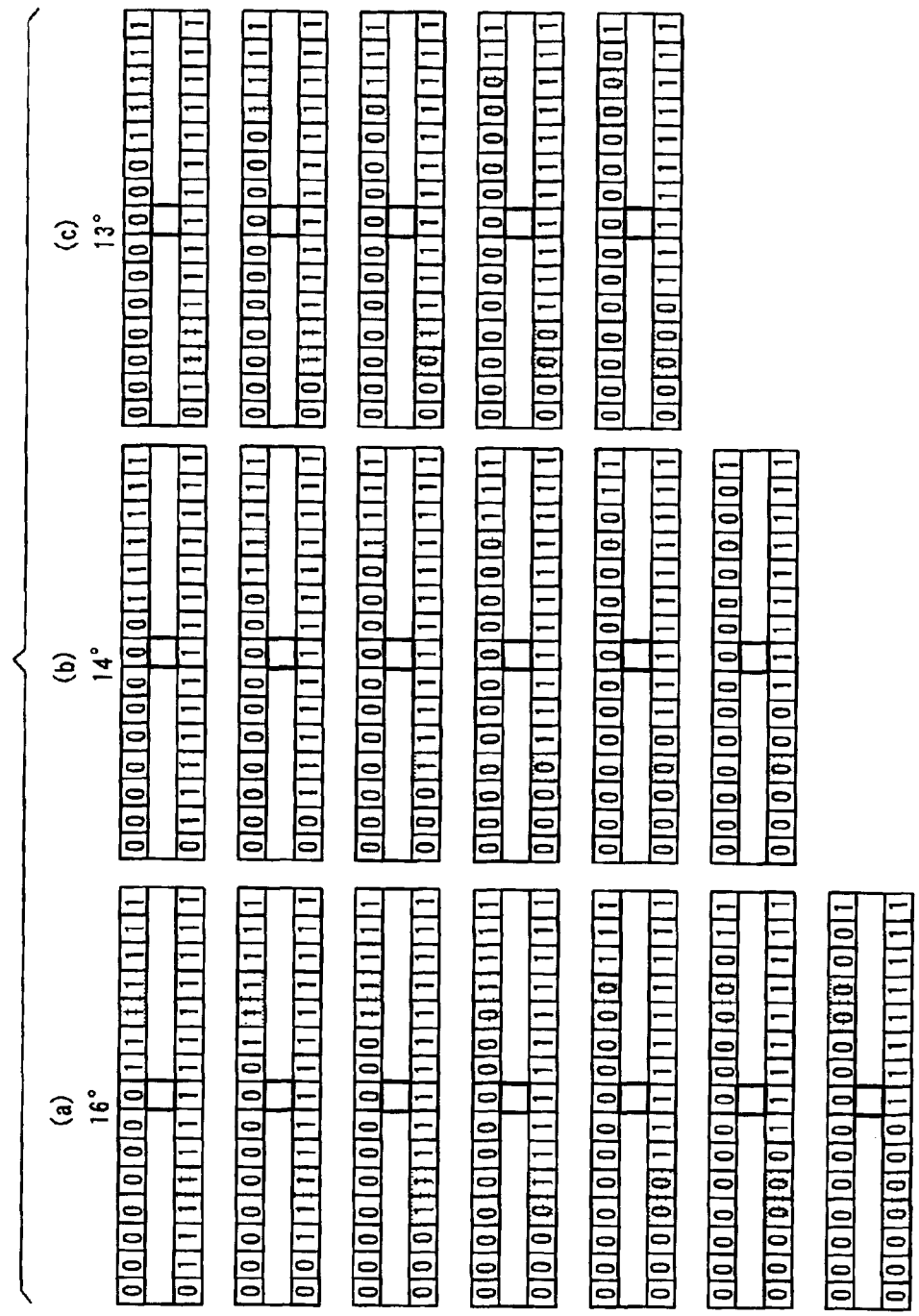
FIG. 33 is a schematic view showing another example of a reference pattern generated by a reference pattern generator.
Figure 34:
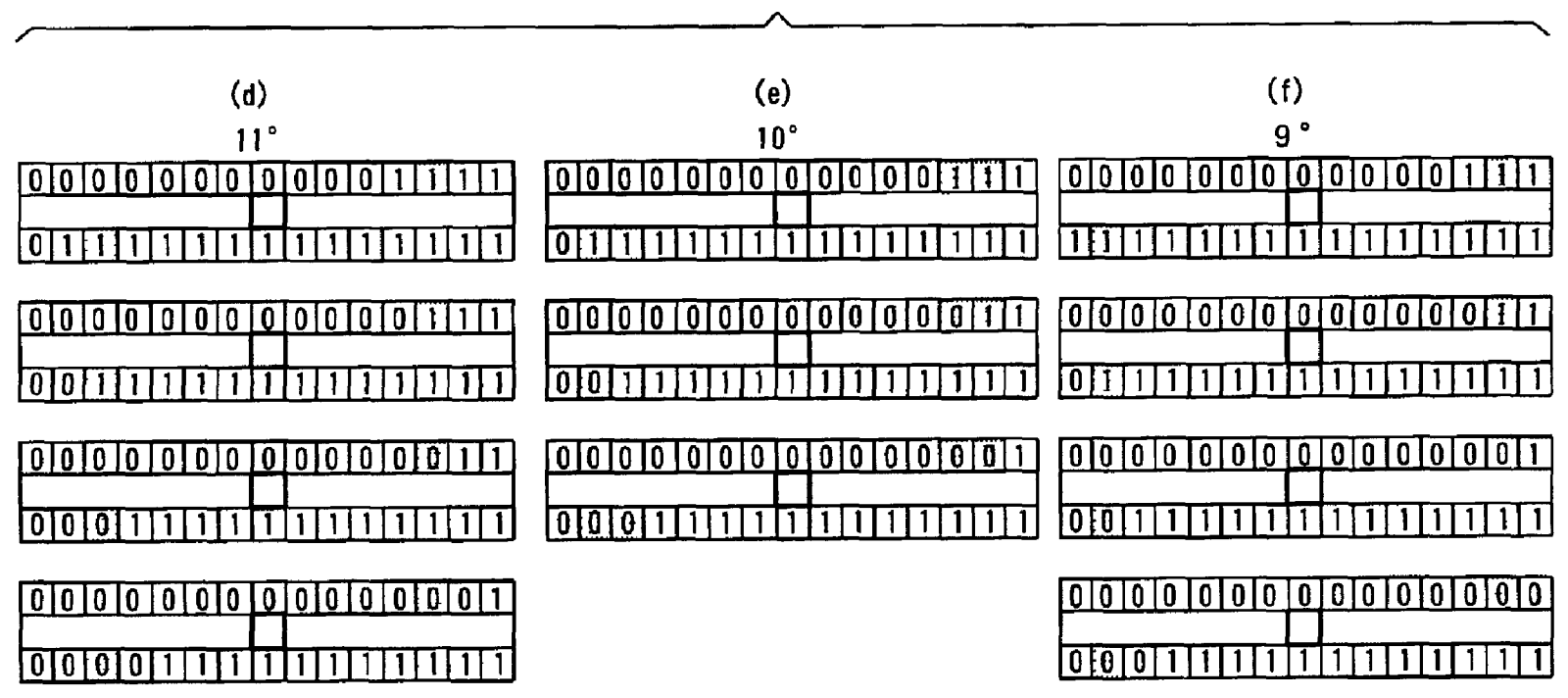
Figure 35:
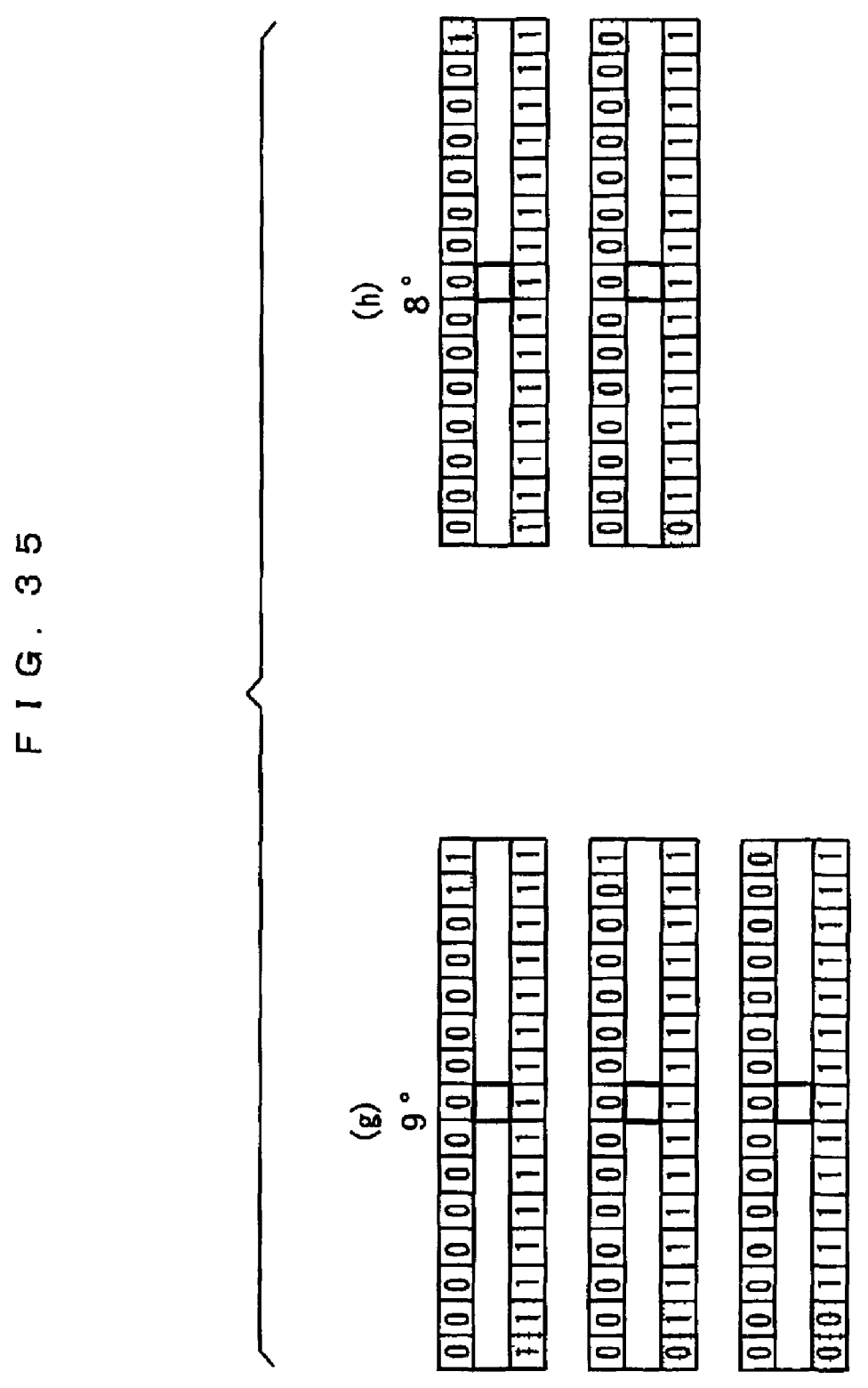
Figure 36:
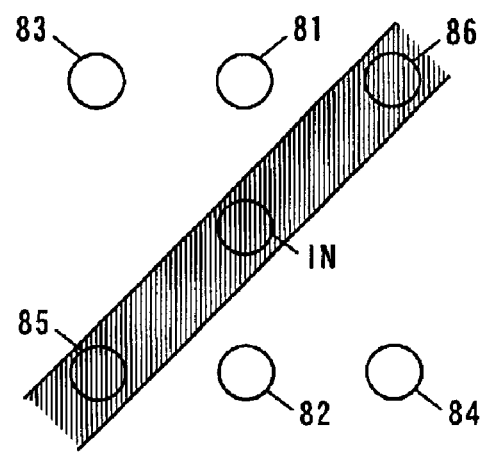
FIG. 36 is a schematic view for explaining the detection in the direction of correlation of a picture having a thin diagonal line by a conventional correlation judgment circuit.
Figure 37:
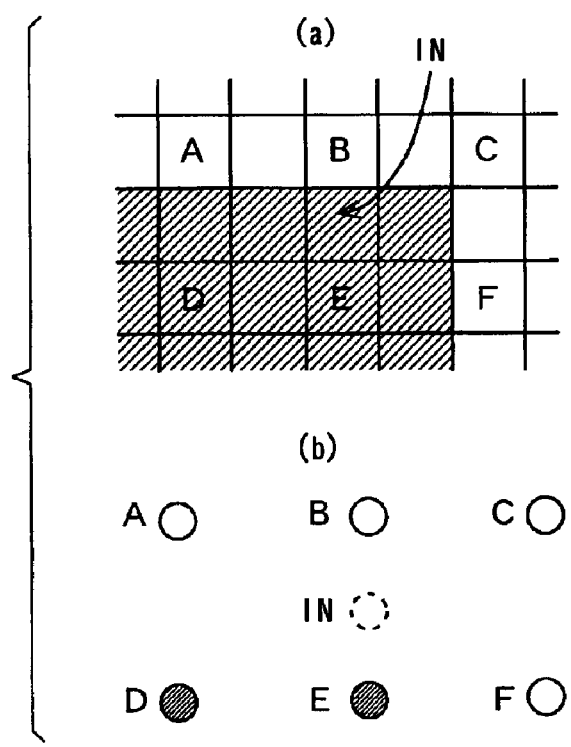
FIG. 37 is a schematic view for explaining interpolation of pixels by a conventional pixel interpolation circuit.

FIGS. 33, 34, and 35 are schematic views each showing another example of the reference patterns generated by the reference pattern generators 6a and 6 shown in FIGS. 1, 9, 14, and 15. The size of each of the reference patterns shown in FIGS. 33 to 35 is 15 by 2 pixels.

Crosshatched pixels are pixels on upper and lower scanning lines which are used for calculating the value of an interpolation pixel indicated by a thick line.

FIGS. 33(a), 33(b), and 33(c) respectively illustrate reference patterns having angles of 16°, 14°, and 13°. FIGS. 34(d), 34(e), and 34(f) respectively illustrate reference patterns having angles of 11°, 10°, and 9°. FIGS. 35(g) and 35(h) respectively illustrate reference patterns having angles of 9° and 8°. Although in the examples shown in FIGS. 33 to 35, an upper left portion is a dark portion, and a lower right portion is a bright portion, the present invention is not limited to the same.

In the reference patterns shown in FIGS. 33 to 35, even a shallower angle can be set by increasing the size of a detection window.

The determination angle reference patterns RA generated by the determination angle reference pattern generator 35 shown in FIG. 16 are not limited to the examples shown in FIGS. 17 to 20. For example, arbitrary determination angle reference patterns can be used. The candidate reference patterns RB generated by the candidate reference pattern generator 37 shown in FIG. 16 are not limited to the examples shown in FIGS. 21 to 28. For example, arbitrary candidate reference patterns can be used.

What is claimed is:

1. Picture angle detection equipment for detecting the angle of a picture related to a pixel to be interpolated on the basis of an inputted video signal, comprising:

a binary pattern generation device that binarizes said inputted video signal in a predetermined detection region including a plurality of scanning lines and said pixel to be interpolated, to generate a binary pattern;

a reference pattern generation device that generates a binary picture having a plurality of directions as a plurality of reference patterns;

a comparison device that compares the binary pattern generated by said binary pattern generation device with each of the plurality of reference patterns generated by said reference pattern generation device, and that detects the angle of the picture related to said pixel to be interpolated on the basis of the results of the comparison; and a continuity detection device that detects whether or not the angle of the picture detected by said comparison device with respect to said pixel to be interpolated has continuity from the angle of a picture detected on an upper or lower interpolation scanning line, to output the angle of the picture detected by said comparison device as an angle signal when there is continuity, while not outputting the angle of the picture detected by said comparison device when there is no continuity.

2. The picture angle detection equipment according to claim 1, wherein said binary pattern generation device comprises a threshold calculation device that calculates a threshold value for binarization on the basis of the luminance of the video signal in said detection region, and a binarization device that binarizes said inputted video signal using the threshold value calculated by said threshold calculation device, to generate said binary pattern.

3. The picture angle detection equipment according to claim 2, wherein said threshold calculation device calculates the average value of the luminance of the video signal in said detection region, to calculate said threshold value.

4. The picture angle detection equipment according to claim 1, further comprising a first judgment device that judges whether a luminance distribution in a horizontal direction on each of the scanning lines is monotonously increased or monotonously decreased in the video signal in said detection region, said comparison device not comparing said binary pattern with each of said plurality of reference patterns when said first judgment device judges that said luminance distribution is neither monotonously increased nor monotonously decreased.

5. The picture angle detection equipment according to claim 1, further comprising a second judgment device that judges whether a maximal point or a minimal point exists in a luminance distribution in a horizontal direction on each of the scanning lines in the video signal in said detection region, said comparison device not comparing said binary pattern with each of said plurality of reference patterns when said second judgment device judges that the maximal point or the minimal point exists in said luminance distribution.

6. The picture angle detection equipment according to claim 1, further comprising a contrast detection device that detects a contrast in the video signal in said detection region, said comparison device not comparing said binary pattern with each of said plurality of reference patterns when the contrast detected by said contrast detection device is lower than a predetermined value.

7. The picture angle detection equipment according to claim 1, further comprising a thinning device that thins out pixels composing said inputted video signal, to feed the thinned pixels to said binary pattern generation device.

8. The picture angle detection equipment according to claim 1, wherein said continuity detection device judges, when the difference between the angle of the picture detected by said comparison device with respect to said pixel to be interpolated and the angle of the picture detected with respect to a pixel in a predetermined range of the upper or lower interpolation scanning line is not more than a predetermined value, that there is continuity.

9. The picture angle detection equipment according to claim 1, wherein said continuity detection device judges,
when the difference between the angle of the picture detected by said comparison device with respect to said pixel to be interpolated and the angle of the picture detected with respect to a pixel in a predetermined range of the upper or lower interpolation scanning line is not more than a predetermined value, and when the difference between said threshold value calculated by said threshold calculation device with respect to said pixel to be interpolated and said threshold value calculated by said threshold calculation device with respect to a pixel in a predetermined range of the upper or lower interpolation scanning line is not more than a predetermined value, the difference between the maximum value of the luminance of the video signal in the detection region related to said pixel to be interpolated and the maximum value of the luminance of the video signal in the detection region related to a pixel in a predetermined range of the upper or lower interpolation scanning line is not more than a predetermined value, or the difference between the minimum value of the luminance of the video signal in the detection region related to said pixel to be interpolated and the minimum value of the luminance of the video signal in the detection region related to a pixel in a predetermined range of the upper or lower interpolation scanning line is not more than a predetermined value, that there is continuity.

10. The picture angle detection equipment according to claim 1, wherein
each of the plurality of reference patterns generated by said reference pattern generation device includes a first pixel train arranged on the scanning line above said pixel to be interpolated and a second pixel train arranged on the scanning line below said pixel to be interpolated,
said first pixel train having one change point from a first pixel value to a second pixel value, said second pixel train having one change point from a first pixel value to a second pixel value, and the direction of the change from the first pixel value to the second pixel value in said first pixel train and the direction of the change from the first pixel value to the second pixel value in said second pixel train being the same.

11. The Picture angle detection equipment according to claim 1, wherein
said comparison device outputs said angle of the picture and an identification signal for identifying the reference pattern matched with said binary pattern.

12. Picture angle detection equipment for detecting the angle of a picture related to a pixel to be interpolated on the basis of an inputted video signal, comprising:

a maximal/minimal pattern generation device that generates, in a predetermined detection region including a plurality of scanning lines and said pixel to be interpolated in said inputted video signal, a maximal/minimal pattern representing the position of a maximal point or a minimal point in a luminance distribution in a horizontal direction for each of the scanning lines;

a reference pattern generation device that generates a plurality of reference patterns each representing the position of the maximal point or the minimal point in the luminance distribution in the horizontal direction for each of the scanning lines in said detection region; and a comparison device that compares the maximal/minimal pattern generated by said maximal/minimal pattern generation device with each of the plurality of reference patterns generated by said reference pattern generation device, and that detects the angle of the picture related to said pixel to be interpolated on the basis of the results of the comparison.

13. The picture angle detection equipment according to claim 12, further comprising
a contrast detection device that detects a contrast in the video signal in said detection region,
said comparison device not comparing said maximal/minimal pattern with each of said plurality of reference patterns when the contrast detected by said contrast detection device is lower than a predetermined value.

14. The picture angle detection equipment according to claim 12, further comprising
a continuity detection device that detects whether or not the angle of the picture detected by said comparison device with respect to said pixel to be interpolated has continuity from the angle of a picture detected on an upper or lower interpolation scanning line, to output the angle of the picture detected by said comparison device as an angle signal when there is continuity, while not outputting the angle of the picture detected by said comparison device when there is no continuity.

15. The Picture angle detection equipment according to claim 12, wherein
said comparison device outputs said angle of the picture and an identification signal for identifying the reference pattern matched with said binary pattern.

16. The picture angle detection equipment according to claim 13, further comprising a thinning device that thins out pixels composing said inputted video signal, to feed the thinned pixels to said maximal/minimal pattern generation device.

17. Picture angle detection equipment for detecting the angle of a picture related to a pixel to be interpolated on the basis of an inputted video signal, comprising:

a binary pattern generation device that binarizes said inputted video signal in a predetermined detection region including a plurality of scanning lines and said pixel to be interpolated, to generate a binary pattern;

a first reference pattern generation device that generates a binary picture having a plurality of directions as a plurality of first reference patterns;

a first comparison device that compares the binary pattern generated by said binary pattern generation device with each of the plurality of first reference patterns generated by said first reference pattern generation device, and that detects the angle of the picture related to said pixel to be interpolated on the basis of the results of the comparison;

a maximal/minimal pattern generation device that generates, in the predetermined detection region including the plurality of scanning lines and said pixel to be interpolated in said inputted video signal, a maximal/minimal pattern representing the position of a maximal point or a minimal point in a luminance distribution in a horizontal direction for each of the scanning lines;

a second reference pattern generation device that generates a plurality of second reference patterns each representing the position of the maximal point or the minimal point in the luminance distribution in the horizontal direction for each of the scanning lines in said detection region; and a second comparison device that compares the maximal/minimal pattern generated by said maximal/minimal pattern generation device with each of the plurality of second reference patterns generated by said second reference pattern generation device, and detecting the angle of the picture related to said pixel to be interpolated on the basis of the results of the comparison.

18. The picture angle detection equipment according to claim 17, further comprising a thinning device that thins out pixels composing said inputted video signal, to feed the thinned pixels to said binary pattern generation device and said maximal/minimal pattern generation device.

19. Picture angle detection equipment for detecting the angle of a picture related to a pixel to be interpolated on the basis of an inputted video signal, comprising:

a binary pattern generation device that binarizes said inputted video signal in a predetermined detection region including a plurality of scanning lines and said pixel to be interpolated, to generate a binary pattern;

a determination angle pattern generation device that generates a plurality of binary pictures each having a specified direction as a plurality of determination angle patterns;

a primary determination angle detection device that compares the binary pattern generated by said binary pattern generation device with each of the plurality of determination angle patterns generated by said determination angle pattern generation device, and that detects the angle of the picture related to said pixel to be interpolated as a primary determination angle on the basis of the results of the comparison;

a candidate pattern generation device that generates a plurality of binary pictures each having a plurality of arbitrary directions as a plurality of candidate patterns;

a candidate detection device that compares the binary pattern generated by said binary pattern generation device with each of the plurality of candidate patterns generated by said candidate pattern generation device, and that detects whether or not said pixel to be interpolated is a candidate pixel at which the angle of the picture can be determined on the basis of the results of the comparison; and a secondary determination angle detection device that outputs, when said primary determination angle detection device detects the primary determination angle, the primary determination angle detected by said primary determination angle detection device as the angle of the picture related to said pixel to be interpolated, searching, when said candidate detection device detects that said pixel to be interpolated is a candidate pixel, for the other pixel having said primary determination angle in a predetermined range adjacent to said pixel to be interpolated, to output, when the other pixel having said primary determination angle exists in said predetermined range, the primary determination angle related to said other pixel as the angle of the picture related to said pixel to be interpolated.

20. The picture angle detection equipment according to claim 19, wherein each of the plurality of determination angle patterns generated by said determination angle pattern generation device includes a first pixel train arranged on the scanning line above said pixel to be interpolated and a second pixel train arranged on the scanning line below said pixel to be interpolated, said first pixel train having one change point from a first pixel value to a second pixel value, said second pixel train having one change point from a first pixel value to a second pixel value, and the direction of the change from the first pixel value to the second pixel value in said first pixel train and the direction of the change from the first pixel value to the second pixel value in said second pixel train being the same.

21. The picture angle detection equipment according to claim 19, wherein each of the plurality of candidate patterns generated by said candidate pattern generation device includes a first pixel train arranged on the scanning line above said pixel to be interpolated and a second pixel train arranged on the scanning line below said pixel to be interpolated, one of said first and second pixel trains having one change point from a first pixel value to a second pixel value, and the other of said first and second pixel trains having one of the first pixel value and the second pixel value.

22. The picture angle detection equipment according to claim 19, wherein each of the plurality of candidate patterns generated by said candidate pattern generation device includes a first pixel train arranged on the scanning line above said pixel to be interpolated and a second pixel train arranged on the scanning line below said pixel to be interpolated, said first pixel train having one change point from a first pixel value to a second pixel value, said second pixel train having one change point from a first pixel value to a second pixel value, and the direction of the change from the first pixel value to the second pixel value in said first pixel train and the direction of the change from the first pixel value to the second pixel value in said second pixel train being opposite to each other.

23. The picture angle detection equipment according to claim 19, wherein said secondary determination angle detection device specifies, when said candidate detection device detects that said pixel to be interpolated is a candidate pixel, the direction in which the other pixel having said primary determination angle is searched for from said pixel to be interpolated depending on the candidate pattern which is judged to be coincident with said binary pattern by said candidate detection device.

24. The picture angle detection equipment according to claim 19, wherein said secondary determination angle detection device searches, when said candidate detection device detects that said pixel to be interpolated is a candidate pixel, for the other pixel using the predetermined angle determination pattern out of said plurality of angle determination patterns in a predetermined range adjacent to said pixel to be interpolated depending on the candidate pattern which is judged to be coincident with said binary pattern by said candidate detection device, to output, when the other pixel having a primary determination angle exists in said predetermined range, the primary determination angle related to said other pixel as the angle of the picture related to said pixel to be interpolated.

25. The picture angle detection equipment according to claim 19, further comprising
a ternary determination angle detection device that detects whether or not the angle of the picture detected by said secondary determination angle detection device with respect to said pixel to be interpolated has continuity from the angle of a picture detected on an upper or lower interpolation scanning line, to output the angle of the picture detected by said secondary determination angle detection device as an angle signal when there is continuity, while not outputting the angle of the picture detected by said secondary determination angle detection device when there is no continuity.

26. The Picture angle detection equipment according to claim 24, wherein
said comparison device outputs said angle of the picture and an identification signal for identifying the determination angle pattern matched with said binary pattern.

27. Scanning lines interpolation equipment comprising:
picture angle detection equipment that detects the angle of a picture related to a pixel to be interpolated on the basis of an inputted video signal; and
an interpolation circuit that selects pixels used for interpolation processing on the basis of the angle detected by said picture angle detection equipment, and calculating the value of said pixel to be interpolated using the selected pixels, to generate interpolation scanning lines,
said picture angle detection equipment comprising
a binary pattern generation device that binarizes said inputted video signal in a predetermined detection region including a plurality of scanning lines and said pixel to be interpolated, to generate a binary pattern,
a reference pattern generation device that generates a binary picture having a plurality of directions as a plurality of reference patterns,
a comparison device that compares the binary pattern generated by said binary pattern generation device with each of the plurality of reference patterns generated by said reference pattern generation device, and that detects the angle of the picture related to said pixel to be interpolated on the basis of the results of the comparison, and
a continuity detection device that detects whether or not the angle of the picture detected by said comparison device with respect to said pixel to be interpolated has continuity from the angle of a picture detected on the upper or lower interpolation scanning line, to output the angle of the picture detected by said comparison device as an angle signal when there is continuity, while not outputting the angle of the picture detected by said comparison device when there is no continuity.

28. Scanning lines interpolation equipment comprising:
picture angle detection equipment that detects the angle of a picture related to a pixel to be interpolated on the basis of an inputted video signal; and
an interpolation circuit that selects pixels used for interpolation processing on the basis of the angle detected by said picture angle detection equipment, and that calculates the value of said pixel to be interpolated using the selected pixels, to generate interpolation scanning lines,
said picture angle detection equipment comprising
a maximal/minimal pattern generation device that generates, in a predetermined detection region including a plurality of scanning lines and said pixel to be interpolated in said inputted video signal, a maximal/minimal pattern representing the position of a maximal point or a minimal point in a luminance distribution in a horizontal direction for each of the scanning lines,
a reference pattern generation device that generates a plurality of reference patterns each representing the position of the maximal point or the minimal point in the luminance distribution in the horizontal direction for each of the scanning lines in said detection region, and
a comparison device that compares the maximal/minimal pattern generated by said maximal/minimal pattern generation device with each of the plurality of reference patterns generated by said reference pattern generation device, and that detects the angle of the picture related to said pixel to be interpolated on the basis of the results of the comparison.

29. Scanning lines interpolation equipment comprising:
picture angle detection equipment that detects the angle of a picture related to a pixel to be interpolated on the basis of an inputted video signal; and
an interpolation circuit that selects pixels used for interpolation processing on the basis of the angle detected by said picture angle detection equipment, and that calculates the value of said pixel to be interpolated using the selected pixels, to generate interpolation scanning lines,
said picture angle detection equipment comprising
a binary pattern generation device that binarizes said inputted video signal, in a predetermined detection region including a plurality of scanning lines and said pixel to be interpolated, to generate a binary pattern,
a first reference pattern generation device that generates a binary picture having a plurality of directions as a plurality of first reference patterns,
a first comparison device that compares the binary pattern generated by said binary pattern generation device with each of the plurality of first reference patterns generated by said first reference pattern generation device, and that detects the angle of the picture related to said pixel to be interpolated on the basis of the results of the comparison,
a maximal/minimal pattern generation device that generates, in a predetermined detection region including a plurality of scanning lines and said pixel to be interpolated in said inputted video signal, a maximal/minimal pattern representing the position of a maximal point or a minimal point in a luminance distribution in a horizontal direction for each of the scanning lines,
a second reference pattern generation device that generates a plurality of second reference patterns each representing the position of the maximal point or the minimal point in the luminance distribution in the horizontal direction for each of the scanning lines in said detection region, and
a second comparison device that compares the maximal/minimal pattern generated by said maximal/minimal pattern generation device with each of the plurality of second reference patterns generated by said second reference pattern generation device, and that detects the angle of the picture related to said pixel to be interpolated on the basis of the results of the comparison.

30. Scanning lines interpolation equipment comprising:

picture angle detection equipment that detects the angle of a picture related to a pixel to be interpolated on the basis of an inputted video signal; and an interpolation circuit that selects pixels used for interpolation processing on the basis of the angle detected by said picture angle detection equipment, and that calculates the value of said pixel to be interpolated using the selected pixels, to generate interpolation scanning lines, said picture angle detection equipment comprising a binary pattern generation device that binarizes said inputted video signal in a predetermined detection region including a plurality of scanning lines and said pixel to be interpolated, to generate a binary pattern, a determination angle pattern generation device that generates a plurality of binary pictures each having a specified direction as a plurality of determination angle patterns, a primary determination angle detection device that compares the binary pattern generated by said binary pattern generation device with each of the plurality of determination angle patterns generated by said determination angle pattern generation device, and that detects the angle of the picture related to said pixel to be interpolated as a primary determination angle on the basis of the results of the comparison, a candidate pattern generation device that generates a plurality of binary pictures each having a plurality of arbitrary directions as a plurality of candidate patterns, a candidate detection device that compares the binary pattern generated by said binary pattern generation device with each of the plurality of candidate patterns generated by said candidate pattern generation device, and detecting whether or not said pixel to be interpolated is a candidate pixel at which the angle of the picture can be determined on the basis of the results of the comparison, and a secondary determination angle detection device that outputs, when said primary determination angle detection device detects the primary determination angle, the primary determination angle detected by said primary determination angle detection device as the angle of the picture related to said pixel to be interpolated, searching, when said candidate detection device detects that said pixel to be interpolated is a candidate pixel, for the other pixel having said primary determination angle in a predetermined range adjacent to said pixel to be interpolated, to output, when the other pixel having said primary determination angle exists in said predetermined range, the primary determination angle related to said other pixel as the angle of the picture related to said pixel to be interpolated.

* * * * *

UNITED STATES PATENT AND TRADEMARK OFFICE
CERTIFICATE OF CORRECTION

PATENT NO. : 6,924,844 B2
DATED : August 2, 2005
INVENTOR(S) : H. Kawamura et al.

It is certified that error appears in the above-identified patent and that said Letters Patent is hereby corrected as shown below:

<u>Title page,</u>
Insert Item -- [30]  Foreign Application Priority Data
        Dec. 14, 2000 (JP) 2000-380903
        May 30, 2001 (JP) 2001-162241
        Dec. 3, 2001  (JP) 2001-369291 --.

Signed and Sealed this

Fourteenth Day of February, 2006

JON W. DUDAS
*Director of the United States Patent and Trademark Office*